United States Patent
Iizuka et al.

(10) Patent No.: US 9,866,453 B2
(45) Date of Patent: Jan. 9, 2018

(54) METHOD, APPARATUS, AND PACKET ANALYZING SYSTEM

(71) Applicant: FUJITSU LIMITED, Kawasaki-shi, Kanagawa (JP)

(72) Inventors: Fumiyuki Iizuka, Kawasaki (JP); Naoyoshi Ohkawa, Kawasaki (JP); Yuji Nomura, Kawaski (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 15/012,296

(22) Filed: Feb. 1, 2016

(65) Prior Publication Data

US 2016/0226725 A1 Aug. 4, 2016

(30) Foreign Application Priority Data

Feb. 4, 2015 (JP) .................................. 2015-019850

(51) Int. Cl.
H04L 1/00 (2006.01)
H04L 12/26 (2006.01)
H04L 29/06 (2006.01)

(52) U.S. Cl.
CPC ............ *H04L 43/022* (2013.01); *H04L 69/22* (2013.01)

(58) Field of Classification Search
None
See application file for complete search history.

(56) References Cited

U.S. PATENT DOCUMENTS

| 2008/0170531 A1 | 7/2008 | Petry |
| 2008/0205406 A1 | 8/2008 | Hatakeyama |
| 2010/0070627 A1 | 3/2010 | Miyazaki et al. |

(Continued)

FOREIGN PATENT DOCUMENTS

| JP | 2007-274332 | 10/2007 |
| JP | 2007-274332 A | 10/2007 |

(Continued)

OTHER PUBLICATIONS

U.S. Office Action dated Jul. 3, 2017 in related U.S. Appl. No. 15/012,296 (13 pages).

(Continued)

*Primary Examiner* — Kibrom T Hailu
(74) *Attorney, Agent, or Firm* — Staas & Halsey LLP

(57) ABSTRACT

A method includes receiving a first packet, the first packet being including a first packet identifier and a first error detection code, storing first information indicating the first packet identifier and second information indicating the first error detection code, receiving a second packet, the second packet being including a second packet identifier and a second error detection code, comparing the second packet identifier and the second error detection code with the first information and the second information, respectively, in response to a determination that the second packet identifier corresponds to the first information and the second error detection code corresponds to the second information, discarding the second packet, in response to a determination that at least one the second packet identifier and the second error detection code does not correspond to the first information and the second information, providing the first packet and the second packet for a packet analysis.

11 Claims, 39 Drawing Sheets

(56) References Cited

U.S. PATENT DOCUMENTS

| | | |
|---|---|---|
| 2011/0280149 A1 | 11/2011 | Okada et al. |
| 2013/0155918 A1* | 6/2013 | Singh .................. H04W 28/06 |
| | | 370/310 |
| 2014/0362731 A1 | 12/2014 | Wijnands |
| 2016/0112896 A1 | 4/2016 | Karampatsis |
| 2016/0142305 A1* | 5/2016 | Alawani ................ H04L 45/74 |
| | | 370/389 |

FOREIGN PATENT DOCUMENTS

| | | |
|---|---|---|
| JP | 2008-211682 | 9/2008 |
| JP | 2008-211682 A | 9/2008 |
| JP | 2008-219127 | 9/2008 |
| JP | 2009-130528 | 6/2009 |
| JP | 2010-072955 | 4/2010 |
| WO | 2010/086907 | 8/2010 |
| WO | WO 2010/086907 A1 | 8/2010 |

OTHER PUBLICATIONS

Non-Final Office Action dated Mar. 1, 2017 in related U.S. Appl. No. 14/791,985 (7 pages).
Notice of Allowance dated Jul. 12, 2017 in related U.S. Appl. No. 14/791,985 (7 pages).
Supplemental Notice of Allowance dated Jul. 26, 2017 in related U.S. Appl. No. 14/791,985 (6 pages).
U.S. Appl. No. 14/791,985, filed Jul. 6, 2015, Iizuka et al., FUJITSU LIMITED Kawasaki-shi, JP.

* cited by examiner

FIG. 9

| PACKET LEADING ADDRESS | SESSION IDENTIFIER | IP IDENTIFIER | CHECK SUM | IP IDENTIFIER DUPLICATION FLAG | CHECK SUM DUPLICATION FLAG |
|---|---|---|---|---|---|
| padr | 1 | 23456 | 56789 | 1 | 1 |

FIG. 10

| SESSION IDENTIFIER | TRANSMISSION SOURCE IP | TRANSMISSION DESTINATION IP | PROTOCOL NUMBER | TRANSMISSION SOURCE PORT | TRANSMISSION DESTINATION PORT |
|---|---|---|---|---|---|
| 1 | 10.20.30.40 | 10.20.30.50 | 6 | 2000 | 20 |
| 2 | 20.30.40.50 | 10.20.30.60 | 6 | 3000 | 80 |
| 3 | 30.40.50.60 | 40.50.60.70 | 17 | 4000 | 3000 |
| ... | ... | ... | ... | ... | ... |

T2

FIG. 11
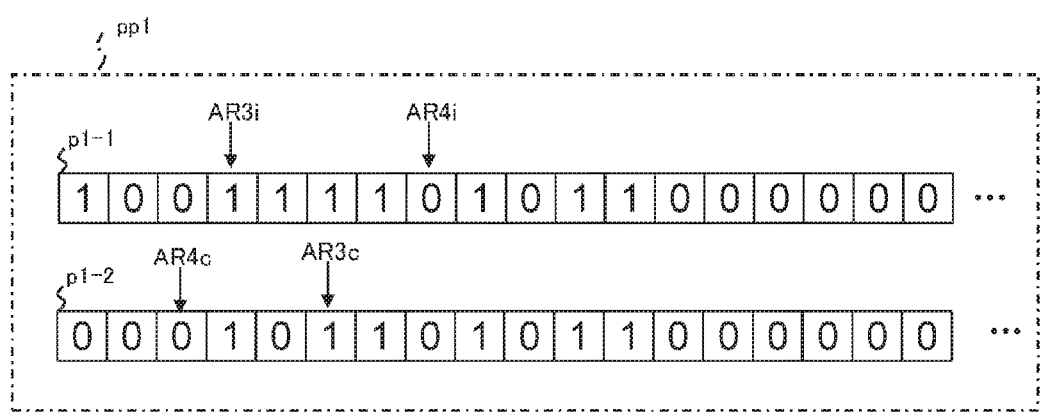
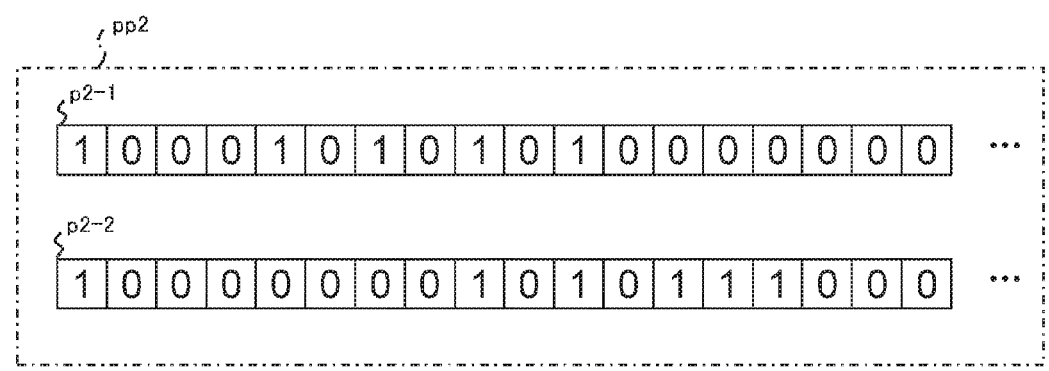

| SESSION IDENTIFIER | MANAGEMENT BIT ADDRESS-IP IDENTIFIER | MANAGEMENT BIT ADDRESS-CHECK SUM |
|---|---|---|
| 1 | p1-1 | p1-2 |
| 2 | p2-1 | p2-2 |
| 1 | p3-1 | p3-2 |
| ... | ... | ... |

FIG. 18

| SESSION IDENTIFIER | MANAGEMENT LIST ADDRESS |
|---|---|
| 1 | p1-list |
| 2 | p2-list |
| 3 | p3-list |
| ... | ... |

T4

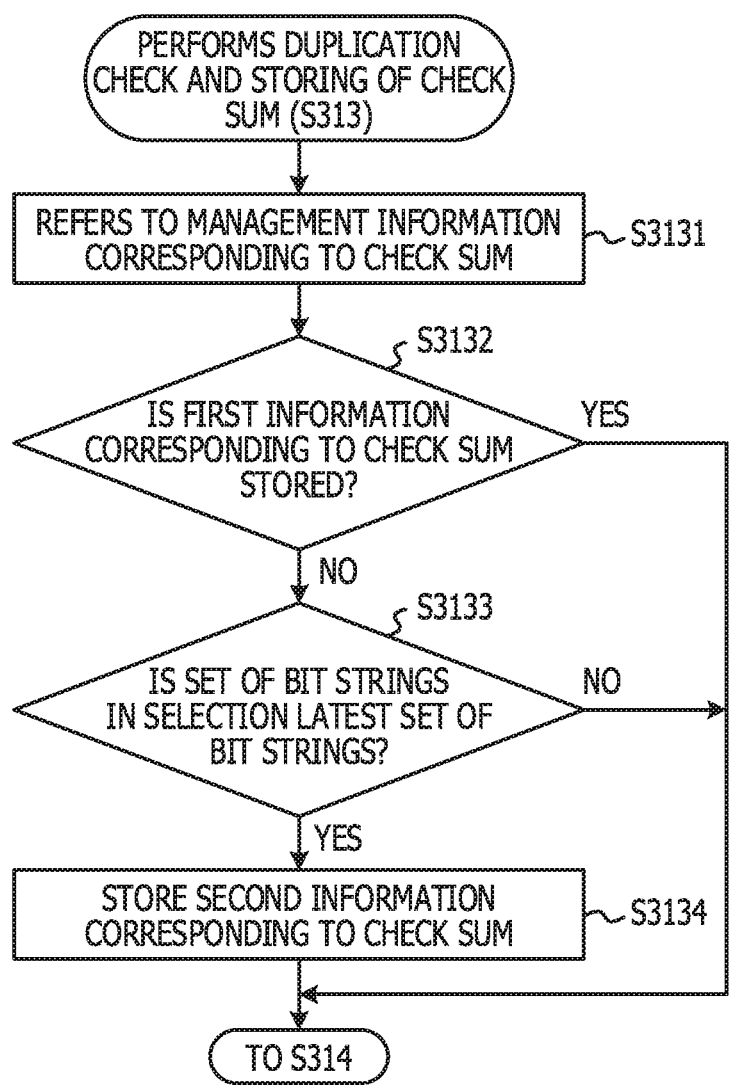

FIG. 32

| SESSION IDENTIFIER | IP IDENTIFIER TYPE | MANAGEMENT BIT ADDRESS-IP IDENTIFIER | MANAGEMENT BIT ADDRESS-CHECK SUM | SEQUENCE FOR DETERMINATION |
|---|---|---|---|---|
| 1 | RANDOM | p1-1 | p1-2 | p3-tmpDELETION |
| 2 | SEQUENTIAL | p2-1 | | p3-tmpDELETION |
| 3 | NOT-DETERMINATION | p3-1 | | p3-tmpDELETION |
| ... | ... | ... | ... | ... |

T3a

FIG. 33A p3-tmp

| IP IDENTIFIER TYPE | CHECK SUM |
|---|---|
| 1001 | 104 |
| 258 | 502 |
| 110 | 105821 |
| 4520 | 2014 |

FIG. 33B p3-tmp

| IP IDENTIFIER TYPE | CHECK SUM |
|---|---|
| 101 | 1034 |
| 102 | 50219 |
| 103 | 102 |
| 104 | 2014 |

FIG. 33C p3-tmp

| IP IDENTIFIER TYPE | CHECK SUM |
|---|---|
| 101 | 1034 |
| 102 | 50219 |
| 104 | 2014 |
| 103 | 102 |

METHOD, APPARATUS, AND PACKET ANALYZING SYSTEM

CROSS-REFERENCE TO RELATED APPLICATION

This application is based upon and claims the benefit of priority of the prior Japanese Patent Application No. 2015-019850, filed on Feb. 4, 2015, the entire contents of which are incorporated herein by reference.

FIELD

The embodiments discussed herein are related to a method, an apparatus, and a packet analyzing system.

BACKGROUND

An apparatus (appropriately described as a monitoring apparatus below) of monitoring an operation state of a system or a network has been proposed. The monitoring apparatus, for example, obtains communication packets (appropriately described as packets below) flowing in a network, and analyzes the obtained packets.

The monitoring apparatus obtains packets from a capturing point provided at a location through which packets to be analyzed pass. Such capturing points are generally provided at a plurality of locations in order to enable comprehensively-obtaining of packets to be used for analysis.

When the capturing points are provided at the plurality of locations, a packet may pass through a plurality of capturing points. In this manner, if the packet passes through the plurality of capturing points, the monitoring apparatus obtains a plurality of the same packets and thus it may be analyzed that the same packets are generated a plurality of times.

The monitoring apparatus may not calculate the number of packets with accuracy when the monitoring apparatus performs analysis under such a condition. In addition, when the monitoring apparatus performs analysis, the monitoring apparatus may determine that retransmission has been performed due to, for example, occurrence of packet loss. When such an analysis is performed, accuracy of the analysis is degraded.

Thus, the monitoring apparatus performs duplication determination on each of a plurality of obtained packets and detects a duplicate packet (also referred to as the same packet). The duplication determination is determination whether or not packets are duplicated. When the monitoring apparatus detects the duplicate packet, the monitoring apparatus deletes (also referred to as discard) the detected duplicate packet and analyzes a plurality of obtained packets other than the detected duplicate packet. Examples of the related art include International Publication pamphlet No. WO 2010/086907, Japanese Laid-open Patent Publication No. 2007-274332, and Japanese Laid-open Patent Publication No. 2008-211682.

SUMMARY

According to an aspect of the invention, a method includes receiving a first packet, the first packet being transmitted from a first packet capture point in a network, the first packet including a first packet identifier and a first error detection code (EDC), storing first information indicating the first packet identifier and second information indicating the first EDC, receiving a second packet, the second packet being transmitted from a second capturing point in the network, the second packet including a second packet identifier and a second EDC, comparing the second packet identifier and the second EDC with the first information and the second information, respectively, in response to a determination according to the comparing that the second packet identifier corresponds to the first information and the second EDC corresponds to the second information, discarding the second packet, and in response to a determination according to the comparing that at least any one the second packet identifier or the second EDC does not correspond to either of the first information or the second information, providing the first and second packets for a packet analysis.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating packet information in FIG. 8;

FIG. 10 is a diagram illustrating session information in FIG. 8;

FIG. 11 is a diagram illustrating management information in FIG. 8;

FIG. 12 is a diagram illustrating position information in FIG. 8;

FIG. 18 is a diagram illustrating list information in FIG. 17;

FIG. 28 is a fifth flowchart illustrating details of the duplicate packet detection processing according to the second embodiment;

FIG. 32 is a diagram illustrating position information in FIG. 31;

FIGS. 33A, 33B, and 33C are diagrams illustrating information for random determination in FIG. 31;

DESCRIPTION OF EMBODIMENTS

When duplication determination for a packet is performed, a monitoring apparatus performs the following processing and the like. That is, the monitoring apparatus stores a packet which has been obtained previously and when the monitoring apparatus obtains another packet, the monitoring apparatus determines whether or not the obtained packet is the same as the stored packet. Here, the monitoring apparatus matches, for example, entire data of the obtained packet with entire data of the stored packet in the duplication determination for the packet.

The monitoring apparatus deletes the obtained packet as a duplicate packet, when the obtained packet is the same as the stored packet.

Processing burden of a central processing unit (CPU) and the like is increased in accordance with the number of packets that have to be subjected to the matching processing. For example, if a frequency of performing of the duplication determination exceeds processing capacity of the CPU and the like, overflow may occur and the duplication determination may be incorrectly performed. As a result, it is difficult to perform the duplication determination with high accuracy.

(Configuration of Information Processing System)

Figure 1:
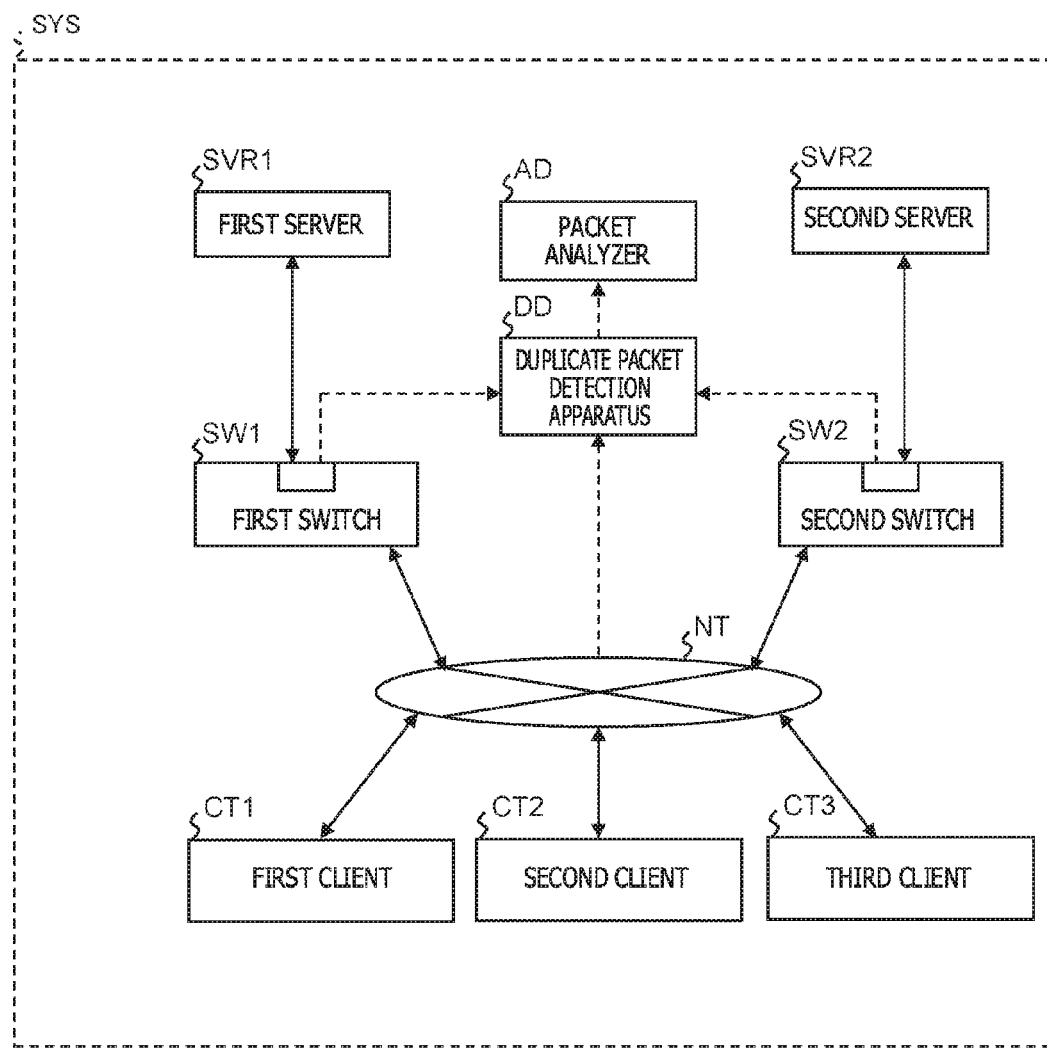
FIG. 1 is a diagram illustrating the entire configuration of an information processing system.

FIG. 1 is a diagram illustrating the entire configuration of an information processing system. In the following descriptions for the drawings, the same components are denoted by the same reference signs and descriptions which have been made once will be omitted.

The information processing system SYS includes a first server SVR1, a second server SVR2, a first client CT1, a second client CT2, and a third client CT3. The server is an abbreviation of a server device. The client is an abbreviation of a client device. The information processing system SYS further includes a first switch SW1, a second switch SW2, a duplicate packet detection apparatus DD, and a packet analyzer AD. The switch is an abbreviation of a switching device.

The first server SVR1 and the second server SVR2, the first client CT1 to the third client CT3 may communicate with each other through a network NT such as the Internet and an intranet.

In the example of FIG. 1, the packet analyzer AD may communicate with the first switch SW1 coupled to the first server SVR1 or the second switch SW2 coupled to the second server SVR2, through the duplicate packet detection apparatus DD. The information processing system SYS includes the two servers, but may include servers of other numbers. The information processing system SYS includes the three clients, but may include clients of other numbers.

The first server SVR1 and the second server SVR2 perform processing in accordance with a processing request from the first client CT1, for example, and transmit a result obtained by performing the processing to the first client CT1. An example of this processing includes processing of managing information of a schedule and the like of a user, which is input through the client by the user, and processing of displaying desired information in the client in accordance with a processing request from a user. In addition, the first server SVR1 and the second server SVR2 perform data processing in cooperation with each other. In the data processing, packets are transmitted and received between the first server SVR1 and the second server SVR2.

The first client CT1 to the third client CT3 transmit a processing request to the first server SVR1 or the second server SVR2, and receive a result. The first client CT1 to the third client CT3 are stationary terminals such as a desktop type personal computer, or remote terminals such as a mobile phone, for example.

The first switch SW1 is disposed between the first server SVR1 and the network NT. The second switch SW2 is disposed between the second server SVR2 and the network NT. The first switch SW1 and the second switch SW2 have mirror ports (not illustrated) that duplicate a packet to be transmitted and output the duplicated packet to an external device. For example, the mirror port of the first switch SW1 duplicates a packet in which the first server SW1 is set as a transmission destination, and transmits the duplicated packet to the duplicate packet detection apparatus DD.

In the example of FIG. 1, a network tap which is separate from the first switch SW1 and the second switch SW2 may be installed on the network NT and a packet may be obtained from the network tap.

In the following descriptions, a packet refers to a packet transmitted and received in communication based on standards of Internet protocol (IP) which is a network protocol. The packet refers to, for example, a packet transmitted and received between the first server SVR1 and the first switch SW1, or a packet transmitted and received between the second server SVR2 and the second switch SW2. The packet refers to, for example, a packet transmitted and received between the first switch SW1 and the network NT or a packet transmitted and received between the second switch SW2 and the network NT. The packet refers to a packet transmitted and received within the network NT.

The packet analyzer AD obtains and analyzes a packet in order to monitor operation states of the first server SVR1 and the second server SVR2, or an operation state of the network NT, for example. Specifically, the packet analyzer AD performs analysis (analysis at the Layer 4 level) for the number of packets which are transmitted and received between the devices within a unit time or for an occurrence status of packet loss. The packet analyzer AD performs analysis (analysis at the Layer 7 level) for a response time including an operation of an application, and the like. The packet analyzer AD processes an analysis result and output the processed analysis result in accordance with a request of a system manager and the like.

The duplicate packet detection apparatus DD obtains a packet analyzed by the packet analyzer AD from the first switch SW1, the second switch SW2, or the network NT. The duplicate packet detection apparatus DD performs duplication determination so as to detect a duplicate packet and delete the duplicate packet, before the obtained packet is transmitted to the packet analyzer AD. The duplicate packet detection apparatus DD transmits a packet after the duplicate packet is deleted to the packet analyzer AD. As a result, the packet analyzer AD may analyze packets excluding the duplicate packet. As described above, the monitoring apparatus that monitors an operation state of the system in the process of being operated or the network is realized by using the packet analyzer AD and the duplicate packet detection apparatus DD.

(Duplicate Packet Detection Apparatus and Capturing Point)

Figure 2:
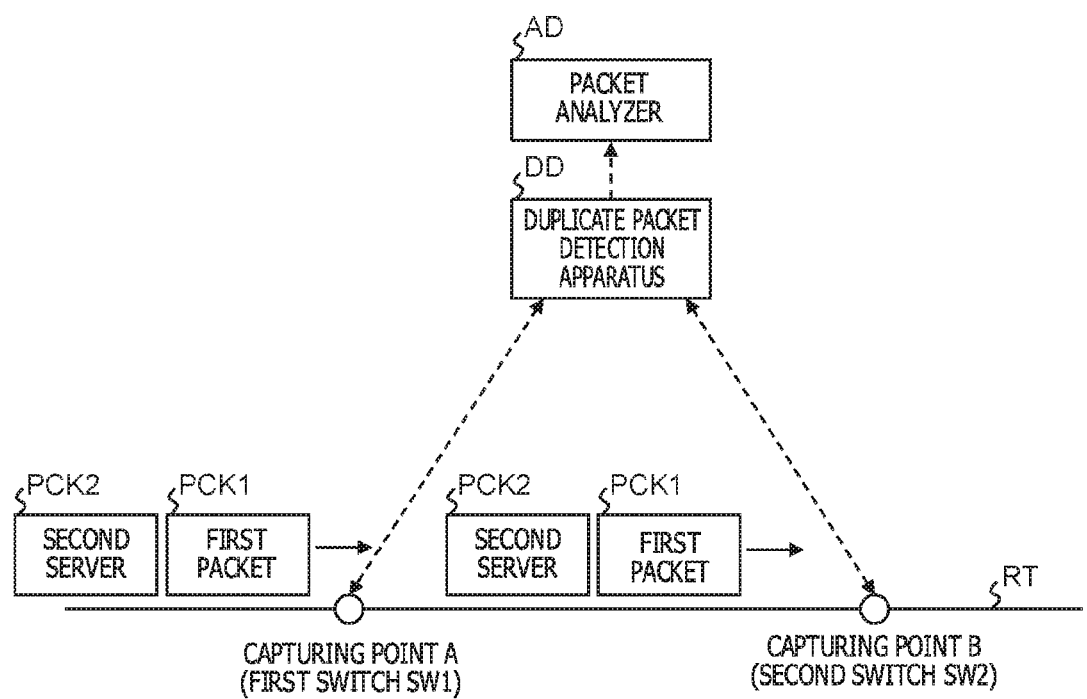
FIG. 2 is a diagram illustrating a relationship between a duplicate packet detection apparatus and a capturing point.

Next, the duplicate packet detection apparatus and a capturing point will be described. FIG. 2 is a diagram illustrating a relationship between the duplicate packet detection apparatus and the capturing point.

As illustrated in FIG. 2, the capturing point is a location at which the duplicate packet detection apparatus DD obtains a packet. A communication route of a packet may be different depending on the type of a service relating to the packet or a configuration of the network NT. Thus, capturing points are generally provided at a plurality of locations. In this manner, since the capturing point are generally provided at the plurality of locations, packets to be used for analysis may be comprehensively obtained. A packet to be analyzed may pass through a plurality of capturing points by setting a route in a communication device constituting the network NT, for example.

In FIG. 2, a case where the same packets pass through a plurality of capturing points will be described. For example, a case where a first packet PCK1 and a second packet PCK2 pass through a route RT in FIG. 2 is assumed. In FIG. 1, the route RT schematically indicates a communication route between the first server SVR1 and the second server SVR2 through the first switch SW1, the network NT, and the second switch SW2. A capturing point A is a capturing point provided in the first switch SW1 in FIG. 1. A capturing point B is a capturing point provided in the second switch SW2 in FIG. 1.

Each of the first packet PCK1 and the second packet PCK2 is duplicated at the capturing point A. The duplicated first packet PCK1 and the duplicated second packet PCK2 are transmitted to the duplicate packet detection apparatus DD. The first packet PCK1 and the second packet PCK2 are transmitted toward the capturing point B. Each of the first packet PCK1 and the second packet PCK2 is duplicated at the capturing point B. The duplicated first packet PCK1 and the duplicated second packet PCK2 are transmitted to the duplicate packet detection apparatus DD.

As described above, the duplicate packet detection apparatus DD receives two first packets PCK1 which are the same as each other and two second packet PCK2 which are the same as each other. That is, in the example, the duplicate packet detection apparatus DD receives four packets. Here, one first packet PCK1 of the two first packets PCK1 is a duplicate packet and one second packet PCK2 of the two second packets PCK2 is a duplicate packet.

The duplicate packet detection apparatus DD performs duplication determination on the obtained packets in order to exclude the duplicate packet, and thus detects the duplicate packet. When the duplicate packet is detected, the duplicate packet detection apparatus DD excludes the detected duplicate packet and transmits packet obtained by excluding the detected duplicate packet from a plurality of obtained packets, to the packet analyzer AD.

An example of the duplication determination, there includes a determination method (appropriately described below as a matching determination method) of performing matching with the stored packet when the packet which has been obtained previously is stored and a new packet is obtained. Every time a new packet is obtained, the matching determination method performs matching of the obtained packet and the stored packet. However, for example, when a packet is transmitted and received in a high-speed communication line (for example, communication line having a communication speed of 10 Gbps), the number of packets having to be stored is increased. Thus, in this case, the number of performing matching is increased, and thus processing burden of the duplication determination becomes greater. When a frequency of performing of the duplication determination exceeds processing capacity of the CPU and the like, overflow may occur and the duplication determination may be incorrectly performed. As a result, it is difficult to perform the duplication determination with high accuracy.

(One Method of Performing Duplication Determination Having Small Processing Burden)

A method (appropriately described below as one method) in which duplication determination having small processing burden is performed by using a continuous (also referred to as "sequential") increase of a value of an identifier which is included in a packet and uniquely identifies the packet for each session or for each device, has been proposed. The identifier is, for example, an IP identifier and the identifier is included in an IP header of a packet. In the one method, a packet is uniquely identified by using the IP identifier.

Here, a case where a value of an IP identifier is sequentially increased will be described. For example, in the example of FIGS. 1 and 2, a case where the first server SVR1 continuously transmits a plurality of packets to the second server SVR2 is assumed. For example, the first server SVR1 transmits the first packet PCK1 and the second packet PCK2 to the second server SVR2 in this order. The first server SVR1 creates a first packet PCK1 including an IP identifier of "1" and creates a second packet PCK2 including an IP identifier of "2", in the transmission.

That is, a device (appropriately described below as a transmission source device) which transmits a packet creates a packet including an IP identifier of "j" (where, j is an integer from 0 to 65535) and transmits the created packet to another device (appropriately described below as a transmission destination device). The transmission source device creates a packet including an IP identifier of "j", and then creates a packet including an identifier (which does not exceed 65535) which is greater than the IP identifier of "j". The transmission source device transmits the created packets to the transmission destination device.

Figure 3:
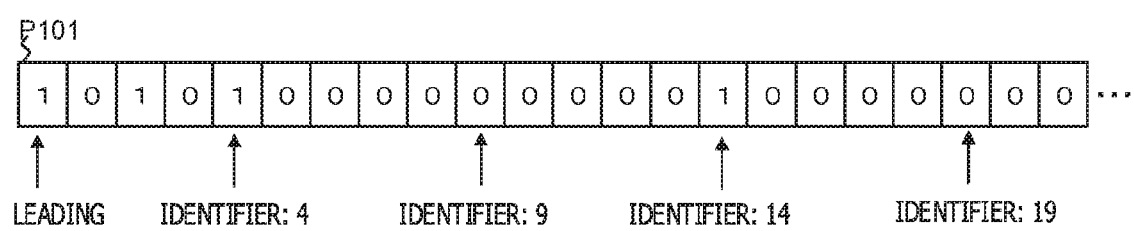
FIG. 3 is a diagram illustrating one method.

FIG. 3 is a diagram illustrating the one method. The reference sign of P101 in FIG. 3 indicates a bit sequence, for example. The bit sequence is a sequence having a plurality of bit areas which store information of a bit unit. The bit sequence is appropriately described below as a bit string. The bit area is indicated by one quadrangular frame in the bit string P101 of FIG. 3.

"Leading" in FIG. 3 indicates a bit area of the top bit (0-th bit) of the bit string P101. Identifiers of 4, 9, 14, and 19 indicate bit areas of the 4-th bit, the 9-th bit, the 14-th bit, and the 19-th bit in the bit string P101. In FIG. 3, " . . . " means ellipsis of a bit string.

In the one method, areas for 65536 bits are ensured in a memory of a device that performs the one method before the duplication determination. In the one method, for example, as illustrated in FIG. 3, the bit string P101 is ensured in the described memory. In the one method, "0" is stored in all bit areas of the bit string P101. When descriptions of the duplication determination performed by the one method are made, for simple descriptions, a case where communication is performed in one session between the devices is exemplified. Communication is set to not be performed in a plurality of sessions between the devices.

In the one method, a packet transmitted by communication performed in the one session which has been described is obtained. In the one method, an IP identifier of the obtained packet is obtained.

In the one method, when a bit area of the bit string P101, which corresponds to the IP identifier of the obtained packet is, for example, "0", "1" is stored in the bit area corresponding to the IP identifier. In the one method, when, for example, "1" is stored in a bit area of the bit string P101, which corresponds to the IP identifier of the obtained packet, the obtained packet is deleted.

Here, a bit area of the bit string P101, which corresponds to the IP identifier of "j" (where, j is an integer from 0 to 65535) is a j-th bit area in the bit string P101.

In the one method, a packet including an IP identifier of "0" is obtained in a state where "0" is stored in all of the bit areas in the bit string P101. Thus, in the one method, "1" is stored in the 0-th (leading) bit area in the bit string P101 in FIG. 3. In the one method, a packet including an IP identifier of "2" is obtained and "1" is stored in the "2"-th bit area in the bit string P101. Subsequently, in the one method, packets respectively including IP identifiers of "4" and "14" are obtained and "1" is stored in the "4"-th bit area and the "14"-th bit area in the bit string P101.

In the one method, it is determined whether or not "1" is stored in a bit area of the bit string P101, which corresponds to the IP identifier of the obtained packet, in parallel with storing in the above-described bit area. In the one method, when "1" is stored in the bit area of the bit string P101, which corresponds to the IP identifier of the obtained packet, this packet is deleted. This packet is a packet (that is, duplicate packet) the same as a packet which has been obtained previously.

According to the above-described one method, if the bit area of the bit string P101, which corresponds to the IP identifier of the obtained packet is used as a reference, it is possible to determine whether or not the obtained packet is a duplicate packet. Thus, according to the one method, performing of matching determination method illustrated in FIG. 2 does not have necessity. Thus, when the matching determination method is performed, a packet which is the same as a newly obtained packet may not be searched for from packets which have been previously obtained. As a result, in the one method, it is possible to reduce processing burden on detection of a duplicate packet.

(Problems of One Method)

However, the value of the IP identifier of a packet may not be sequentially increased for each session or for each device. For example, a portion of an operating system (OS) or a portion of an SSL-VPN server creates an IP identifier randomly, in other words, discontinuously creates an IP identifier. That is, the IP identifier of a packet is not sequentially increased for each session or for each device, and the IP identifier is randomly generated for each session or for each device.

An IP identifier which is created randomly is appropriately described below as a random IP identifier. An SSL is an abbreviation of a "secure sockets layer" and a VPN is an abbreviation of a "virtual private network".

In FIGS. 1 and 2, it is assumed that the first server SVR1 randomly creates the IP identifier. In this assumption, the first server SVR1 creates a first packet PCK1 (see FIG. 2) including an IP identifier of "0" and transmits the created first packet PCK1 to other devices. Then, the first server SVR1 may create a second packet PCK2 (see FIG. 2) including an IP identifier of "0" and transmit the created second packet PCK2 to other devices. The second packet PCK2 is not the same packet as the first packet PCK1.

In the one method, a duplicate packet is detected as illustrated FIG. 3. In the one method, the first packet PCK1 including the IP identifier of "0" is obtained in a state where "0" is stored in all of the bit areas of the bit string P101 in FIG. 3. In the one method, since the 0-th (leading) bit area in the bit string P101 is "0", "1" is stored in the 0-th bit area.

Then, in the one method, the second packet PCK2 including the IP identifier of "0" is obtained. In the one method, since "1" is stored in a bit area (0-th bit area) of the bit string P101, which corresponds to the IP identifier of "0" included in the obtained second packet PCK2, the obtained second packet PCK2 is deleted.

As described above, the second packet PCK2 is not the same packet as the first packet PCK1 and is not a duplicate packet. In this manner, according to the one method, a packet which is not a duplicate packet may be incorrectly determined to be a duplicate packet (appropriately described below as incorrect determination of a duplicate packet), and thus this packet may be deleted. That is, accidental collision of a random IP identifier occurs between different packets. Incorrect determination of the duplicate packet causes accuracy of the duplication determination for a packet to be degraded.

When an IP identifier is randomly created, if n (where, n is an integer of 1 or more) pieces of different packets are obtained, a probability Pa of accidentally creating the same random IP identifiers is indicated by the following Expression 1. This probability has substantially the same meaning as a probability of occurrence of incorrect determination of a duplicate packet in determining of the duplicate packet.

$$P_a = \sum_{k=1}^{n} \frac{(k-1)}{2^{16}} \qquad \text{(Expression 1)}$$

According to Expression 1, in the one method, if 50 pieces of packets are obtained, incorrect determination of the duplicate packet occurs with a probability of about 2%. If 120 pieces of packets are obtained, incorrect determination of the duplicate packet occurs with a probability of about 10%. In this manner, according to the one method, the probability of occurrence of incorrect determination of the duplicate packet by the random IP identifier is increased.

Even when the IP identifier is randomly created, it is desired that the processing burden is reduced and the duplicated packet is deleted with high accuracy. In the embodiments, the duplicate packet detection apparatus DD that causes the processing burden to be reduced and deletes the duplicated packet with high accuracy will be described.

First Embodiment

A configuration of the duplicate packet detection apparatus DD according to a first embodiment will be described with reference to FIGS. 4 and 5. Here, an error detection code included in a packet attracts attention. As the error detection code, a check sum is exemplified below. The check sum has a high probability of having a different value for each packet if various types of data in one packet are different from those in another packet. In the first embodiment, a packet is uniquely identified by using the IP identifier and the check sum, and determination whether or not the obtained packet is a duplicate packet is performed.

(Hardware Block Diagram)

Figure 4:
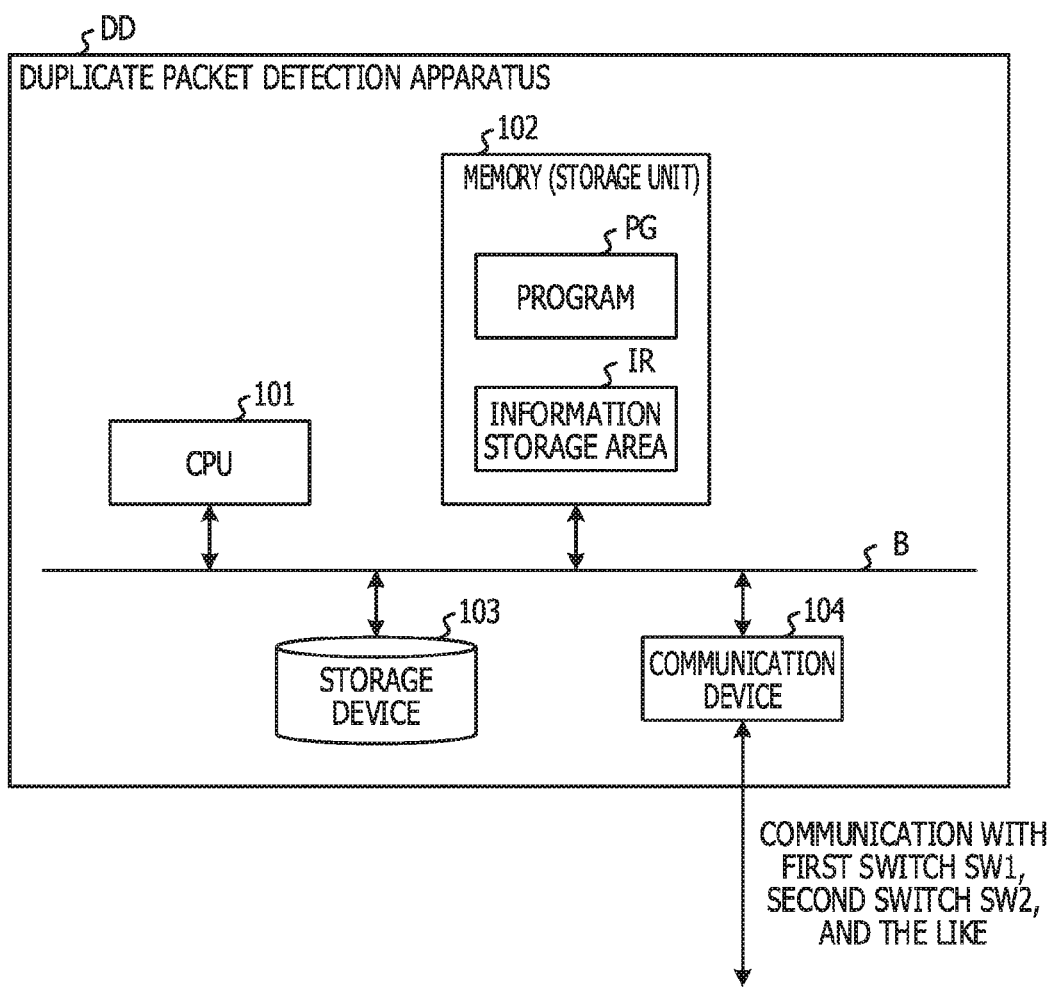
FIG. 4 is a hardware block diagram of the duplicate packet detection apparatus in FIG. 1.

FIG. 4 is a hardware block diagram of the duplicate packet detection apparatus DD in FIG. 1. The duplicate packet detection apparatus DD which is a computer includes a CPU 101, a memory (storage unit) 102, a storage device 103, and a communication device 104 which are coupled to a bus B. In the following descriptions, the memory (storage unit) 102 is appropriately described below as the memory 102.

The CPU 101 is a central processing unit for controlling the duplicate packet detection apparatus DD. The memory 102 temporarily stores information and the like which is created in processes performed by the CPU 101, or in each of steps executed by a program PG.

For example, the memory 102 is a semiconductor memory such as a dynamic random access memory (DRAM). The memory 102 has, for example, an information storage area IR for storing information to be used for performing duplicate packet detection processing.

For example, the storage device 103 is a mass storage device such as a hard disk drive (HDD) and a solid state drive (SSD). The storage device 103 stores the program PG in a program storing area (not illustrated) in the storage device 103, for example. The program PG is used for performing processing (also referred to as duplicate packet detection processing) of detecting a duplicate packet. When the duplicate packet detection apparatus DD is started, the CPU 101 loads the program PG in the memory 102 from the storage device 103 and performs the duplicate packet detection processing in cooperation with the program PG.

The communication device 104 includes a network interface card (NIC), for example. The communication device 104 is coupled to a network and communicates with other devices. The communication device 104 communicates with the first switch SW1 and the second switch SW2 in FIG. 1, for example. The communication device is also referred to as an input/output (I/O) device.

(Software Block Diagram)

Figure 5:
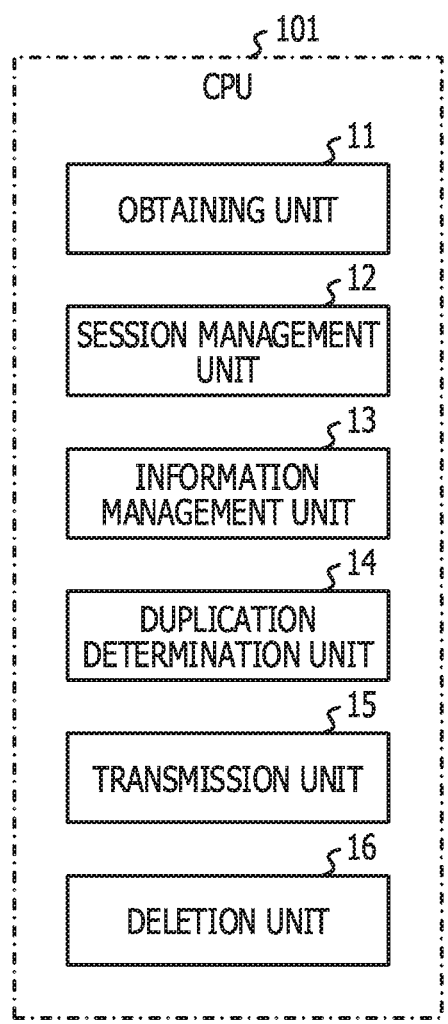
FIG. 5 is a software block diagram of a duplicate packet detection apparatus according to a first embodiment.

FIG. 5 is a software block diagram of the duplicate packet detection apparatus DD according to the first embodiment. In the software block diagram, the CPU 101 which is hardware is indicated by a dashed line.

The CPU 101 cooperates with the program PG (see FIG. 4) so as to function as, for example, an obtaining unit 11, a session management unit 12, an information management unit 13, and a duplication determination unit 14. The CPU 101 cooperates with the program PG so as to function as, for example, a transmission unit 15 and a deletion unit 16.

For example, the obtaining unit 11 obtains a packet to be analyzed by the packet analyzer AD, through the communication device 104 in FIG. 4. The obtaining unit 11 obtains a packet, for example, at one or more capturing points which are provided in the network on which packets are transmitted and received.

The session management unit 12 stores, for example, information (information for specifying a session) as session information IF2 (see FIG. 8) in the information storage area IR. The stored information relates to a session in which packets obtained by the obtaining unit 11 are transmitted and received. The packet obtained by the obtaining unit 11 is appropriately described below as an obtained packet.

A session is established between a first device (for example, first server SVR1) and a second device (for example, second server SVR2) which transmit and receive a packet to and from each other. The session is a logical coupling relationship between the devices which transmit and receive a packet to and from each other. Before a packet is transmitted and received, a session is established between the devices that perform transmission and reception of a packet.

The information management unit 13 stores, for example, management information IF3 (see FIG. 8) in the information storage area IR. The management information IF3 is information for managing an IP identifier which is included in an IP header of a packet and a check sum which is included in a TCP header or a UDP header of a packet. The management information IF3 is stored in correspondence with the IP identifier and the check sum. A TCP is an abbreviation of a "transmission control protocol" and a UDP is an abbreviation of a "user datagram protocol".

The check sum included in the IP header is not used. This has the two following reasons. A first reason is because the check sum included in the IP header may be changed if a router transmits a packet. A second reason is because there is a probability of causing check sums included in the IP header to be the same when IP identifiers is the same in the same session.

The IP header includes a transmission source IP, a transmission destination IP, and the like. The transmission source IP is information for specifying a transmission source device of the packet. The transmission destination IP is information for specifying a transmission destination device of the packet. The IP header is added to each packet. The transmission source device of a packet randomly assigns an IP identifier to the packet.

Each of the TCP header and the UDP header includes a transmission source port, a transmission destination port, a check sum, and the like. In the following descriptions, the check sum means a check sum included in the TCP header or the UDP header as long as there is no specific notice.

Figure 8:
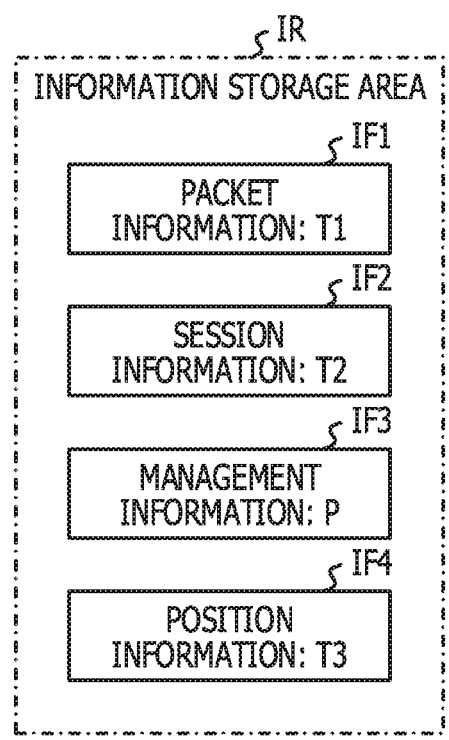
FIG. 8 is a schematic diagram illustrating a state where various types of information are stored in an information storage area in FIG. 4, in the first embodiment.

Information indicating a position (also referred to as an address) at which the management information IF3 of each session is stored in the memory 102 is stored in the memory 102, as storing position information IF4 (see FIG. 8).

For example, if the obtaining unit 11 obtains a packet, the duplication determination unit 14 determines whether the obtained packet is a duplicate packet, in response to obtaining of the packet.

When the duplication determination unit 14 determines that the obtained packet is not the duplicate packet, the transmission unit 15 outputs the obtained packet. Specifically, the transmission unit 15 transmits the obtained packet to the packet analyzer AD. The transmission unit 15 may stores the obtained packet in the storage device 103 of the duplicate packet detection apparatus DD before the obtained packet is transmitted to the packet analyzer AD.

When the duplication determination unit 14 determines that the obtained packet is the duplicate packet, the deletion unit 16 deletes the obtained packet.

(Packet)

Figure 6A:
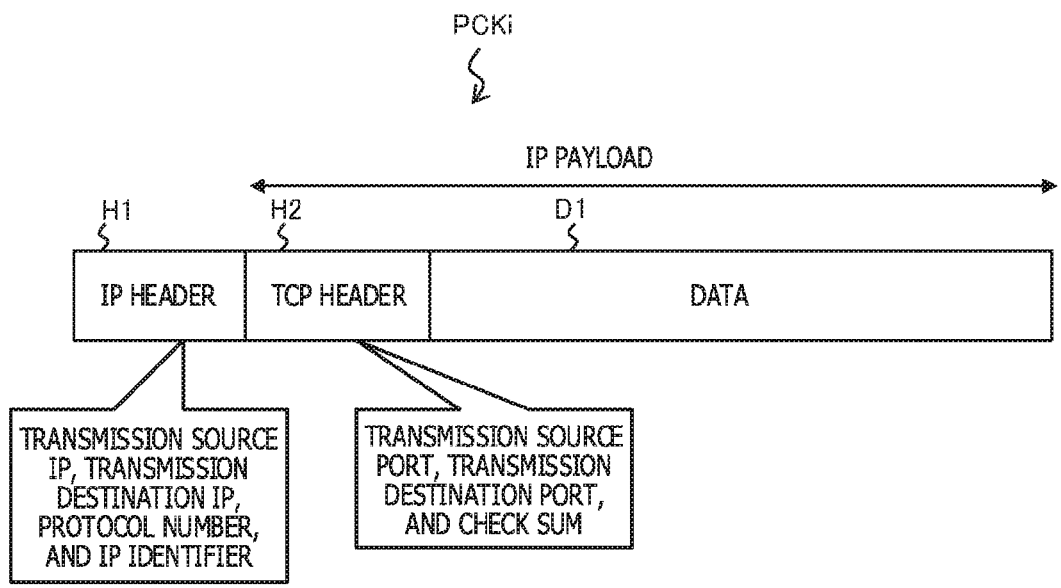
FIGS. 6A and 6B are diagrams illustrating a configuration of a packet.
Figure 6B:
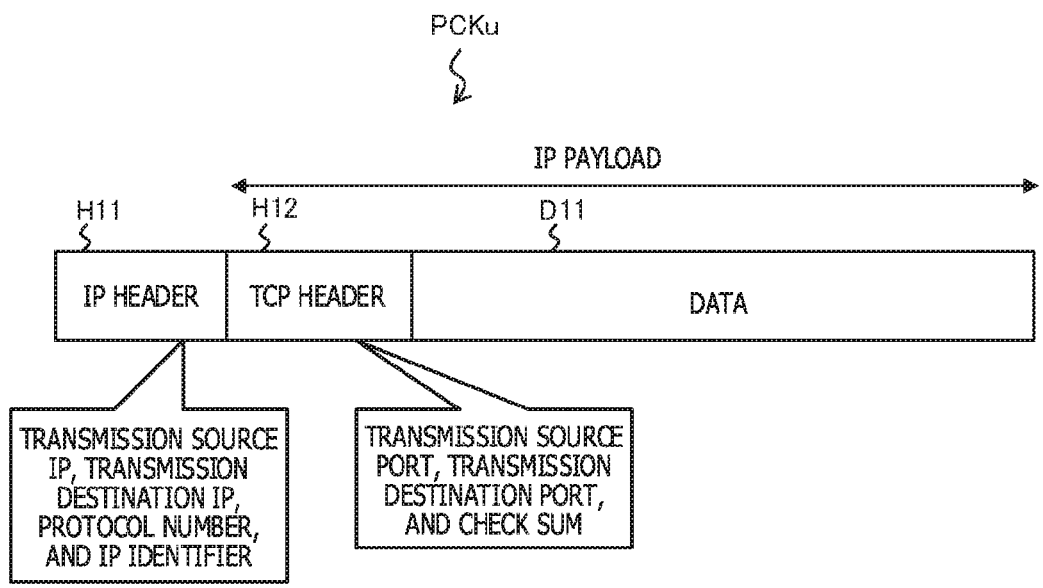

FIGS. 6A and 6B are diagram illustrating a configuration of a packet. FIG. 6A schematically illustrates the configuration of a packet which is transmitted and received by communication using a TCP protocol. FIG. 6B schematically illustrates the configuration of a packet which is transmitted and received by communication using a UDP protocol. The UDP is an abbreviation of a "user datagram protocol"

A packet PCKi illustrated in FIG. 6A includes an IP header H1, a TCP header H2, and data D1. The IP header H1 includes a transmission source IP, a transmission destination IP, a protocol number, and an IP identifier, for example. The TCP header H2 includes a transmission source port number, a transmission destination port number, and a check sum, for example. The port number is appropriately described below as a port. The data D1 is transmission data which is to be transmitted by the transmission source device. An IP payload in FIG. 6A includes the TCP header H2 and the data D1.

A packet PCKu illustrated in FIG. 6B includes an IP header H11, a UDP header H12, data D11. The IP header H11 includes a transmission source IP, a transmission destination IP, a protocol number, and an IP identifier, for example. The UDP header H12 includes a transmission source port, a transmission destination port, and a check sum, for example. The data D2 is so-called transmission data. An IP payload in FIG. 6B includes the UDP header H12 and the data D11.

The program PG in FIG. 4 obtains an IP identifier and a check sum of a packet and performs determination of a duplicate packet based on the obtained IP identifier and the obtained check sum.

(Detection Processing for Duplicate Packet)

Figure 7:
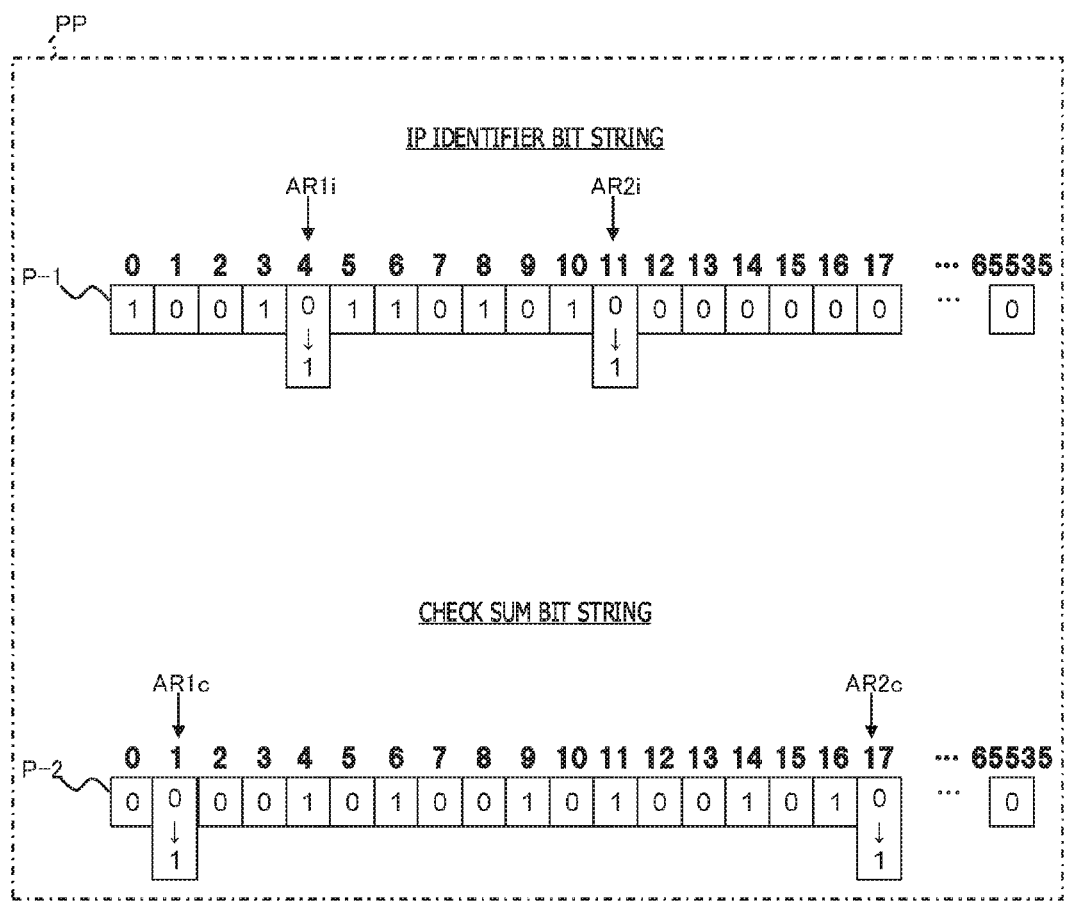
FIG. 7 is a diagram illustrating a detection of a duplicate packet.

FIG. 7 is a diagram illustrating a detection of a duplicate packet. FIG. 7 illustrates a set of sequences (appropriately described below as a set of bit strings) including two bit strings. A set of bit strings PP includes an IP identifier bit string P-1 and a check sum bit string P-2. In the following descriptions, " . . . " indicates ellipsis.

Each of the IP identifier bit string P-1 and the check sum bit string P-2 is a sequence having 65536 bit areas (also referred to as storage areas) which store information (that is, 0 or 1) of a bit unit. FIG. 7 schematically illustrates these bit areas with quadrangular frames. The information of the bit unit stored in the bit areas is schematically indicated by using a numeric value of "0" or "1" in the quadrangular frame.

Numeric values (see bold numeric value) from 0 to 65535 illustrated over quadrangular frames of the IP identifier bit string P-1 are numeric value corresponding to the IP identifier by one-to-one. In the following descriptions, a bit area corresponding to an IP identifier of "j" (where, j is an integer from 0 to 65535) is a quadrangular frame indicated by the IP identifier of "j".

Numeric values (see bold numeric value) from 0 to 65535 illustrated over quadrangular frames of the check sum bit string P-2 are numeric value corresponding to the check sum by one-to-one. In the following descriptions, a bit area corresponding to a check sum of "k" (where, k is an integer from 0 to 65535) is a quadrangular frame indicated by the check sum of "k".

"0↓1" ("↓" is a downward arrow) in the quadrangular frame of FIG. 7 schematically indicates that the numeric value of "0" stored in the bit area is changed to the numeric value of "1".

Next, detection processing for a duplicate packet according to the first embodiment will be described. When a new session is initiated between the devices, the information management unit 13 in FIG. 5 ensures an IP identifier bit string P-1 and a check sum bit string P-2 of the session in the memory 102. The information management unit 13 stores leading addresses (also referred to as pointers) of the IP identifier bit string P-1 and the check sum bit string P-2 in the memory 102. In the following descriptions, the leading address of the IP identifier bit string P-1 is indicated by the reference sign of "P-1" and the leading address of the check sum bit string P-2 is indicated by the reference sign of "P-2".

If the obtaining unit 11 obtains a packet, the duplication determination unit 14 determines whether a first information (for example, "1") corresponding to the IP identifier included in the obtained packet is stored in a storage unit, (performs first determination) in response to obtaining of the packet. The storage unit is the memory 102, for example. The storage unit may be the storage device 103.

The duplication determination unit 14 determines whether a second information (for example, "1") corresponding to the check sum included in the obtained packet is stored in a storage unit, (performs second determination) in response to obtaining of the packet. The first determination and the second determination are also referred to as duplication determination. Regarding n order of the first determination and the second determination, either of the first determination and the second determination may be performed earlier.

The detection processing of a duplicate packet will be specifically described. If a new session is initiated, the information management unit 13 ensures a set of bit strings in the storage unit. The set of bit strings includes a sequence for an identifier (appropriately described below as an IP identifier bit string) and a sequence for a code (appropriately described below as a check sum bit string). The IP identifier bit string is a sequence having a plurality of areas (also referred to as a bit area) which store first information corresponding to an IP identifier included in the obtained packet, in a unit of one bit. The check sum bit string is a sequence having a plurality of areas which store second information corresponding to a check sum included in the obtained packet, in a unit of one bit. If a new set of bit strings is ensured, the information management unit 13 stores, for example, "0" in all bit areas of the set of bit strings.

In the example of FIG. 7, the information management unit 13 ensures a set of bit strings PP including the IP identifier bit string P-1 and the check sum bit string P-2, in the memory 102. The information management unit 13 stores "0" in all of the bit area of the ensured IP identifier bit string P-1 and the ensured check sum bit string P-2.

When the first information is stored in a first bit area of the IP identifier bit string of the set of bit strings, which corresponds to the IP identifier of the obtained packet, in the first determination, the duplication determination unit 14 determines that the first information is stored in the storage unit. When the second information is stored in a second bit area of the check sum bit string of the set of bit strings, which corresponds to the check sum of the obtained packet, in the second determination, the duplication determination unit 14 determines that the second information is stored in the storage unit.

When the duplication determination unit 14 determines that the first information is stored in the storage unit and the second information is stored in the storage unit, the deletion unit 16 deletes the obtained packet.

When the duplication determination unit 14 determines that the first information has not been stored in the storage unit, the information management unit 13 stores the first information in the storage unit. Specifically, when the first information has not been stored in the first bit area, the information management unit 13 stores the first information in the first bit area corresponding to the IP identifier which is included in the obtained packet.

When the duplication determination unit 14 determines that the second information has not been stored in the storage unit, the information management unit 13 stores the second information in the storage unit. Specifically, when the second information has not been stored in the second bit area, the information management unit 13 stores the second information in the second bit area corresponding to the check sum which is included in the obtained packet.

The first bit area is a bit area indicated by an address obtained by adding the IP identifier which is included in the obtained packet, to a leading address of the IP identifier bit string.

In the example of FIG. 7, the first bit area is a bit area indicated by an address obtained by adding the IP identifier of "j" which is included in the obtained packet, to a leading address of the IP identifier bit string P-1. The leading address is an address of a leading portion of the IP identifier bit string P-1 when the IP identifier bit string P-1 is ensured in the memory 102. For example, when an IP identifier included in the obtained packet is "4", the first bit area is a bit area indicated by the reference sign of AR1*i* in FIG. 7.

As described above, since the IP identifier bit string includes a plurality of one-bit bit areas, the IP identifier of "j" (where, j is an integer from 0 to 65535) and the bit area corresponding to the IP identifier of "j" have one-to-one correspondence. Such correspondence allows the CPU 101 to rapidly use a bit area corresponding to the IP identifier of "j", as a reference, based on the IP identifier of "j" and the leading address of the IP identifier bit string.

The second bit area is a bit area indicated by an address obtained by adding the check sum which is included in the obtained packet, to a leading address of the check sum bit string.

In the example of FIG. 7, the second bit area is a bit area indicated by an address obtained by adding the check sum of "k" which is included in the obtained packet, to a leading address of the check sum bit string P-2. The leading address is an address of a leading portion of the check sum bit string P-2 when the check sum bit string P-2 is ensured in the memory 102. For example, when a check sum included in the obtained packet is "1", the second bit area is a bit area indicated by the reference sign of AR1*c* in FIG. 7.

As described above, since the check sum bit string includes a plurality of one-bit bit areas, the check sum of "k" (where, k is an integer from 0 to 65535) and the bit area corresponding to the check sum of "k" have one-to-one correspondence. Such correspondence allows the CPU 101 to rapidly use a bit area corresponding to the check sum of "k", as a reference, based on the check sum of "k" and the leading address of the check sum bit string.

The detection processing for the duplicate packet will be described with reference to FIG. 7. The obtaining unit 11 in FIG. 5 sequentially obtains packets transmitted between the devices in the described new session. For example, the obtaining unit 11 obtains the first to the third packets. The first to the third packets are packets transmitted to the transmission destination device from the transmission source device in the described new session. "0" is stored in all of the bit areas of the IP identifier bit string P-1 and the check sum bit string P-2.

The information management unit 13 obtains an IP identifier and a check sum from each of the first to the third packets which are obtained by the obtaining unit 11. The information management unit 13 obtains the IP identifier of "4" and the check sum of "1" from the first packet.

The first information (for example, "1") is not stored in the bit area of the IP identifier bit string P-1 of the set of bit strings PP, which corresponds to the IP identifier of "4" of the first packet (see the reference sign of AR1*i* in FIG. 7). The second information is not stored in the bit area of the check sum bit string P-2 of the set of bit strings PP, which corresponds to the check sum of "1" of the first packet (see the reference sign of AR1*c* in FIG. 7).

Accordingly, the duplication determination unit 14 determines that the first information is not stored in the memory 102 and the second information is not stored in the memory 102. That is, the duplication determination unit 14 determines that the first packet is not a duplicate packet.

The information management unit 13 stores the first information (for example, "1") in the bit area of the IP identifier bit string P-1 of the described set of bit strings PP (see "0↓1" indicated by the reference sign of AR1*i* in FIG. 7). The information management unit 13 stores the second information in the bit area of the check sum bit string P-2 of the described set of bit strings PP (see "0↓1" indicated by the reference sign of AR1*c* in FIG. 7).

Since it is determined that the first packet is not a duplicate packet, the transmission unit 15 transmits the first packet to the packet analyzer AD.

Then, the information management unit 13 obtains an IP identifier of "11" and a check sum of "17" from a second packet.

The first information (for example, "1") is not stored in the bit area of the IP identifier bit string P-1 of the described set of bit strings PP, which corresponds to the IP identifier of "11" of the second packet (see the reference sign of AR2*i* in FIG. 7). The second information (for example, "1") is not stored in the bit area of the check sum bit string P-2 of the described set of bit strings PP, which corresponds to the check sum of "17" of the second packet (see the reference sign of AR2*c* in FIG. 7).

Accordingly, the duplication determination unit 14 determines that the first information is not stored in the memory 102 and the second information is not stored in the memory 102. That is, the duplication determination unit 14 determines that the second packet is not a duplicate packet.

The information management unit 13 stores the first information (for example, "1") in the bit area of the IP identifier bit string P-1 of the described set of bit strings PP (see "0↓1" indicated by the reference sign of AR2*i* in FIG. 7). The information management unit 13 stores the second information in the bit area of the check sum bit string P-2 of the described set of bit strings PP (see "0↓1" indicated by the reference sign of AR2*c* in FIG. 7).

Since it is determined that the second packet is not a duplicate packet, the transmission unit 15 transmits the second packet to the packet analyzer AD.

Then, the information management unit 13 obtains an IP identifier of "4" and a check sum of "1" from a third packet. The third packet is the same packet as the first packet and is so-called a duplicate packet. The first information (for example, "1") is stored in the bit area of the IP identifier bit string P-1 of the set of bit strings PP, which corresponds to the IP identifier of "4" of the third packet (see the reference sign of AR1*i* in FIG. 7). The second information (for example, "1") is stored in the bit area of the check sum bit string P-2 of the set of bit strings PP, which corresponds to the check sum of "1" of the third packet (see the reference sign of AR1*c* in FIG. 7).

Accordingly, the duplication determination unit 14 determines that the first information is stored in the memory 102 and the second information is stored in the memory 102. That is, the duplication determination unit 14 determines that the third packet is a duplicate packet. In other words, the duplication determination unit 14 detects the third packet as a duplicate packet.

Since it is determined that the third packet is a duplicate packet, the deletion unit 16 deletes the third packet. Such deletion causes the third packet which is a duplicate packet not to be transmitted to the packet analyzer AD.

When an IP identifier is randomly created, if n (where, n is an integer of 1 or more) pieces of different packets are obtained, a probability Pb of accidentally creating the same random IP identifiers is indicated by the following Expression 2. This probability has substantially the same meaning as a probability of occurrence of incorrect determination of a duplicate packet in determining of the duplicate packet.

$$P_b = \sum_{k=1}^{n} \left\{ \frac{(k-1)}{2^{16}} \right\}^2 \quad \text{(Expression 2)}$$

According to Expression 2, if the duplicate packet detection apparatus DD according to the first embodiment obtains 500 pieces of packets, incorrect determination of a duplicate packet occurs with a probability of about 1%. If 640 pieces of packets are obtained, incorrect determination of a duplicate packet occurs with a probability of about 2%. In the one method, as described above, if 50 pieces of packets are obtained, incorrect determination of a duplicate packet occurs with a probability of about 2%, and if 120 pieces of packets are obtained, incorrect determination of a duplicate packet occurs with a probability of about 10%.

With the above descriptions, according to the first embodiment, the incorrect determination of a duplicate packet occurs less than that in the one method, and thus it is possible to perform duplication determination with high accuracy.

The duplicate packet detection apparatus DD according to the first embodiment stores management information in a bit unit (that is, "0" or "1") in order to determine whether or not the obtained packet is a duplicate packet. In a case of the example in FIG. 7, the management information is stored in a storage area (65536×2 bits) of two bit strings, and the determination processing for a duplicate packet is performed. As a result, it is possible to reduce storage volume of the management information.

The duplicate packet detection apparatus DD stores the management information of the obtained packet in the bit area of the IP identifier bit string, which corresponds to the IP identifier of the obtained packet, and in the bit area of the check sum bit string, which corresponds to the check sum of the obtained packet. The duplicate packet detection apparatus DD can access the bit areas storing the management information based on the values of the IP identifier and the check sum of the obtained packet, by using such storing. As a result, when the CPU 101 of the duplicate packet detection apparatus DD causes the management information to be stored or when the CPU 101 of the duplicate packet detection apparatus DD performs determination for a duplicate packet, it is possible to reduce processing load occurring when a storing position of the management information is searched for and an access to the storing position is performed.

If a session is initiated, the duplicate packet detection apparatus DD ensures a storage area (for example, the IP identifier bit string and the check sum bit string) for storing the management information. Thus, every time a packet is obtained, the duplicate packet detection apparatus DD does not have to ensure the storage area for storing the management information and create information for managing the storage area. As a result, it is possible to reduce the processing load and to improve a speed of duplication determination processing.

The duplicate packet detection apparatus DD does not perform storing in cooperation with (in other words, in correlation with) the management information, in storing of the management information for the IP identifier of the obtained packet and in storing of the management information for the check sum of the obtained packet. That is, the management information for the IP identifier and the management information for the check sum are individually stored. Thus, since information for the cooperation does not have to be stored, burden on the storage capacity of the memory 102 is reduced, and since information for the cooperation does not have to be searched for, it is possible to reduce the processing load.

(Information Storage Area)

Next, the detection processing for a duplicate packet in the first embodiment will be described in detail with reference to FIGS. 8 to 16.

FIG. 8 is a schematic diagram illustrating a state where various types of information are stored in the information storage area IR of FIG. 4, in the first embodiment. For example, packet information IF1, session information IF2, management information IF3, and storing position information IF4 are stored in the information storage area IR.

FIG. 9 is a diagram illustrating the packet information IF1 in FIG. 8. The packet information corresponds to various types of information regarding the obtained packet. The packet information is stored in the memory 102 in a table format illustrated in FIG. 9. A state where a packet information table T1 is stored as the packet information IF1 in the memory 102 is schematically illustrated by "packet information: T1" in FIG. 8.

The packet information table T1 includes a packet leading address field, a session identifier field, an IP identifier field, a check sum field, an IP identifier duplication flag field, and a check sum duplication flag field. The specific details of each of the fields will be described by using a specific example which will be described later.

FIG. 10 is a diagram illustrating the session information IF2 in FIG. 8. The session information IF2 corresponds to various types of information regarding a session. The session information is stored in the memory 102 in a table format illustrated in FIG. 10. A state where a session information table T2 is stored as the session information IF2 in the memory 102 is schematically illustrated by "session information: T2" in FIG. 8.

The session information table T2 includes a session identifier field, a transmission source IP field, a transmission destination IP field, a protocol number field, a transmission source port field, and a transmission destination port field. The specific details of each of the fields will be described by using a specific example which will be described later.

FIG. 11 is a diagram illustrating the management information IF3 in FIG. 8. The management information IF3 is stored in the memory 102 in a bit string format illustrated in FIG. 11. A state where sets pp1 and pp2 of bit strings are stored as the management information IF3 in the memory 102 is schematically illustrated by "management information: P" in FIG. 8.

The set pp1 of bit strings includes an IP identifier bit string p1-1 and a check sum bit string p1-2. The set pp2 of bit strings includes an IP identifier bit string p2-1 and a check sum bit string p2-2. The IP identifier bit strings p1-1 and p2-1 have a configuration similar to that of the IP identifier bit string P-1 in FIG. 7. The check sum bit strings p1-2 and p2-2 have a configuration similar to that of the check sum bit string P-2 in FIG. 7.

In the first embodiment, the information management unit 13 creates one set of bit strings for each session.

FIG. 12 is a diagram illustrating the position information IF4 in FIG. 8. The position information IF4 is information indicating a storing position of the management information corresponding to the session. The position information IF4 is stored in the memory 102 in a table format illustrated in FIG. 12. A state where a position information table T3 is stored as the position information IF4 in the memory 102 is schematically illustrated by "position information: T3" in FIG. 8.

The position information table T3 includes a session identifier field, a management bit address-IP identifier field, and a management bit address-check sum field. The specific details of each of the fields will be described by using a specific example which will be described later.

(Flow of Detection of Duplicate Packet)

Next, details of the first embodiment will be described. FIGS. 13 to 16 are respectively a first flowchart to a fourth flowchart illustrating details of the duplicate packet detection processing in the first embodiment. Details of the duplicate packet detection processing will be described with reference to FIGS. 9 to 12.

(Obtaining of Header Information)

The obtaining unit 11 of the duplicate packet detection apparatus DD determines whether a packet is obtained at a capturing point (S11). When the packet is not obtained (S11/NO), the obtaining unit 11 continuously maintains a state of waiting for obtaining of the packet. When the packet is obtained at the capturing point (S11/YES), the obtaining unit 11 obtains header information from the obtained packet (S12).

Specifically, the obtaining unit 11 stores the obtained packet in the memory 102 (S12). The obtaining unit 11 stores various types of information regarding the obtained packet in the packet information table T1 of FIG. 9. Before the storing, initialization is performed by storing "0" (for example, NULL) in the packet information table T1 of FIG. 9.

The obtaining unit 11 stores a leading address of the obtained packet which has been stored in the memory 102, in the packet leading address field of the packet information table T1 in FIG. 9 (see "padr" in FIG. 9). The obtaining unit 11 may store information (also referred to as offset) indicating data length of the packet.

The obtaining unit 11 obtains a transmission source IP, a transmission destination IP, and a protocol number (also referred to as protocol information) of the obtained packet with reference to an IP header (S12). Examples of the protocol number include a protocol number of the TCP and a protocol number of the UDP.

The obtaining unit 11 obtains a transmission source port and a transmission destination port of the obtained packet with reference to a TCP header (or UDP header) (S12). In the subsequent descriptions, for concise descriptions, a case where a packet has a TCP header and does not have a UDP header will be described.

That is, the obtaining unit 11 obtains information desired for specifying a session in which the obtained packet is transmitted and received, from the IP header and the TCP header of the obtained packet. As will be described later, the session management unit 12 uniquely specifies a session in communication between the transmission source device and the transmission destination device, by using this obtaining. In the first embodiment, the obtaining unit 11 obtains a packet having a state where at least the IP header and the TCP header are not encapsulated (also referred to as encrypted).

Specifically, the obtaining unit 11 specifies a position at which information obtained in the IP header or the TCP header of the obtained packet is set, in accordance with, for example, formats of the IP header and the TCP header and obtains the information. In such obtaining, the obtaining unit 11 obtains a transmission source IP and the like included in the IP header, for example, with reference to the format of the IP header. The obtaining unit 11 specifies a leading position of an IP payload (that is, TCP header) of the obtained packet based on a header length included in the IP header, with reference to the format of the IP header. The obtaining unit 11 obtains a transmission source port and the like included in the TCP header with reference to, for example, the format of the TCP header.

(Specifying of Session)

The session management unit 12 specifies a session of the obtained packet based on information for specifying the session included in the obtained packet, in response to obtaining of the packet (S13). The session management unit 12 specifies session information and uniquely specifies the session of the obtained packet based on the specified session information (S13). The session information is information including a transmission source IP, a transmission destination IP, a protocol number, a transmission source port, and a transmission destination port.

The reason of specifying the session will be described. In a network, normally, communication is performed in each of a plurality of sessions and a packet is transmitted and received in communication. Thus, the duplicate packet detection apparatus DD specifies the session in order to detect a duplicate packet for each session. The duplicate packet detection apparatus DD ensures a set of bit strings for storing the management information, for each session.

(Communication by Using New Session)

Then, the session management unit 12 determines whether or not, for example, session information of the specified session is stored in the information storage area IR (S14). The session management unit 12 determines whether communication by using a new session is performed, in S14.

When the session information is not stored (S14/NO), the session management unit 12 stores session information of a session (that is, new session) of the obtained packet in the information storage area IR, based on, for example, information included in the obtained IP header (S15).

As a case where the session management unit 12 determines that the session information is not stored, in determination of S14 (S14/NO), there is the following case. That is, all of the transmission source IP, the transmission destination IP, the protocol number, the transmission source port, and the transmission destination port which are obtained in S12 may not be stored in the same line of the session information table T2 in FIG. 10.

Specific descriptions will be made. Here, the session information table T2 in FIG. 10 is set to be in an initialized state and is set to not store information (that is, blank).

The session management unit 12 creates a session identifier (for example, "1") for uniquely specifying a new session and stores the created session identifier in the session identifier field of the session information table T2 in FIG. 10 (S15). Here, it is assumed that the obtaining unit 11 obtains a transmission source IP of "10.20.30.40", a transmission destination IP of "10.20.30.50", a protocol number of "6", a transmission source port of "2000", and a transmission destination port of "20" in S12.

The session management unit 12 respectively stores the transmission source IP of "10.20.30.40" and the transmission destination IP of "10.20.30.50" correlated with the session identifier of "1" in the transmission source IP field and the transmission destination IP field of the session information table T2 in FIG. 10 (S15). The session management unit 12 stores the protocol number of "6" correlated with the session identifier of "1" in the protocol number field of the session information table T2 in FIG. 10 (S15). The session management unit 12 respectively stores the transmission source port of "2000" and the transmission destination port of "20" correlated with the session identifier of "1" in the transmission source port field and the transmission destination port field of the session information table T2 in FIG. 10 (S15).

Then, the session management unit 12 stores the created session identifier (for example, "1") in the session identifier field of the storing position information table T3 in FIG. 12 (see "1" in the session identifier field) (S15). Descriptions of other information in the session information table T2 of FIG. 10 will be omitted.

(Ensuring of Set of Bit Strings)

After the process of S15 is ended, the information management unit 13 performs the processes of S16 and S17, and thus ensures a set of bit strings corresponding to a new session. The information management unit 13 ensures an IP identifier bit string of the new session (S16). Specifically, the information management unit 13 ensures the IP identifier bit string p1-1 illustrated in FIG. 11, in the memory 102. When the IP identifier bit string p1-1 is ensured in the memory 102, the information management unit 13 stores "0" in all of the bit areas of the IP identifier bit string p1-1.

The information management unit 13 stores the leading address of the IP identifier bit string p1-1 correlated with the newly-created session identifier, in the management bit address-IP identifier field of the storing position information table T3 in FIG. 12. In the example of FIG. 12, the information management unit 13 stores the leading address (for example, "p1-1") of the IP identifier bit string p1-1 correlated with the session identifier of "1", in the management bit address-IP identifier field of the storing position information table T3 in FIG. 12.

Then, the information management unit 13 ensures a check sum bit string of the new session (S17). Specifically, the information management unit 13 ensures the check sum bit string p1-2 illustrated in FIG. 11, in the memory 102. When the check sum bit string p1-2 is ensured in the memory 102, the information management unit 13 stores "0" in all of the bit areas of the check sum bit string p1-2.

The information management unit 13 stores the leading address of the check sum bit string p1-2 correlated with the newly-created session identifier, in the management bit address-check sum field of the storing position information table T3 in FIG. 12. In the example of FIG. 12, the information management unit 13 stores the leading address (for example, "p1-2") of the check sum bit string p1-2 correlated with the session identifier of "1", in the management bit address-check sum field of the storing position information table T3 in FIG. 12. Descriptions of other information in FIG. 12 will be omitted.

If the process of S17 is ended, the session management unit 12 stores the newly-created session identifier in the session identifier field of the packet information table T1 in FIG. 9. Then, the process proceeds to S18.

When the session management unit 12 determines that the session information is stored, in determination of S14 (S14/YES), the session management unit 12 obtains the session identifier which is stored corresponding to the session information, from the session identifier field of the session information table T2 in FIG. 10. The session management unit 12 stores the obtained identifier in the session identifier field of the packet information table T1 in FIG. 9. Then, the process proceeds to S18.

As a case where the session management unit 12 determines that the session information is stored, in determination of S14 (S14/YES), there is the following case. That is, all of the transmission source IP, the transmission destination IP, the protocol number, the transmission source port, and the transmission destination port which are specified in S13 may not be stored in the same line of the session information table T2 in FIG. 10.

(Obtaining of IP Identifier and Check Sum)

For example, the information management unit 13 obtains an IP identifier (for example, 23456) included in the IP header of the obtained packet, and obtains a check sum (for example, 56789) included in the TCP header of the obtained packet (S18).

The information management unit 13 stores the obtained IP identifier which is correlated with the packet leading address (see "padr" in FIG. 9), in the IP identifier field of the packet information table T1 in FIG. 9 (see "23456" in the IP identifier field). The information management unit 13 stores the obtained check sum which is correlated with the packet leading address (see "padr" in FIG. 9), in the check sum field of the packet information table T1 in FIG. 9 (see "56789" in the check sum field). After the IP identifier and the check sum are obtained, the process proceeds to S19 in FIG. 14.

(Duplication Determination and Storing Processing of IP Identifier)

Figure 14:
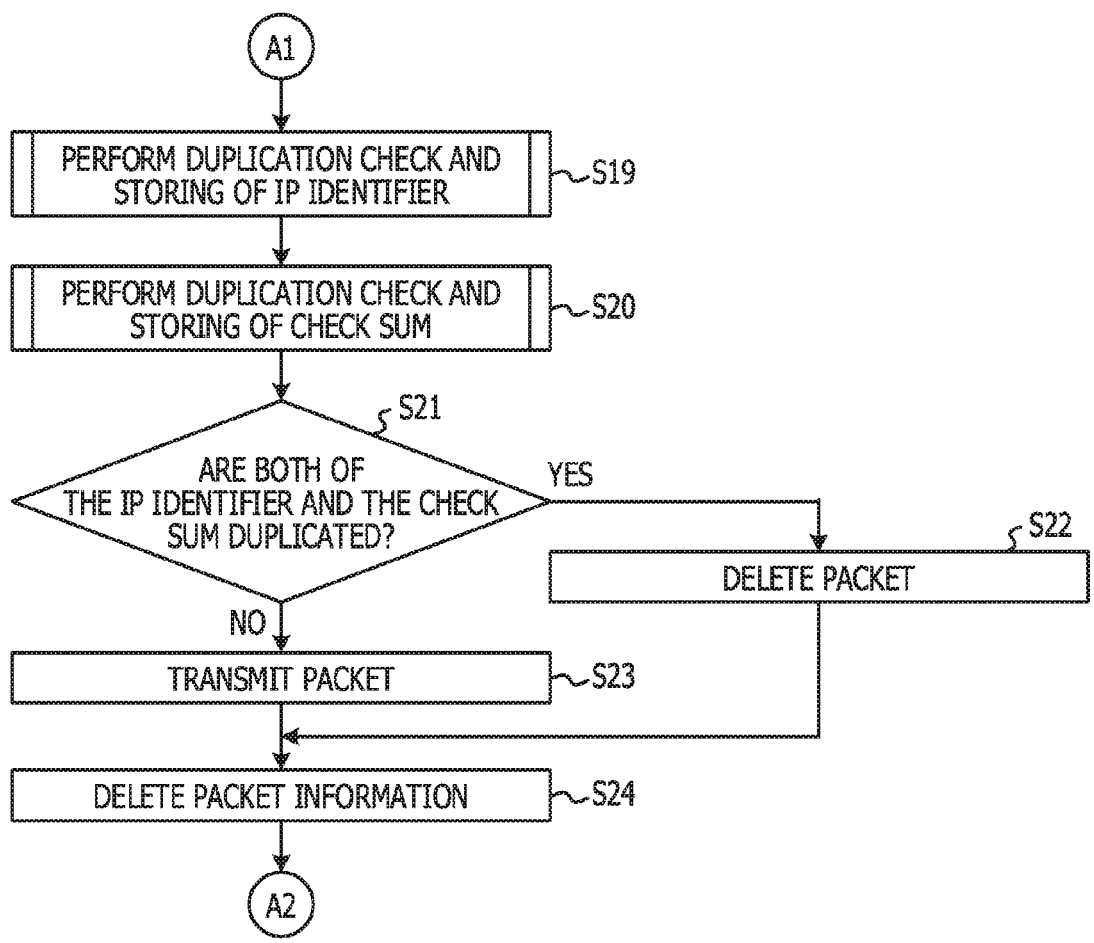
FIG. 14 is a second flowchart illustrating details of the duplicate packet detection processing according to the first embodiment.

The duplication determination unit 14 performs duplication determination and storing processing of the IP identifier (S19 in FIG. 14). The duplication determination and the storing processing of the IP identifier will be described with reference to FIG. 15.

The duplication determination unit 14 refers to the management information corresponding to the obtained IP identifier (S191). Specifically, the duplication determination unit 14 specifies an IP identifier bit string which is identified by a session identifier (appropriately described below as a session identifier of the obtained packet) for identifying the session of the obtained packet, with reference to the storing position information table T3 in FIG. 12. The specified IP identifier bit string is appropriately described below as a specific IP identifier bit string. The duplication determination unit 14 refers to a bit area of a specific bit string, which corresponds to the obtained IP identifier (S191).

The duplication determination unit 14 determines whether the first information (for example, "1") corresponding to the obtained IP identifier is stored in the memory 102 (S192). Specifically, the duplication determination unit 14 determines whether the first information is stored in the referred bit area. The duplication determination unit 14 determines whether the first information corresponding to the specified session and the IP identifier included in the obtained packet is stored in the memory 102 by using the determination of S192. It is possible to detect a duplicate packet for each session by determination whether the first information corresponding to the specified session and the IP identifier included in the obtained packet is stored in the memory 102.

When the first information is not stored in the memory 102 (S192/NO), that is, when the first information is not stored in the referred bit area, the information management unit 13 performs the process of S193. The information management unit 13 stores the first information corresponding to the obtained IP identifier, in the memory 102 (S193). Specifically, the duplication determination unit 14 stores the first information in the referred bit area. After the process of S193 is ended, the process proceeds to S20 in FIG. 14. The information management unit 13 stores the first information corresponding to the specified session and the identifier included in the obtained packet is stored in the memory 102 by the process of S193.

When the first information is stored in the memory 102 (S192/YES), the duplication determination unit 14 performs the following processing. That is, the duplication determination unit 14 stores "1" in the IP identifier duplication flag field of the packet information table T1 in FIG. 9. Then, the process proceeds to S20 in FIG. 14. The information management unit 13 stores "0" as an initial value in the IP identifier duplication flag field of the packet information table T1 in FIG. 9.

(Duplication Determination and Storing Processing of Check Sum)

The duplication determination unit 14 performs duplication determination and storing processing of the check sum (S20 in FIG. 14). The duplication determination and the storing processing of the check sum will be described with reference to FIG. 16.

The duplication determination unit 14 refers to the management information corresponding to the obtained check sum (S201). Specifically, the duplication determination unit 14 specifies a check sum bit string which is identified by a session identifier of the obtained packet, with reference to the storing position information table T3 in FIG. 12. The specified check sum bit string is appropriately described below as a specific check sum bit string. The duplication determination unit 14 refers to a bit area of a specific check sum bit string, which corresponds to the obtained check sum (S201).

The duplication determination unit 14 determines whether the second information (for example, "1") corresponding to the obtained check sum is stored in the memory 102 (S202). Specifically, the duplication determination unit 14 determines whether the second information (for example, "1") is stored in the referred bit area. The duplication determination unit 14 determines whether the second information corresponding to the specified session and the check sum included in the obtained packet is stored in the memory 102 by using the determination of S202. It is possible to detect a duplicate packet for each session by determination whether the second information corresponding to the specified session and the check sum included in the obtained packet is stored in the memory 102.

When the second information is not stored in the memory 102 (S202/NO), that is, when the second information is not stored in the referred bit area, the information management unit 13 performs the process of S203. The information management unit 13 stores the second information corresponding to the obtained check sum, in the memory 102 (S203). Specifically, the duplication determination unit 14 stores the second information in the referred bit area. After the process of S203 is ended, the process proceeds to S21 in FIG. 14. The information management unit 13 stores the second information corresponding to the specified session and the check sum included in the obtained packet is stored in the memory 102 by the process of S203.

When the second information is stored in the memory 102 (S202/YES), the duplication determination unit 14 performs the following processing. That is, the duplication determination unit 14 stores "1" in the check sum duplication flag field of the packet information table T1 in FIG. 9. Then, the process proceeds to S21 in FIG. 14. The information management unit 13 stores "0" as an initial value in the check sum duplication flag field of the packet information table T1 in FIG. 9.

(Duplicate Packet Determination)

The duplication determination unit 14 determines whether the obtained packet is a packet (that is, duplicate packet) which has been obtained previously, by the process of S21 in FIG. 14. The duplication determination unit 14 determines whether both of the IP identifier and the check sum of the obtained packet are duplicated (S21). Determination that both of the IP identifier and the check sum of the obtained packet are duplicated has the same meaning as that the obtained packet is a duplicate packet. Accordingly, the obtained packet is deleted.

Figure 15:
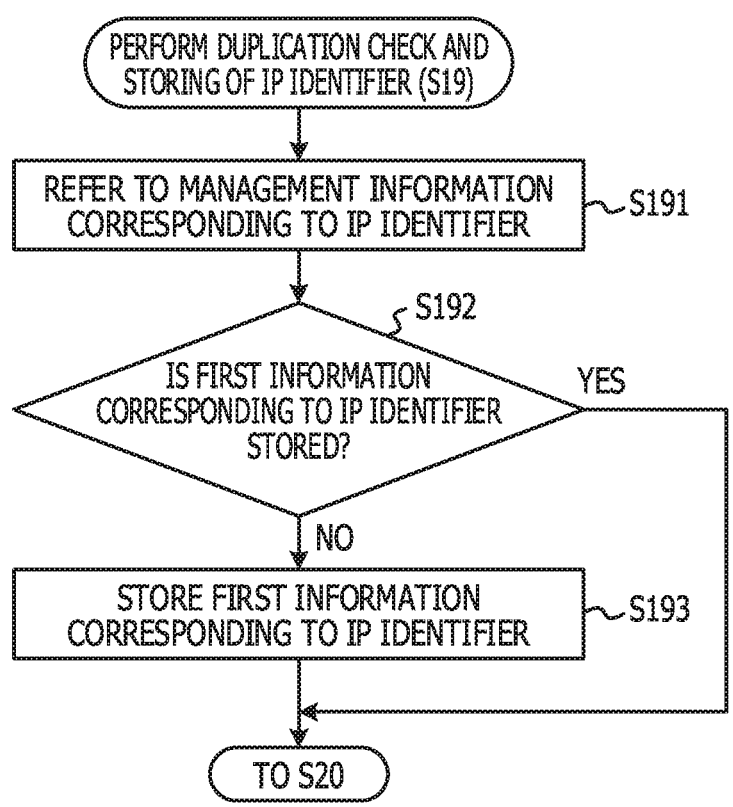
FIG. 15 is a third flowchart illustrating details of the duplicate packet detection processing according to the first embodiment.

Duplication of the IP identifier means determination of YES in S192 of FIG. 15. When "1" is stored in the IP identifier duplication flag field of the packet information table T1 in FIG. 9, the duplication determination unit 14 determines that the IP identifier is duplicated.

Figure 16:
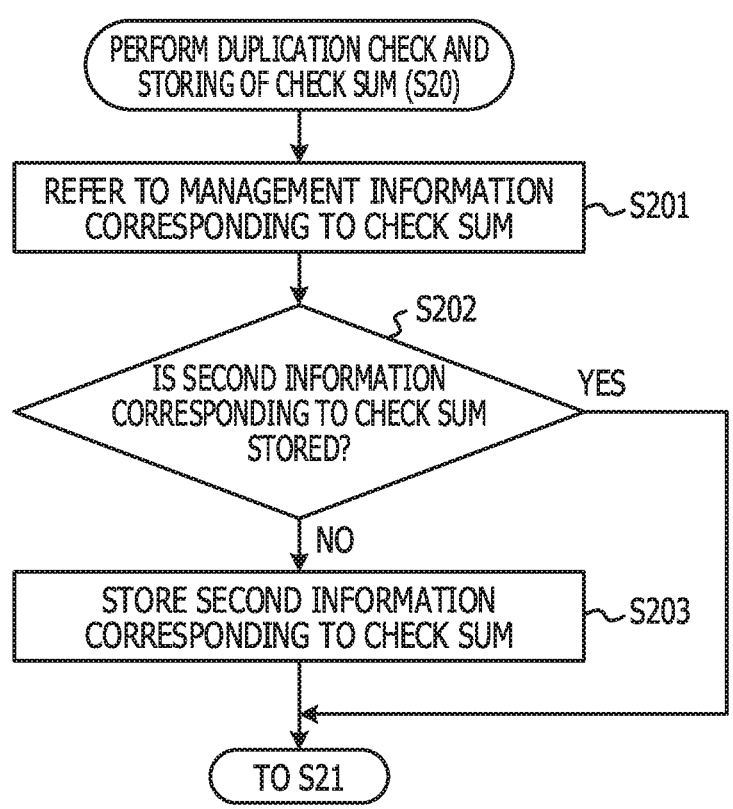
FIG. 16 is a fourth flowchart illustrating details of the duplicate packet detection processing according to the first embodiment.

Duplication of the check sum means determination of YES in S202 of FIG. 16. When "1" is stored in the check sum duplication flag field of the packet information table T1 in FIG. 9, the duplication determination unit 14 determines that the check sum is duplicated.

(Deletion of Duplicate Packet)

When both of the IP identifier and the check sum are duplicated (S21/YES), the obtained packet is a duplicate packet. When both of the IP identifier and the check sum are duplicated (S21/YES), the deletion unit 16 deletes the packet stored in the memory 102 (S22). Specifically, the deletion unit 16 deletes the packet stored in an area which is specified by the leading address in the packet leading address field of the packet information table T1 in FIG. 9.

(Transmission of Packet)

When both of the IP identifier and the check sum are not duplicated (S21/NO), the obtained packet is not a duplicate packet. Thus, when both of the IP identifier and the check sum are not duplicated (S21/NO), the transmission unit 15 transmits the packet stored in the memory 102 to the packet analyzer AD (S23). Specifically, the transmission unit 15 transmits the packet (appropriately described below as a transmission target packet) stored in an area which is specified by the leading address in the packet leading address field of the packet information table T1 in FIG. 9, to the packet analyzer AD.

For example, the transmission unit 15 may transmit the transmission target packet to the packet analyzer AD in a state of adding the IP header and the TCP header. Thus, the packet analyzer AD may analyze the packet having a state where communication in the network is performed. The TCP header includes "data offset" indicating a leading position of a TCP payload. The UDP header has a data size of a fixed length. Thus, the packet analyzer AD may specify a leading position of the TCP payload or a UDP payload by referring to the TCP header or the UDP header which is transmitted from the duplicate packet detection apparatus DD.

If the process of S22 or the process of S23 is ended, the information management unit 13 deletes the packet information (S24). In such deletion, the information management unit 13 initializes information stored in the packet information table T1 of FIG. 9. If the process of S24 is ended, the process returns to S11 in FIG. 13.

(Specific Example of Duplicate Packet Detection)

A specific example of duplicate packet detection will be described below with reference to FIGS. 8 to 16. In descriptions for the specific example, the session information table T1 in FIG. 10, the sets pp1 and pp2 of bit strings in FIG. 11, and the storing position information table T3 in FIG. 12 have been already stored in the memory 102.

In the following descriptions, the obtaining unit 11 obtains a packet. The transmission source IP of the obtained packet is "10.20.30.40". The transmission destination IP thereof is "10.20.30.50". The protocol number is "6", the transmission source port is "2000", and the transmission destination port is "20".

If the packet is obtained (S11/YES), the obtaining unit 11 obtains the transmission source IP of "10.20.30.40", the transmission destination IP of "10.20.30.50", the protocol number of "6", the transmission source port of "2000", and the transmission destination port of "20" of the obtained packet (S12). The transmission source IP of "10.20.30.40", the transmission destination IP of "10.20.30.50", the protocol number of "6", the transmission source port of "2000", and the transmission destination port of "20" are stored in the session information table T1 of FIG. 10. According to the session information table T1 in FIG. 10, the session identifier which is stored corresponding to the transmission source IP, the transmission destination IP, the protocol number, the transmission source port, and the transmission destination port is "1".

Accordingly, the session management unit 12 determines that the session information of the specified session is stored in the information storage area IR (S14/YES). The information management unit 13 obtains, for example, the IP identifier (for example, "3") included in the IP header of the obtained packet and obtains the check sum (for example, "5") included in the TCP header of the obtained packet (S18).

The duplication determination unit 14 specifies the IP identifier bit string p1-1 which is identified by the session identifier of "1" of the obtained packet, with reference to the storing position information table T3 in FIG. 12 (S191). The duplication determination unit 14 refers to a bit area of the specific bit string, which corresponds to the obtained IP identifier of "3" (S191). The referred bit area is bit areas from the leading to the 3rd bit area of the IP identifier bit string p1-1 (see the reference sign of AR3i). The leading bit area (see the reference sign of p1-1) is the 0-th bit area. The first information (for example, "1") is stored in the 3rd bit area. That is, the IP identifier of the obtained packet is duplicated.

The duplication determination unit 14 determines that storing of the first information (for example, "1") in the referred bit area is complete (S192/YES).

Next, the duplication determination unit 14 specifies the check sum bit string p1-2 which is identified by the session identifier of "1" of the obtained packet, with reference to the storing position information table T3 in FIG. 12 (S201). The duplication determination unit 14 refers to a bit area of the specific bit string, which corresponds to the obtained check sum of "5" (S201). The referred bit area is bit areas from the leading to the fifth bit area of the check sum bit string p1-2 (see the reference sign of AR3c). The leading bit area (see the reference sign of p1-2) is the 0-th bit area. The second information (for example, "1") is stored in the fifth bit area. That is, the check sum of the obtained packet is duplicated.

The duplication determination unit 14 determines that storing of the second information (for example, "1") in the referred bit area is complete (S202/YES).

The duplication determination unit 14 determines that both of the IP identifier and the check sum of the obtained packet are duplicated (S21/YES). The deletion unit 16 deletes the packet stored in the memory 102 (S22). Then, the information management unit 13 deletes the packet information (S24). Then, the process returns to S11 in FIG. 13. With the above processing, the duplication determination unit 14 detects the obtained packet as a duplicate packet.

Then, the obtaining unit 11 obtains a packet (S11/YES). Since processes from the subsequent process to the process of S18 are the same as the described processes in this specific example, descriptions thereof will be omitted.

For example, the information management unit 13 obtains an IP identifier (for example, "7") included in the IP header of the obtained packet, and obtains a check sum (for example, "2") included in the TCP header of the obtained packet (S18).

The duplication determination unit 14 specifies the IP identifier bit string p1-1 which is identified by the session identifier of "1" of the obtained packet, with reference to the storing position information table T3 in FIG. 12 (S191). The duplication determination unit 14 refers to a bit area of the specific bit string, which corresponds to the obtained IP identifier of "7" (S191). The referred bit area is bit areas from the leading to the 7-th bit area of the IP identifier bit string p1-1 (see the reference sign of AR4i). The first information (for example, "1") is not stored in the 7-th bit area. That is, the IP identifier of the obtained packet is not duplicated.

The duplication determination unit 14 determines that the first information (for example, "1") is not stored in the referred bit area (S192/NO). The duplication determination unit 14 stores the first information (for example, "1") in the referred bit area.

Then, the duplication determination unit 14 specifies the check sum bit string p1-2 which is identified by the session identifier of "1" of the obtained packet, with reference to the storing position information table T3 in FIG. 12 (s201). The duplication determination unit 14 refers to a bit area of a specific bit string, which corresponds to the obtained check sum of "5" (S201). The referred bit area is bit areas from the leading to the 2nd bit area of the check sum bit string p1-2 (see the reference sign of AR4c). The second information (for example, "1") is not stored in the 2nd bit area. That is, the check sum of the obtained packet is not duplicated.

The duplication determination unit 14 determines that the second information (for example, "1") is not stored in the referred bit area (S202/NO). The duplication determination unit 14 stores the second information (for example, "1") in the referred bit area.

The duplication determination unit 14 determines that both of the IP identifier and the check sum of the obtained packet are not duplicated (S21/NO). The transmission unit 15 transmits the second packet stored in the memory 102 (S23). The information management unit 13 deletes the packet information (S24). The process returns to S11 in FIG. 13.

Hitherto, according to the first embodiment, as illustrated in FIG. 7, it is possible to perform detection processing of a duplicate packet (that is, duplication determination) having small processing load, with high accuracy.

Second Embodiment

In the first embodiment, the duplication determination of a packet is performed by using one set of the IP identifier bit string and the check sum bit string. However, if the duplication determination of a packet is performed by using multiple sets of the IP identifier bit strings and the check sum bit strings, the accuracy of the duplication determination of a packet is improved more.

Improvement of the accuracy of the duplication determination of a packet will be described with reference to FIG. 7. As illustrated in FIG. 7, the obtaining unit 11 obtains a first packet which includes an IP identifier of "4" and a check sum of "1" and obtains a second packet which includes an IP identifier of "11" and a check sum of "17".

As illustrated in FIG. 7, the information management unit 13 stores "1" in bit areas of the IP identifier bit string P-1, which respectively corresponds to the IP identifiers of "4" and "11" (see the reference signs of AR1i and AR2i in FIG. 7). As illustrated in FIG. 7, the information management unit 13 stores "1" in bit areas of the check sum bit string P-2, which respectively corresponds to the check sums of "1" and "17" (see the reference signs of AR1c and AR2c in FIG. 7).

Here, it is assumed that the obtaining unit 11 obtains a third packet which includes an IP identifier of "4" and a check sum of "17". The third packet is a packet which is newly obtained by the obtaining unit 11, and is not a duplicate packet.

The duplication determination unit 14 has already stored "1" in the bit area of the IP identifier bit string P-1, which corresponds to the IP identifier of "4" of the third packet (see the reference sign of AR1i in FIG. 7). "1" has been already stored in the bit area of the check sum bit string P-2, which corresponds to the check sum of "17" of the third packet (see the reference sign of AR2c in FIG. 7). Thus, the duplication determination unit 14 determines that the third packet is a duplicate packet. The deletion unit 16 deletes the third packet. The third packet is not a duplicate packet as described above. One of the reasons of performing such deletion processing is that the duplication determination of a packet is performed by using one set of the IP identifier bit string and the check sum bit string.

Here, it is considered that a probability of creating the same IP identifier within a short period (for example, 10 ms (ms is an abbreviation of millisecond)) is stochastically low even when the IP identifier is randomly created. The duplicate packet detection apparatus creates the IP identifier bit string and the check sum bit string every time the short period elapses. The duplicate packet detection apparatus stores the first information corresponding to the IP identifier of the packet, in the IP identifier bit string which is created right before. The duplicate packet detection apparatus stores the second information corresponding to the check sum of the packet, in the check sum bit string which is created right before. Such storing causes the probability of performing the described deletion processing to be low.

The duplication determination unit 14 performs duplication determination for a packet obtained by the obtaining unit 11, with reference to each of IP identifier bit strings and check sum bit strings in a plurality of sets of bit strings. The second embodiment will be described below in more detail.

(Creation of Plurality of Sets of Bit Strings)

The information management unit 13 ensures a set of bit strings which includes the IP identifier bit string and the check sum bit string, in the memory 102 for each predetermined timing. The information management unit 13 stores a validation point of time for the set of bit strings in the memory 102. The information management unit 13 deletes the set of bit strings which exceeds a validity time, from the memory 102.

(Detection Processing of Duplicate Packet)

The duplication determination unit 14 performs the following processing in the duplication determination. That is, the duplication determination unit 14 selects a first set of bit strings which is ensured right before among the plurality of sets of bit strings which has been ensured in the memory 102.

When the first information is stored in a third bit area of an IP identifier bit string in the first set of bit strings, which corresponds to an identifier of the obtained packet, the duplication determination unit 14 determines that the first information corresponding to the identifier of the obtained packet is stored in the memory 102. When the second information is stored in a fourth bit area of a check sum bit string in the first set of bit strings, which corresponds to a check sum of the obtained packet, the duplication determination unit 14 determines that the second information corresponding to the check sum of the obtained packet is stored in the memory 102. The first information and the second information have values of "1", for example.

When the first information has not been stored in the third bit area, the information management unit 13 stores the first information in the third bit area. When the second information has not been stored in the fourth bit area, the information management unit 13 stores the second information in the fourth bit area.

The deletion unit 16 deletes the obtained packet when the first information is stored in the third bit area and the second information is stored in the fourth bit area.

When the first information has not been stored in the third bit area, or when the second information has not been stored in the fourth bit area, the duplication determination unit 14 selects a second set of bit strings which has not been selected and is any one of the plurality of sets of bit strings which has been ensured in the memory 102.

The duplication determination unit 14 determines whether a first state is satisfied and a second state is satisfied. The first state is a state where the first information is stored in a bit area of the IP identifier bit string in the second set of bit strings, which corresponds to an identifier of the obtained packet. The second state is a state where the second information is stored in a bit area of the check sum bit string in the set of bit strings, which corresponds to a check sum of the obtained packet.

If the duplication determination unit 14 determines that the first state is satisfied and the second state is satisfied, the deletion unit 16 deletes the obtained packet.

(Information Storage Area)

Next, the detection processing for a duplicate packet in the second embodiment will be described in detail with reference to FIGS. 17 to 28.

Figure 17:
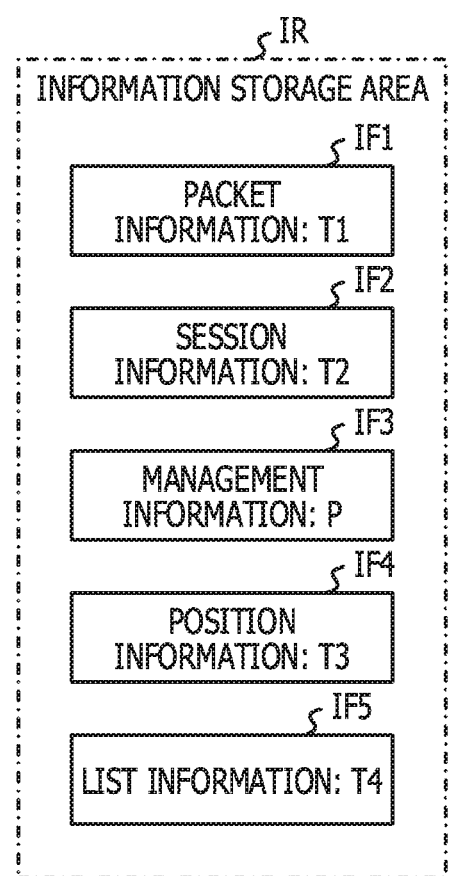
FIG. 17 is a schematic diagram illustrating a state where various types of information are stored in the information storage area in FIG. 4, in a second embodiment.

FIG. 17 is a schematic diagram illustrating a state where various types of information are stored in the information storage area IR of FIG. 4, in the second embodiment. FIG. 17 is a diagram obtained by adding list information IF5 in FIG. 8.

FIG. 18 is a diagram illustrating list information IF4 in FIG. 17. The list information is information indicating a storing position of information for managing a plurality of sets of bit strings which corresponds to a session. The list information is stored in the memory 102 in a table format illustrated in FIG. 18. A state where a list information table T4 is stored as the list information IF5 in the memory 102 is schematically illustrated by "list information: T4" in FIG. 17.

The list information table T4 includes a session identifier field and a management list address field. A management list address is a leading address of a bit string-set management list. The bit string-set management list is stored in the memory 102. The bit string-set management list is a list for managing a set of bit strings which is created corresponding to a session identified by a session identifier. In the list information table T4, the leading address of the bit string-set management list corresponding to a session identifier is stored.

If a new session is initiated, the information management unit 13 creates the session identifier for identifying this session, and the bit string-set management list for managing a set of bit strings in the new session.

(Specific Example of Creation of Plurality of Sets of Bit Strings and Management of Plurality of Sets of Bit Strings)

Figure 19:
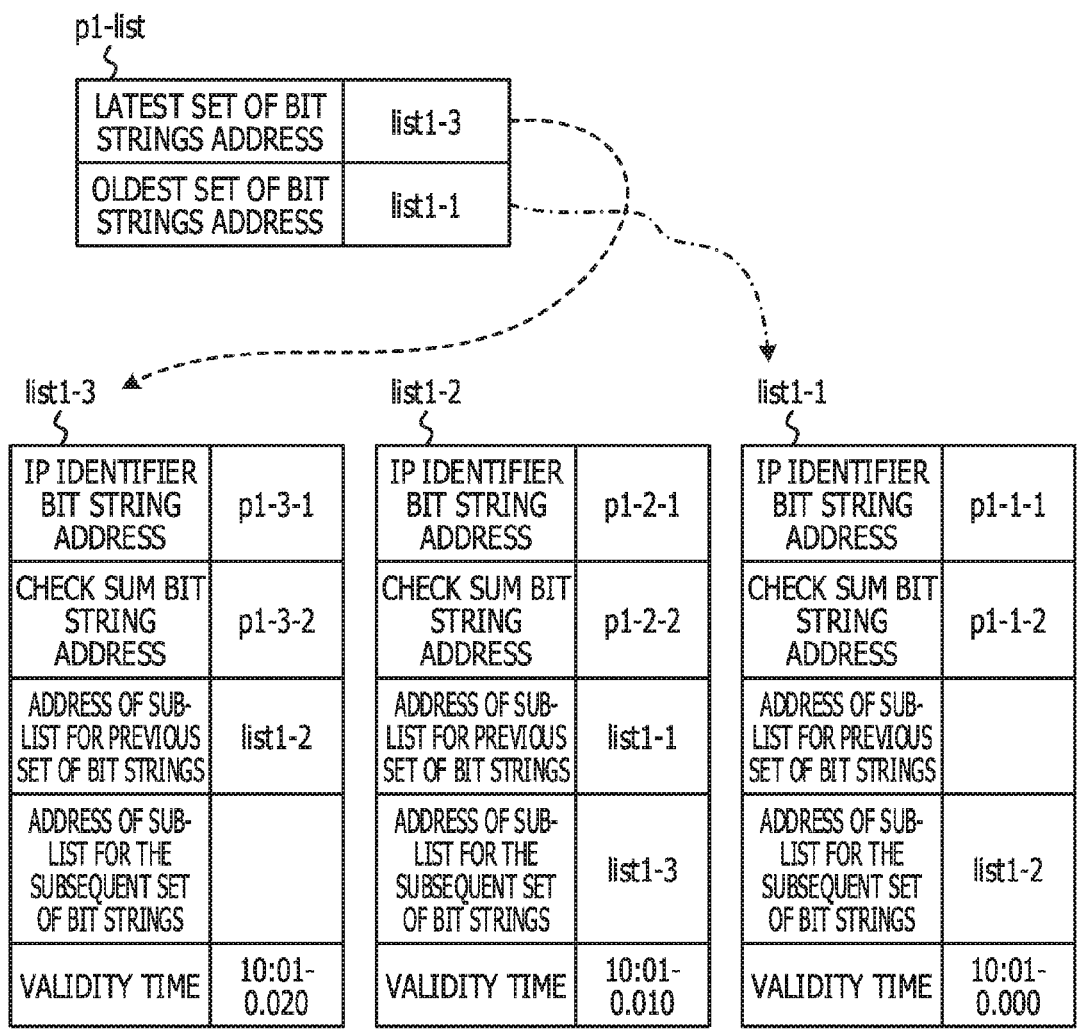
FIG. 19 is a first diagram illustrating a bit string-set management list.

FIG. 19 is a first diagram illustrating the bit string-set management list. The bit string-set management list p1-list is used for managing a plurality of sub-lists (list1-1 to list1-3). In the sub-list, information is not stored in the blank cell.

The bit string-set management list p1-list stores the latest set of bit strings address and the oldest set of bit strings address. The latest set of bit strings address is a leading address of a sub-list for managing the newest-created set of bit strings among a plurality of sets of bit strings which is managed by the bit string-set management list p1-list at the current point of time. In FIG. 19, the bit string-set management list p1-list stores the latest set of bit strings address as "list1-3" (see a dotted-line arrow). The oldest set of bit strings address is a leading address of a sub-list for managing the oldest-created set of bit strings among the plurality of sets of bit strings which is managed by the bit string-set management list p1-list at the current point of time. In FIG. 19, the bit string-set management list p1-list stores the oldest set of bit strings address as "list1-1" (see a dashed line arrow).

Each of a plurality of sub-lists (list1-1 to list1-3) is a list in which an IP identifier bit string address, a check sum bit string address, an address of a sub-list for the previous set of bit strings, an address of a sub-list for the subsequent set of bit strings, and a validity time are stored.

The address of the sub-list for the previous set of bit strings in the sub-list is a leading address of a sub-list which has been created right before a timing at which this sub-list is created. The address of the sub-list for the subsequent set of bit strings in the sub-list is a leading address of a sub-list which is created right after a timing at which this sub-list is created. Details of the plurality of sub-lists (list1-1 to list1-3) will be described later.

(Creation of Plurality of Sets of Bit Strings)

Figure 20:
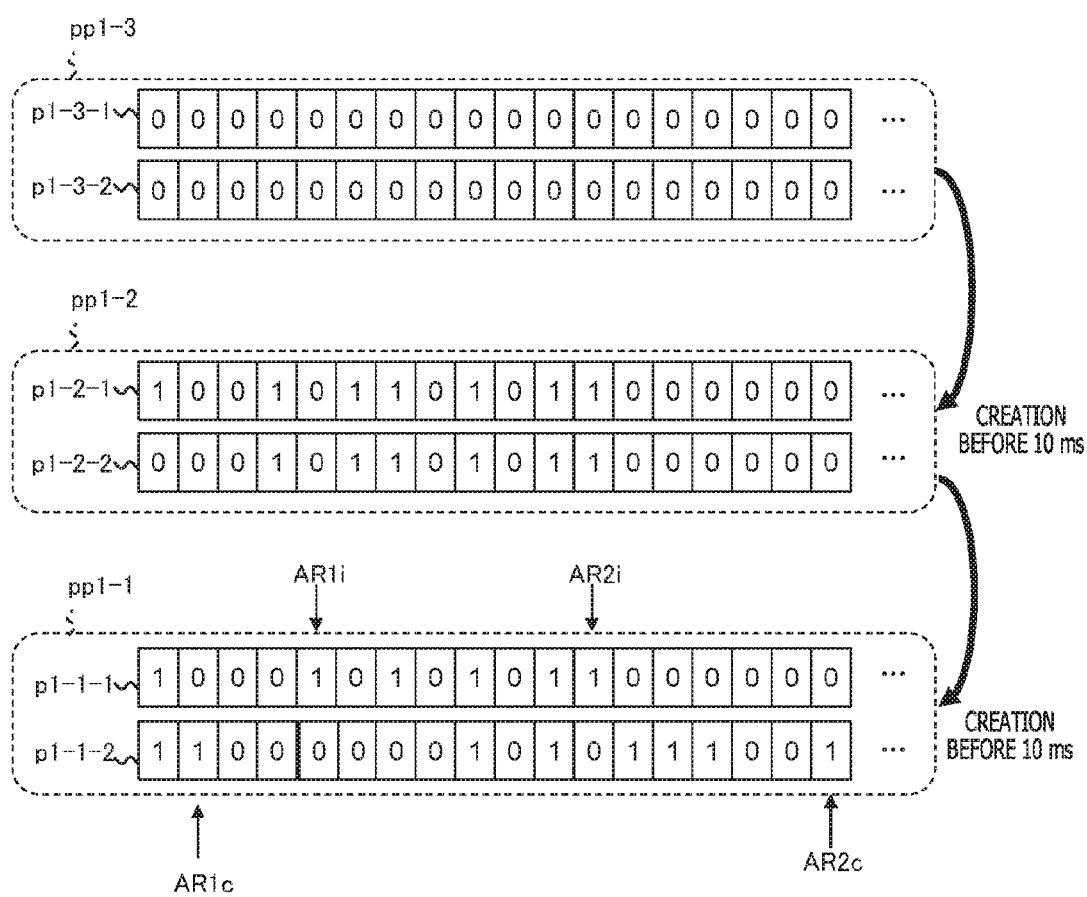
FIG. 20 is a first diagram illustrating creation of a plurality of sets of bit strings.

FIG. 20 is a first diagram illustrating creation of a plurality of sets of bit strings. A first set of bit strings pp1-1 includes an IP identifier bit string p1-1-1 and a check sum bit string p1-1-1. A second set of bit strings pp1-2 includes an IP identifier bit string p1-2-1 and a check sum bit string p1-2-2. A third set of bit strings pp1-3 includes an IP identifier bit string p1-3-1 and a check sum bit string p1-3-2.

In such creation, the information management unit 13 creates a new set of bit strings at a predetermined interval (for example, 10 ms) and stores the created set of bit strings in the memory 102. The information management unit 13 sets a validity time for the created set of bit strings. The information management unit 13 deletes a set of bit strings which has an expired validity time, from the memory 102. The information management unit 13 creates a new set of bit strings corresponding to this deletion and stores the created set of bit strings in the memory 102.

In the example of FIG. 20, the latest set of bit strings is the third set of bit strings pp1-3. A set of bit strings which has been created (see "creation before 10 ms" in FIG. 20) before 10 ms from when the third set of bit strings pp1-3 is created is the second set of bit strings pp1-2. A set of bit strings which has been created (see "creation before 10 ms" in FIG. 20) before 10 ms from when the second set of bit strings pp1-2 is created is the first set of bit strings pp1-1. The first set of bit strings pp1-1 is the oldest set of bit strings.

(Management of Set of Bit Strings)

Management of a set of bit strings will be described with reference to FIGS. 19 and 20. After a new session is conducted between the devices, as described in the first embodiment, the information management unit 13 creates one set of bit strings (in the example of FIG. 20, first set of bit strings pp1-1) and stores the one created set of bit strings in the memory 102 (S16 and S17 in FIG. 13). The information management unit 13 stores an IP identifier bit string and a check sum bit string address in the created set of bit strings, in the position information table T3 of FIG. 12. Then, the information management unit 13 creates a bit string-set management list p1-list in FIG. 19 and stores the created bit string-set management list p1-list in the memory 102.

The information management unit 13 creates a sub-list for managing the created set of bit strings, and stores the created sub-list in the memory 102. In the following descriptions, the sub-list for managing a set of bit strings is appropriately described below as a sub-list for the set of bit strings.

When the first set of bit strings pp1-1 is created, the information management unit 13 creates a sub-list list1-1 for the first set of bit strings pp1-1.

The information management unit 13 causes an IP identifier bit string address of "p1-1-1" and a check sum bit string address of "p1-1-2" which are included in a set of bit strings which is a management target, to be stored in the first sub-list list1-1. In the following descriptions, the reference sign of the IP identifier bit string illustrated in FIG. 20 is set as an IP identifier bit string address and the reference sign of the check sum bit string illustrated in FIG. 20 is set as a check sum bit string address.

The information management unit 13 stores a validity time of the created set of bit strings in the sub-list. The information management unit 13 stores a validity time of "10:01-0.000" in the first sub-list list1-1. "H" in "H:M" of the validity time (where, H is an integer from 0 to 24, and M is an integer from 0 to 59) indicates a hour, and "M" indicates a minute. Marks subsequent to "-" (hyphen) in the validity time indicates a second.

The information management unit 13 stores a leading address of "list1-1" of the sub-list list1-1 for the set of bit strings pp1-1 as the oldest set of bit strings address in the bit string-set management list p1-list of FIG. 19, in the bit string-set management list p1-list.

(Creation of Plurality of Sets of Bit Strings and Management of Plurality of Sets of Bit Strings)

Figure 21:
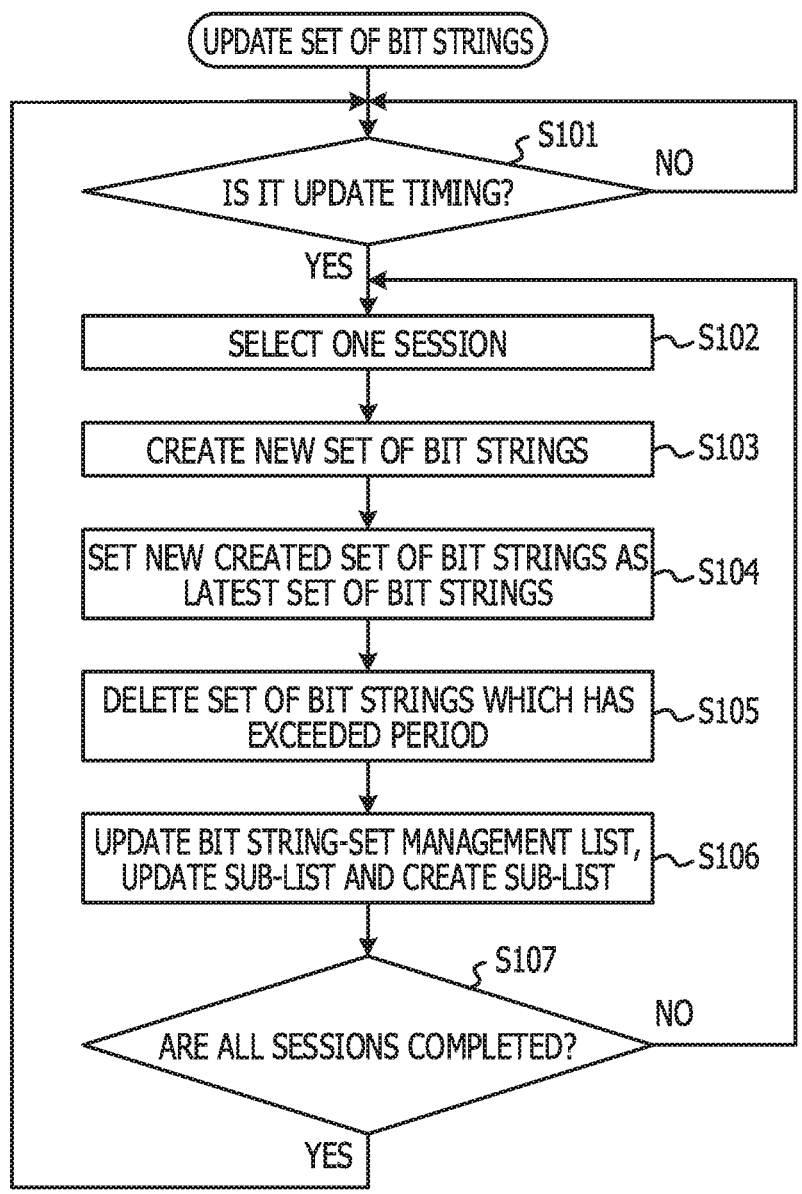
FIG. 21 is a flowchart illustrating creation of the plurality of sets of bit strings and management of the plurality of sets of bit strings.

If a new session is initiated and a set of bit strings corresponding to this session is created for the first time, a plurality of sets of bit strings is created and the plurality of sets of bit strings is managed corresponding to this session. Creation of a plurality of sets of bit strings and management of the plurality of sets of bit strings will be described with reference to the flowchart in FIG. 21. FIG. 21 is a flowchart illustrating creations of a plurality of sets of bit strings and management of the plurality of sets of bit strings.

The information management unit 13 determines whether it is an update timing (S101). The update timing is a timing having an interval of 10 ms, for example. When it is not the update timing (S101/NO), the information management unit 13 continues determination processing of the update timing (S101/NO). When it is the update timing (S101/YES), the information management unit 13 selects one not-selected session with reference to the list information table T4 in FIG. 18 (S102). Here, the not-selected session is a session which has not been selected for every update timing in the flowchart of FIG. 21.

The information management unit 13 creates a new set of bit strings corresponding to the selected session, and stores the created set of bit strings in the memory 102 (S103). The information management unit 13 sets the new created set of bit strings as the latest set of bit strings (S104). The information management unit 13 deletes a set of bit strings which has an exceeded validity time (S105).

The information management unit 13 updates the bit string-set management list and the sub-list and creates a sub-list for the created set of bit strings (S106). The information management unit 13 determines whether all sessions have been selected (S107).

When all of the sessions have been selected (S107/YES), the process proceeds to S101. When all of the sessions have not been selected (S107/NO), the process proceeds to S102.

(Specific Example of Creation of Plurality of Sets of Bit Strings and Management of Plurality of Sets of Bit Strings)

(Creation of Second Set of Bit Strings pp1-2)

The information management unit 13 performs processing illustrated in FIG. 21, in parallel with creation of the first set of bit strings pp1-1. When it is determined that it is the update timing (S101/YES), the information management unit 13 selects one session identifier which has not been selected among session identifiers stored in the session identifier field of the list information table T4 in FIG. 18 (S102). In the following descriptions, a case where the information management unit 13 selects a session identifier of "1", for example, is exemplified.

The information management unit 13 creates a new second set of bit strings pp1-2 (see FIG. 20) and stores the created second set of bit strings pp1-2 in the memory 102 (S103). The information management unit 13 sets the second set of bit strings pp1-2 as the latest set of bit strings (S104). When there is a set of bit strings which has an expired validity time, the information management unit 13 deletes this bit string. Here, it is assumed that there is no set of bit strings which has an expired validity time at the current point of time.

If the second set of bit strings pp1-2 is created, the information management unit 13 creates a sub-list list1-2 for the second set of bit strings pp1-2 (S106). The information management unit 13 stores an address of "p1-2-1" of the created IP identifier bit string, an address of "p1-2-2" of the created check sum bit string, and an address of "list1-1" of a sub-list for the previous set of bit strings, in the second sub-list list1-2 (S106). The information management unit 13 stores a validity time of "10:01-0.010" in the second sub-list list1-2 (S106).

The information management unit 13 stores an address of "list1-2" of a sub-list for the subsequent set of bit strings, in the first sub-list list1-1 (S106).

The information management unit 13 stores a leading address of "list1-1" of a sub-list list1-1 for the oldest set of bit strings pp1-1 as the oldest set of bit strings address of the bit string-set management list p1-list in FIG. 19, in the bit string-set management list p1-list (S106). The information management unit 13 stores a leading address of "list1-2" of a sub-list list1-2 for the newest set of bit strings pp1-2 as the latest set of bit strings address of the bit string-set management list p1-list in FIG. 19, in the bit string-set management list p1-list (S106).

In the following descriptions, for convenient descriptions, it is assumed only that the session identifier of "1" is stored in the list information table T4 of FIG. 18. Accordingly, the information management unit 13 determines that all of the sessions have been selected (S107/YES), and causes the process to proceed to S101.

(Creation of Third Set of Bit Strings pp1-3)

When it is determined that it is the update timing (S101/YES), the information management unit 13 selects one session identifier of "1" which has not been selected among session identifiers stored in the session identifier field of the list information table T4 in FIG. 18 (S102).

The information management unit 13 creates a new third set of bit strings pp1-3 (see FIG. 20) and stores the created third set of bit strings pp1-3 in the memory 102 (S103). The information management unit 13 sets the third set of bit strings pp1-3 as the latest set of bit strings (S104). When there is a set of bit strings which has an expired validity time, the information management unit 13 deletes this bit string. Here, it is assumed that there is no set of bit strings which has an expired validity time at the current point of time.

If the third set of bit strings pp1-3 is created, the information management unit 13 creates a sub-list list1-3 for the third set of bit strings pp1-3 (S106). The information management unit 13 stores an address of "p1-3-1" of the created IP identifier bit string, an address of "p1-3-2" of the created check sum bit string, and an address of "list1-2" of a sub-list for the previous set of bit strings, in the third sub-list list1-3

(S106). The information management unit 13 stores a validity time of "10:01-0.020" in the third sub-list list1-3 (S106).

The information management unit 13 stores an address of "list1-3" of a sub-list for the subsequent set of bit strings, in the second sub-list list1-2 (S106).

The information management unit 13 stores a leading address of "list1-3" of a sub-list list1-3 for the newest set of bit strings pp1-3 as the latest set of bit strings address of the bit string-set management list p1-list in FIG. 19, in the bit string-set management list p1-list (S106). The information management unit 13 determines that all of the sessions have been selected (S107/YES), and causes the process to proceed to S101.

(Creation of Fourth Set of Bit Strings pp1-4)

Figure 22:
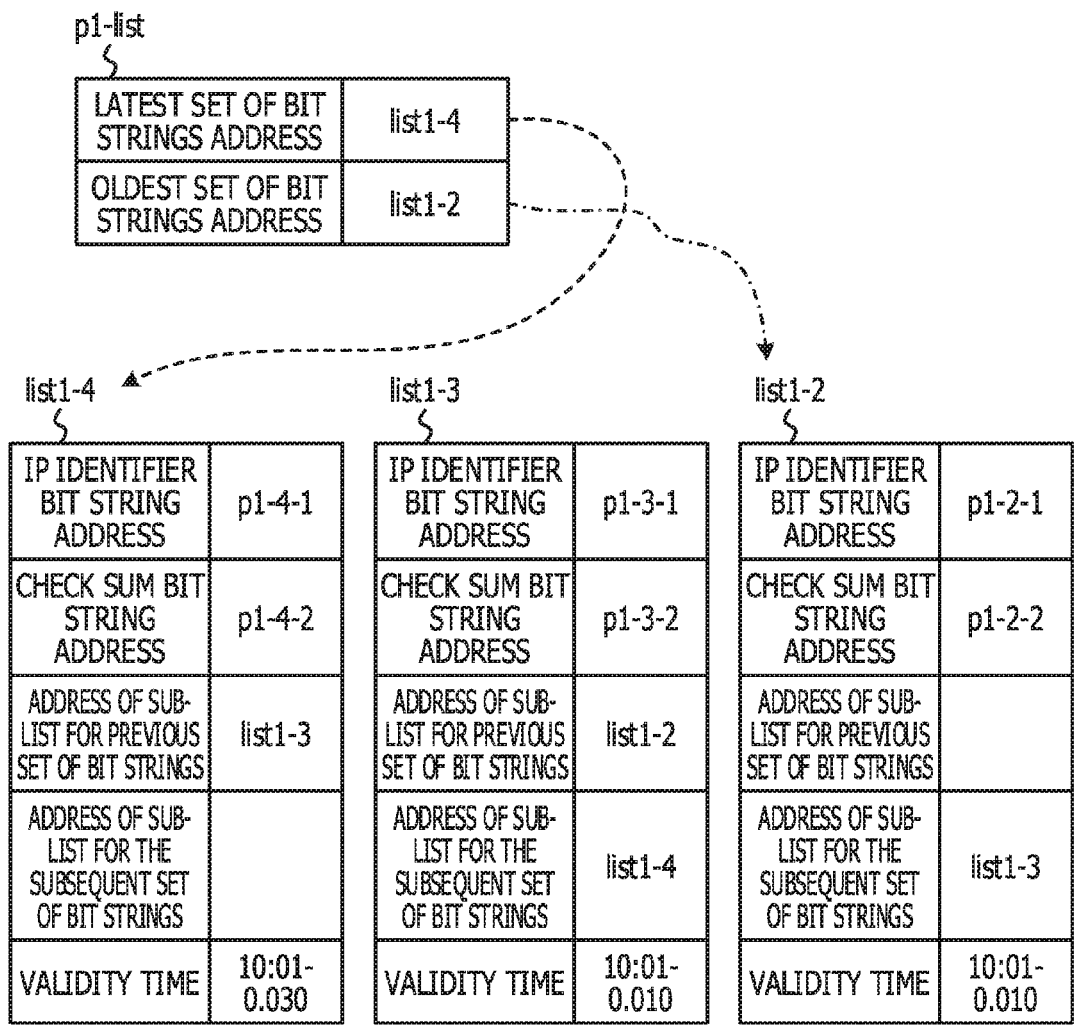
FIG. 22 is a second diagram illustrating the bit string-set management list.
Figure 23:
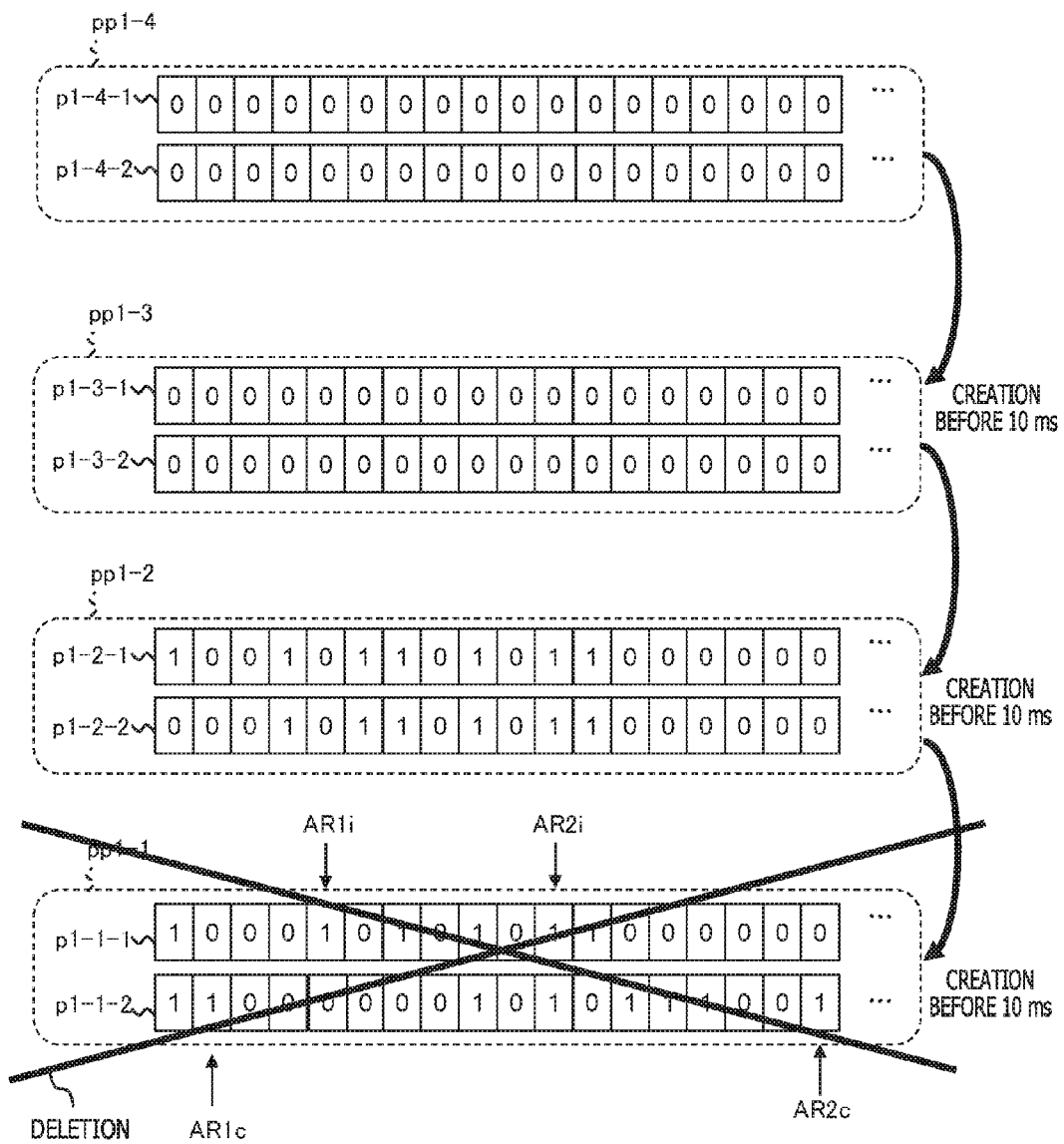
FIG. 23 is a second diagram illustrating creation of a plurality of sets of bit strings.

Next, deletion of a set of bit strings having an expired validity time will be described with reference to FIGS. 22 and 23. FIG. 22 is a second diagram illustrating the bit string-set management list. FIG. 23 is a second diagram illustrating creation of a plurality of sets of bit strings.

When it is determined that it is the update timing (S101/YES), the information management unit 13 selects one session identifier of "1" which has not been selected among session identifiers stored in the session identifier field of the list information table T4 in FIG. 18 (S102).

The information management unit 13 creates a new fourth set of bit strings pp1-4 (see FIG. 25) and stores the created fourth set of bit strings pp1-4 in the memory 102 (S103). The information management unit 13 sets the fourth set of bit strings pp1-4 as the latest set of bit strings (S104). When there is a set of bit strings which has an expired validity time, the information management unit 13 deletes this bit string (S105).

It is assumed that the current point of time is "10:01-0.009" and the set of bit strings having an expired validity time is the first set of bit strings pp1-1. Thus, the information management unit 13 deletes the first set of bit strings pp1-1 (see "deletion" of an X-mark in FIG. 23).

If the fourth set of bit strings pp1-4 is created, the information management unit 13 creates a fourth sub-list list1-4 for the fourth set of bit strings pp1-4 (S106). The information management unit 13 stores an address of "p1-4-1" of the created IP identifier bit string, an address of "p1-4-2" of the created check sum bit string, and an address of "list1-3" of a sub-list for the previous set of bit strings, in the fourth sub-list list1-4 (S106). The information management unit 13 stores a validity time of "10:01-0.030" in the fourth sub-list list1-4 (S106).

The information management unit 13 stores an address of "list1-4" of a sub-list for the subsequent set of bit strings, in the third sub-list list1-3 (S106). The information management unit 13 deletes the address of "list1-1" of a sub-list of the previous set of bit strings which is the address of the sub-list for the deleted first set of bit strings pp1-1, from the second sub-list list1-2 (S106).

The information management unit 13 stores a leading address of a sub-list list1-2 for the oldest set of bit strings pp1-2 as the oldest set of bit strings address in the bit string-set management list p1-list of FIG. 22, in the bit string-set management list p1-list (S106). This leading address is "list1-2" (see dashed-line arrow).

The information management unit 13 stores a leading address of a sub-list list1-4 for the newest set of bit strings pp1-4 as the latest set of bit strings address of the bit string-set management list p1-list in FIG. 22, in the bit string-set management list p1-list (S106). This leading address is "list1-4" (see dotted-line arrow).

The information management unit 13 determines that all of the sessions have been selected (S107/YES), and causes the process to proceed to S101.

As described above, the information management unit 13 deletes a set of bit strings having an expired validity time, and a sub-list of this set of bit strings. The information management unit 13 appropriately updates the address of the sub-list for the previous set of bit strings, and the address of the sub-list for the set of bit strings subsequent to the sub-list in the created sub-list.

When the first sub-list list1-1 is created, since there is no sub-list created right before and right after creation of the first sub-list list1-1, the information management unit 13 does not update the address of the sub-list for the previous set of bit strings and the address of the sub-list for the subsequent set of bit strings. The information management unit 13 updates the latest set of bit strings address and the oldest set of bit strings address in the bit string-set management list p1-list every time the set of bit strings is created.

(Duplicate Packet Determination)

Next, the duplicate packet determination will be described. The duplication determination unit 14 according to the second embodiment stores management information of the obtained packet in the latest set of bit strings. In this manner, a probability that occurrence of a situation (see the beginning part of the descriptions for the second embodiment) in which a packet is deleted as a duplicate packet regardless of a not-obtained packet can be avoided is increased by storing the management information of the obtained packet in the latest set of bit strings.

When the duplication determination for the obtained packet is performed, the duplication determination unit 14 refers to IP identifier bit strings and check sum bit strings of all of the set of bit strings which have been created in the same session, and to the IP identifier and the check sum of the obtained packet. It is possible to determine whether or not the obtained packet is a duplicate packet, with high accuracy by using the references.

The reasons of increasing the probability of enabling avoidance of the occurrence of the described situation, and the reasons of the described determination with high accuracy will be described with reference to FIGS. 20 and 23. Here, in the descriptions of FIG. 20, it is assumed that the first set of bit strings pp1-1 is the latest set of bit strings. In addition, it is assumed that "0" is stored in all of the bit areas of the first set of bit strings pp1-1.

As described in the beginning part of the descriptions for the second embodiment, the obtaining unit 11 obtains the first packet including the IP identifier of "4" and the check sum of "1". The obtaining unit 11 obtains the second packet including the IP identifier of "11" and the check sum of "17".

If the obtaining unit 11 obtains those, the information management unit 13 stores "1" in the bit areas of the IP identifier bit string p1-1-1, which respectively correspond to the IP identifiers of "4" and "11" (see the reference signs of AR1*i* and AR2*i* in FIG. 20). The information management unit 13 stores "1" in the bit areas of the check sum bit string p1-1-2, which respectively correspond to the check sums of "1" and "17" (see the reference signs of AR1*c* and AR2*c* in FIG. 20). Then, the obtaining unit 11 obtains a plurality of packets.

Then, a period of time elapses, and the third set of bit strings pp1-3 is set as the latest set of bit strings. It is set that "0" is stored in all of the bit areas of the third set of bit strings pp1-3. The obtaining unit 11 obtains the third packet including the IP identifier of "4" and the check sum of "17".

It is assumed that the validity time of the first set of bit strings pp1-1 is expired at the current point of time when the third packet is obtained. Thus, as illustrated in FIG. 23, the information management unit 13 creates the fourth set of bit strings pp1-4, and deletes the first set of bit strings pp1-1.

The duplication determination unit 14 performs the duplication determination for the obtained packet with reference to the IP identifier bit string and the check sum bit string of the latest set of bit strings pp1-4. Here, the information management unit 13 confirms that the bit area of the IP identifier bit string p1-4-1 included in the latest set of bit strings pp1-4, which corresponds to the IP identifier of "4" of the obtained packet is "0". The information management unit 13 confirms that the bit area of the check sum bit string p1-4-2 included in the latest set of bit strings pp1-4, which corresponds to the check sum of "17" of the obtained packet is "0". Accordingly, the duplication determination unit 14 does not determine that the obtained packet is a duplicate packet.

Since the bit area of the IP identifier bit string p1-4-1 included in the latest set of bit strings pp1-4, which corresponds to the IP identifier of "4" of the obtained packet is "0", the information management unit 13 stores "1" in this bit area. Since the bit area of the check sum bit string p1-4-2 included in the latest set of bit strings pp1-4, which corresponds to the check sum of "17" of the obtained packet is "0", the information management unit 13 stores "1" in this bit area.

The duplication determination unit 14 performs the duplication determination for the obtained packet with reference to the IP identifier bit strings and the check sum bit strings of the sets of bit strings (pp1-2 and pp1-3) other than the latest set of bit strings. In this duplication determination, since the first set of bit strings pp-1 has been deleted, it is possible to avoid the occurrence of the situation (see the beginning part of the descriptions for the second embodiment) in which the packet is deleted as a duplicate packet regardless of a not-obtained packet.

As described above, the probability of enabling avoidance of the occurrence of the situation (see the beginning part of the descriptions for the second embodiment) in which the packet is deleted as a duplicate packet regardless of a not-obtained packet is increased by storing the management information of the obtained packet in the latest set of bit strings.

(Flow of Duplicate Packet Detection)

Next, details of the second embodiment will be described. FIGS. 24 to 28 are respectively a first flowchart to a fifth flowchart illustrating details of the duplicate packet detection processing in the second embodiment.

Figure 13:
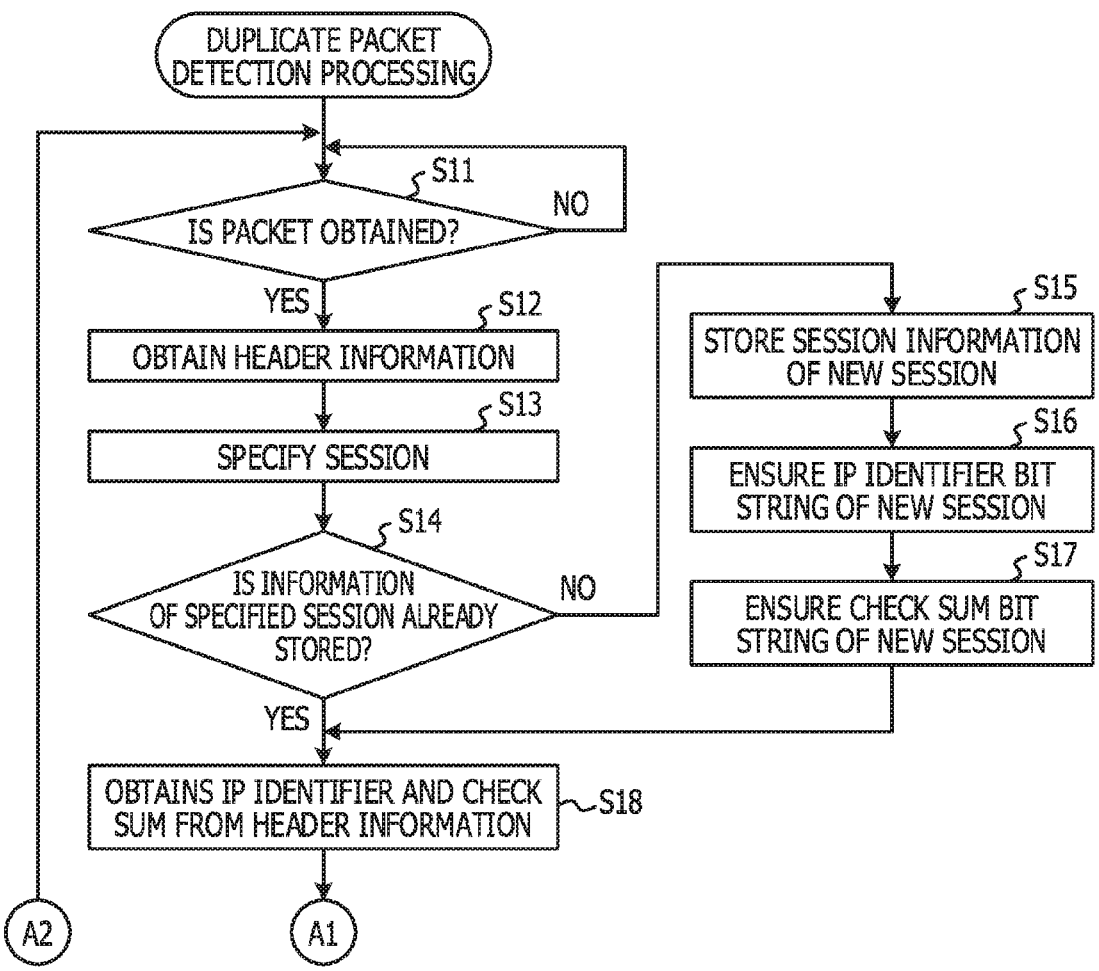
FIG. 13 is a first flowchart illustrating details of duplicate packet detection processing according to the first embodiment.
Figure 24:
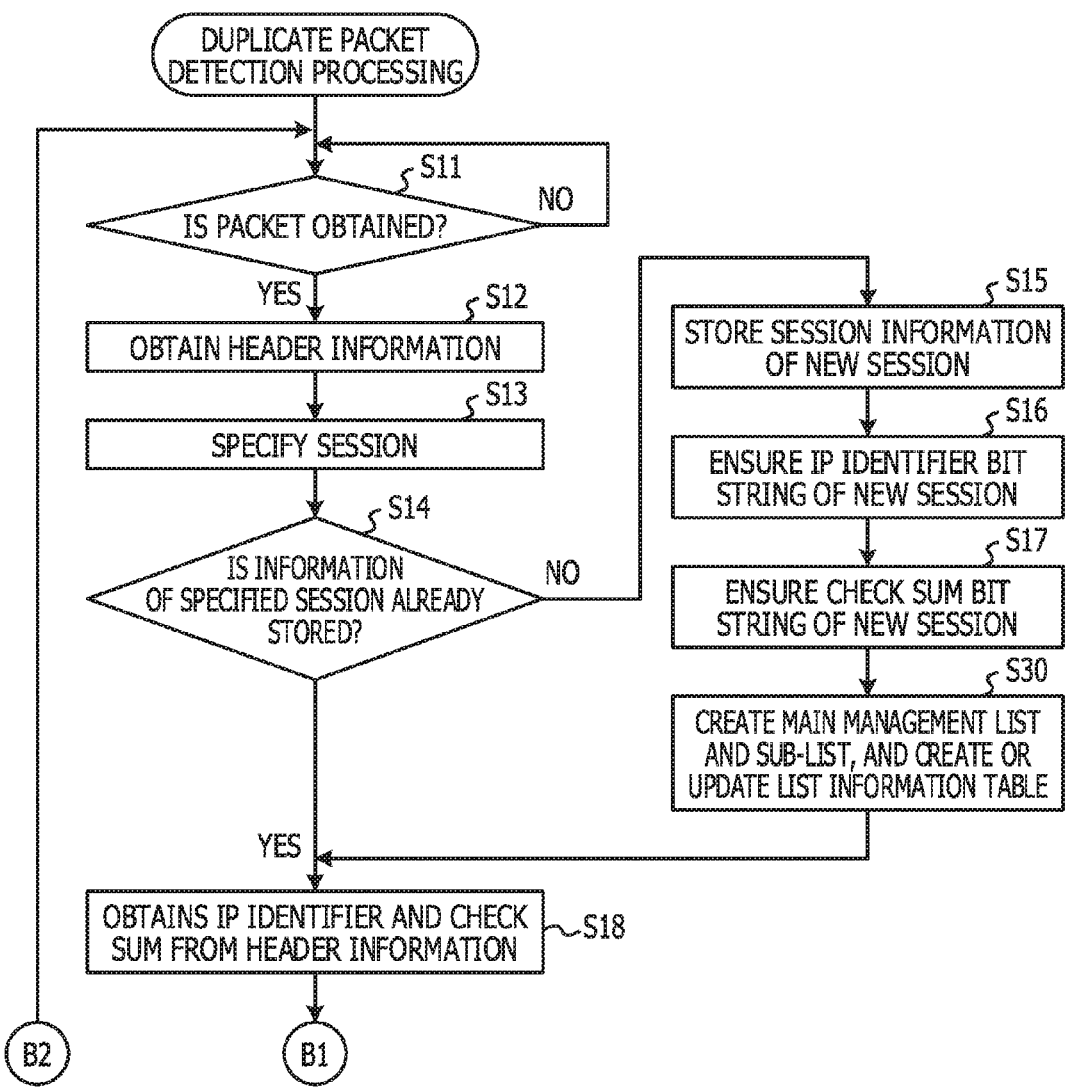
FIG. 24 is a first flowchart illustrating details of duplicate packet detection processing according to the second embodiment.

The flowchart in FIG. 24 is a flowchart obtained by adding the process of S30 between S17 and S18 in the flowchart of FIG. 13. In the following descriptions for the flowcharts, packets in the same session will be described.

In FIG. 24, if the processes of S11, S12, S13, and S14/NO are sequentially performed, the information management unit 13 ensures an IP identifier bit string for a new session (S16) and ensures a check sum bit string for the new session (S17). That is, the information management unit 13 generates new sets of bit strings (S16 and S17).

The IP identifier bit string ensured in S16 is an IP identifier bit string p1-1-1 of the first set of bit strings pp1-1 in FIG. 20, for example. The check sum bit string in S17 is a check sum bit string p1-1-2 in FIG. 20.

The information management unit 13 creates the bit string-set management list and the sub-list for the created set of bit strings which are illustrated in FIGS. 19 and 20. The information management unit 13 creates or updates the list information table T4 in FIG. 18 (S30).

In the example of FIG. 19, the information management unit 13 creates the bit string-set management list p1-list. When the bit string-set management list p1-list is created, the latest set of bit strings address and the oldest set of bit strings address of the bit string-set management list p1-list correspond to "list1-1". In the example of FIG. 19, the information management unit 13 creates the first sub-list list1-1. When the first sub-list list1-1 is created, an address of a sub-list for the set of bit strings subsequent to the first set of bit strings pp1-1 is blank.

The information management unit 13 stores the session identifier of the obtained packet and the leading address of the created bit string-set management list which are correlated with each other, in the list information table T4 of FIG. 18. As described in the first embodiment, in the following descriptions, packets which are transmitted and received in a session identified by the session identifier of "1" will be described. In the example of FIG. 18, the information management unit 13 stores "1" as the session identifier in the session identifier field and stores the address of "p1-list" of the bit string-set management list p1-list at a cell at which the line in which the session identifier of "1" is stored, intersects with an address field of the bit string-set management list.

Figure 25:
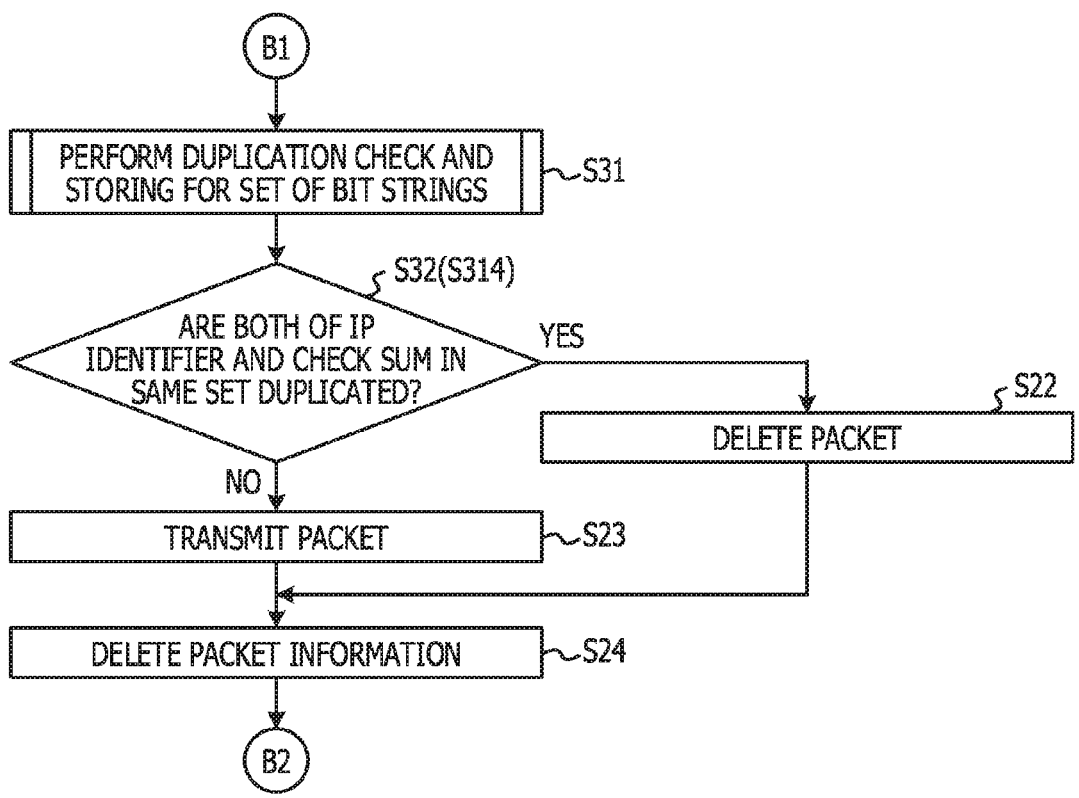
FIG. 25 is a second flowchart illustrating details of the duplicate packet detection processing according to the second embodiment.

Then, the process of S18 in FIG. 24 is performed and the process proceeds to S31 in FIG. 25. The flowchart in FIG. 25 is a flowchart obtained by substituting S19 and S20 in the flowchart of FIG. 14 with S31 and by substituting S21 with S32.

The duplication determination unit 14 performs the duplication determination and the storing processing for the set of bit strings (S31). The process of S31 in FIG. 25 will be described in detail with reference to FIG. 26.

(Selection of Latest Set of Bit Strings)

The duplication determination unit 14 selects the latest set of bit strings (S311). The latest set of bit strings is a set of bit strings which is most recently created by the information management unit 13. In the described example, the latest set of bit strings is the first set of bit strings pp1-1 in FIG. 20.

(Duplication Determination and Storing of IP Identifier)

The duplication determination unit 14 performs duplication determination and storing of the IP identifier with reference to the IP identifier of the obtained packet and the IP identifier bit string of the set of bit strings which is selected in S311 or S317 (which will be described later) (S312). The set of bit strings which is selected in S311 or S317 (which will be described later) is appropriately described below as a set of bit strings in selection. The process of S312 will be described in detail with reference to FIG. 27.

The duplication determination unit 14 refers to management information of the set of bit strings in selection, which corresponds to the obtained IP identifier (S3121). Specifically, the duplication determination unit 14 specifies an IP identifier bit string address of a sub-list for managing the set of bit strings in selection and specifies an IP identifier bit string corresponding to the specified IP identifier bit string address. In the described example, the duplication determination unit 14 specifies the IP identifier bit string p1-1-1 by using the IP identifier bit string address of "p1-1-1" stored in the first sub-list list1-1 for managing the first set of bit strings pp1-1. The specified IP identifier bit string is appropriately described below as a specific IP identifier bit string.

The duplication determination unit 14 refers to a bit area of the specific IP identifier bit string, which corresponds to the obtained IP identifier (S3121).

The duplication determination unit 14 determines whether or not the first information (for example, "1") corresponding to the obtained IP identifier is stored in the memory 102 (S3122). Specifically, the duplication determination unit 14 determines whether the first information is stored in the referred bit area.

When the first information is not stored in the memory 102 (S3122/NO), that is, when the first information is not stored in the referred bit area, the duplication determination unit 14 performs the process of S3123.

The duplication determination unit 14 determines whether the set of bit strings in selection is the latest set of bit strings (S3123). When the set of bit strings in selection is the latest set of bit strings (S3123/YES), the information management unit 13 performs the process of S3124. The information management unit 13 stores the first information corresponding to the obtained IP identifier, in the memory 102 (S3124). Specifically, the information management unit 13 stores the first information in the referred bit area.

Since the processes of S3122 and S3124 are similar to those of S192 and S193 which are illustrated in FIG. 15, specific descriptions will be omitted.

Figure 26:
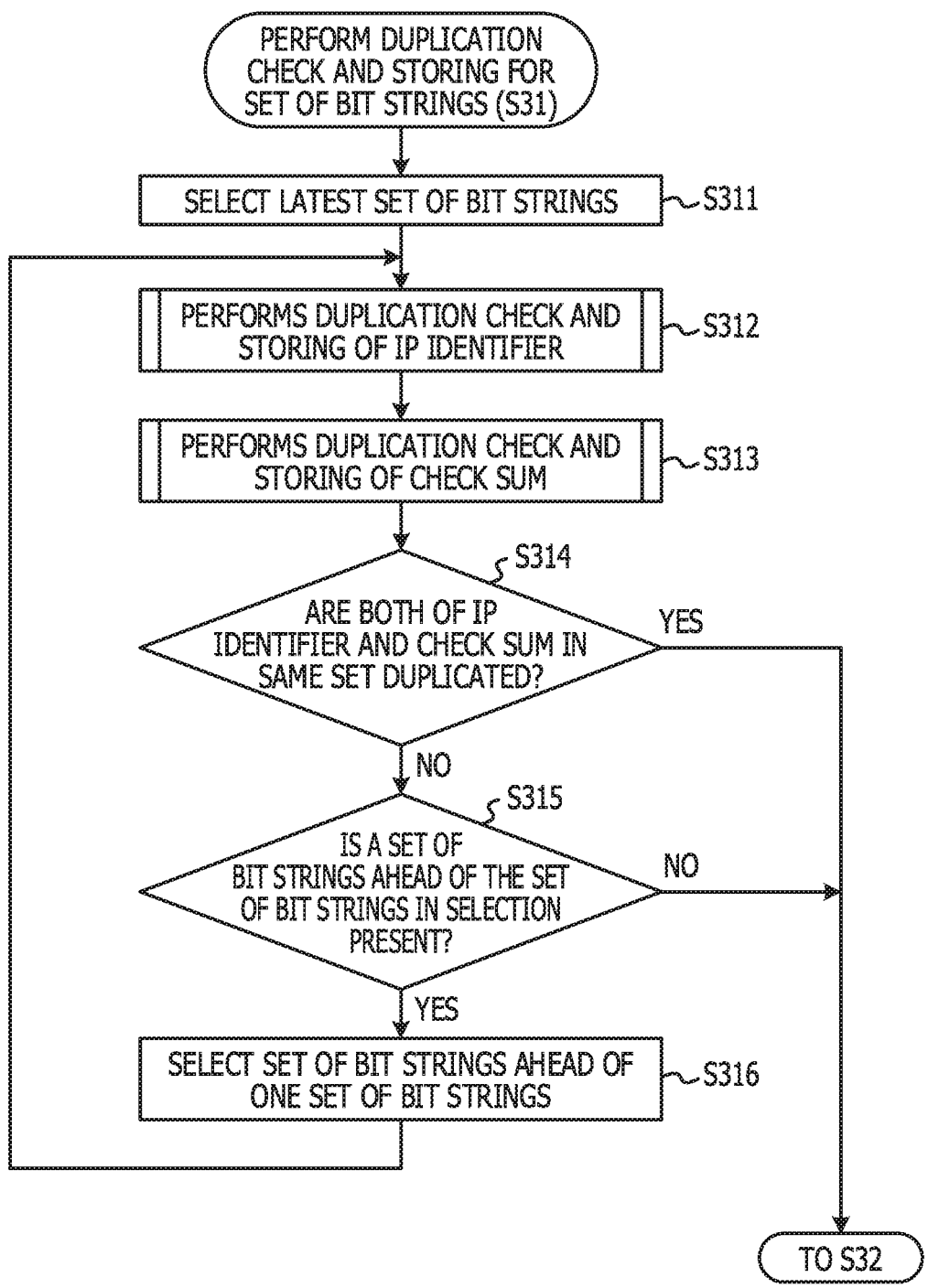
FIG. 26 is a third flowchart illustrating details of the duplicate packet detection processing according to the second embodiment.
Figure 27:
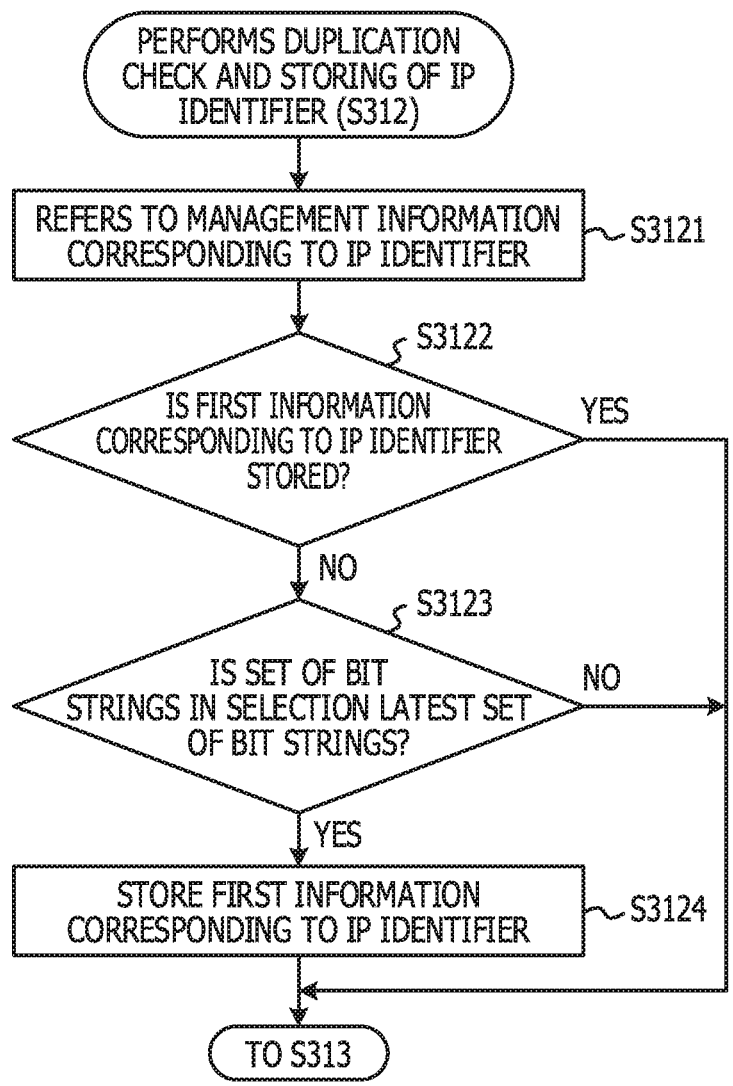
FIG. 27 is a fourth flowchart illustrating details of the duplicate packet detection processing according to the second embodiment.

When the process of S3124 is ended, or when it is determined to be YES in S3122 or NO in S3123, the process proceeds to S313 in FIG. 26.

(Duplication Determination and Storing of Check Sum)

The duplication determination unit 14 performs duplication determination and storing of the check sum with reference to the check sum of the obtained packet and the check sum bit string of the set of bit strings which is selected in S311 or S317 (which will be described later) (S313). The process of S313 will be described in detail with reference to FIG. 28.

The duplication determination unit 14 refers to management information of the set of bit strings in selection, which corresponds to the obtained check sum (S3131). Specifically, the duplication determination unit 14 specifies a check sum bit string address of a sub-list for managing the set of bit strings in selection and specifies a check sum bit string corresponding to the specified check sum bit string address. In the described example, the duplication determination unit 14 specifies the check sum bit string p1-1-2 by using the check sum bit string address of "p1-1-2" stored in the first sub-list list1-1 for managing the first set of bit strings pp1-1. The specified check sum bit string is appropriately described below as a specific check sum bit string.

The duplication determination unit 14 refers to a bit area of the specific check sum bit string, which corresponds to the obtained check sum (S3131).

The duplication determination unit 14 determines whether or not the second information (for example, "1") corresponding to the obtained check sum is stored in the memory 102 (S3132). Specifically, the duplication determination unit 14 determines whether the second information is stored in the referred bit area.

When the second information is not stored in the memory 102 (S3132/NO), that is, when the second information is not stored in the referred bit area, the duplication determination unit 14 performs the process of S3133.

The duplication determination unit 14 determines whether the set of bit strings in selection is the latest set of bit strings (S3133). When the set of bit strings in selection is the latest set of bit strings (S3133/YES), the information management unit 13 performs the process of S3134. The information management unit 13 stores the second information corresponding to the obtained check sum, in the memory 102 (S3134). Specifically, the information management unit 13 stores the second information in the referred bit area.

Since the processes of S3132 and S3134 are similar to those of S202 and S203 which are illustrated in FIG. 16, specific descriptions will be omitted.

When the process of S3134 is ended, or when it is determined to be YES in S3132 or NO in S3133, the process proceeds to S314 in FIG. 26.

(Duplication Determination)

The duplication determination unit 14 determines whether or not both of the IP identifier and the check sum in the same set are duplicated (S314). Determination that both of the IP identifier and the check sum in the same set are duplicated indicates that the obtained packet is the same packet as the packet which has been obtained previously, that is, the obtained packet is a duplicate packet.

As a case where both of the IP identifier and the check sum in the same set are duplicated, there is the following case. That is, the IP identifier bit string of the set of bit strings in selection may have determination of YES in S3122 of FIG. 27, and the check sum bit string of the set of bit strings in selection may have determination of YES in S3132 of FIG. 28.

When both of the IP identifier and the check sum in the same set are not duplicated (S314/NO), the duplication determination unit 14 performs determination of S315.

(Selection of Other Sets of Management Bits)

The duplication determination unit 14 determines whether or not a set of bit strings ahead of the set of bit strings in selection is present (S315). In the example, the set of bit strings in selection is the first set of bit strings pp1-1 in FIG. 20. Thus, a set of bit strings ahead of the set of bit strings in selection is absent at the current point of time.

When the set of bit strings ahead of the set of bit strings in selection is present (S315/YES), the duplication determination unit 14 selects a set of bit strings ahead of one set of bit strings from the set of bit strings in selection (S316). The set of bit strings ahead of one set of bit strings from the set of bit strings in selection is a set of bit strings which has been created right after the set of bit strings in selection is created. After the process of S316 is ended, the process proceeds to S312.

When both of the IP identifier and the check sum in the same set are duplicated (S314/YES), or when the set of bit strings ahead of the set of bit strings in selection is absent (S315/NO), the process proceeds to S32 in FIG. 25.

(Deletion or Transmission of Packet)

The duplication determination unit 14 determines whether both of the IP identifier and the check sum in the same set are duplicated (S32 (S314)). The determination processing of S32 is the same as the determination processing of S314 in FIG. 26.

When both of the IP identifier and the check sum in the same set are not duplicated (S314/NO), the transmission unit 15 transmits the obtained packet to the packet analyzer AD (S23). After transmission in S23, the process of S24 is performed and the process returns to S11 in FIG. 24. Determination that both of the IP identifier and the check sum in the same set are not duplicated means that the obtained packet is not a duplicate packet. Thus, the transmission unit 15 transmits the obtained packet to the packet analyzer AD.

When both of the IP identifier and the check sum in the same set are duplicated (S314/YES), the deletion unit 16 deletes the obtained packet (S22). Duplication of both of the IP identifier and the check sum in the same set means that the obtained packet is a duplicate packet. Thus, the deletion unit 16 deletes the obtained packet.

Hitherto, according to the second embodiment, processing of storing the management information of the obtained packet in the latest IP identifier bit string and the latest check sum bit string which have been created right recently is performed. As described above, the probability that occurrence of a situation (see the beginning part of the descriptions for the second embodiment) in which a packet is deleted as a duplicate packet regardless of a not-obtained packet can be avoided is increased by storing the management information of the obtained packet in the latest set of bit strings. As a result, it is possible to perform duplication determination with high accuracy.

Third Embodiment

In the duplicate packet detection apparatus DD according to the first embodiment and the second embodiment, duplication determination for a packet transmitted and received in communication (appropriately described below as communication of a random IP identifier) in which an IP identifier of a packet randomly varies is performed. The duplicate packet detection apparatus DD can also perform duplication determination for a packet transmitted and received in communication (appropriately described below as communication of a sequential IP identifier) in which an IP identifier of a packet is sequentially increased, by performing the duplication determination of the random IP identifier.

When the duplicate packet detection apparatus DD performs the duplication determination for a packet transmitted and received in communication of a sequential IP identifier, as described in the first and the second embodiments, is useless that the duplication determination of a check sum is performed with reference to the check sum. For example, when a bit string for a check sum is ensured in the memory, the ensured memory area is useless. In addition, processing of performing the duplication determination of the check sum is useless.

In a third embodiment, the duplicate packet detection apparatus DD which performs determination (appropriately described below as random determination) whether communication performed between the devices is communication of a random IP identifier or communication of a sequential IP identifier will be described.

In the third embodiment, if a new session is initiated, the duplicate packet detection apparatus DD performs random determination processing based on an identifier included in the obtained packet. In the random determination processing, it is determined whether the identifier included in the obtained packet is a random IP identifier which randomly varies. A random determination unit 17 stores a determination result and specific information which are correlated with each other, in the memory 102. The specific information is included in the obtained packet and is set for specifying a session.

When the identifier included in the obtained packet is a random IP identifier, the duplication determination unit 14 performs duplication determination of the IP identifier and the check sum and detects a duplicate packet, as described in the first or the second embodiment.

When the identifier included in the obtained packet is not a random IP identifier, the duplicate packet detection apparatus DD in the third embodiment performs the above-described one method. According to the third embodiment, the one method is the following processing. That is, when the identifier included in the obtained packet is not a random IP identifier, the duplication determination unit 14 determines whether the first information (for example, "1") corresponding to the IP identifier which is included in the obtained packet, is stored in the memory 102 in response to obtaining of a packet. When the first information is stored in the memory 102, the deletion unit 16 deletes the obtained packet. When the first information has been stored in the memory 102, the information management unit 13 stores the first information in the memory 102.

(Random Determination)

Figure 29A:
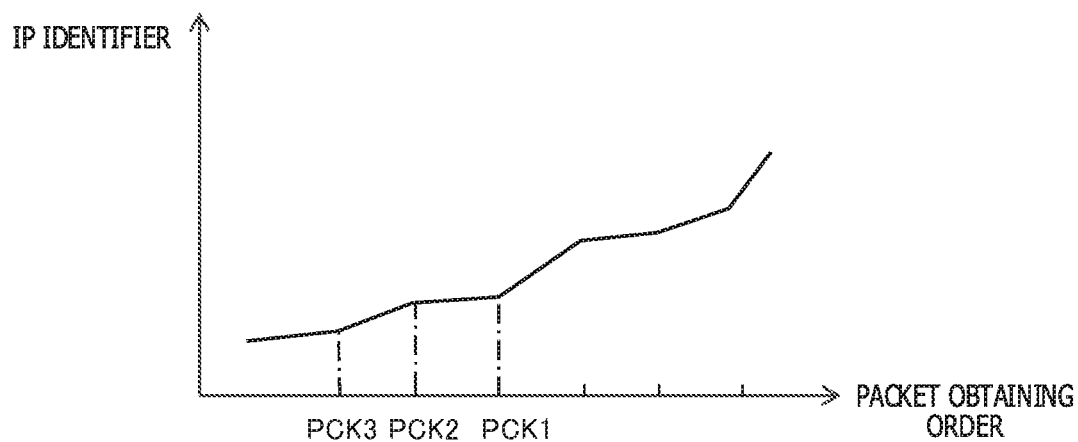
FIGS. 29A, 29B, and 29C are schematic diagrams illustrating a method of random determination.
Figure 29B:
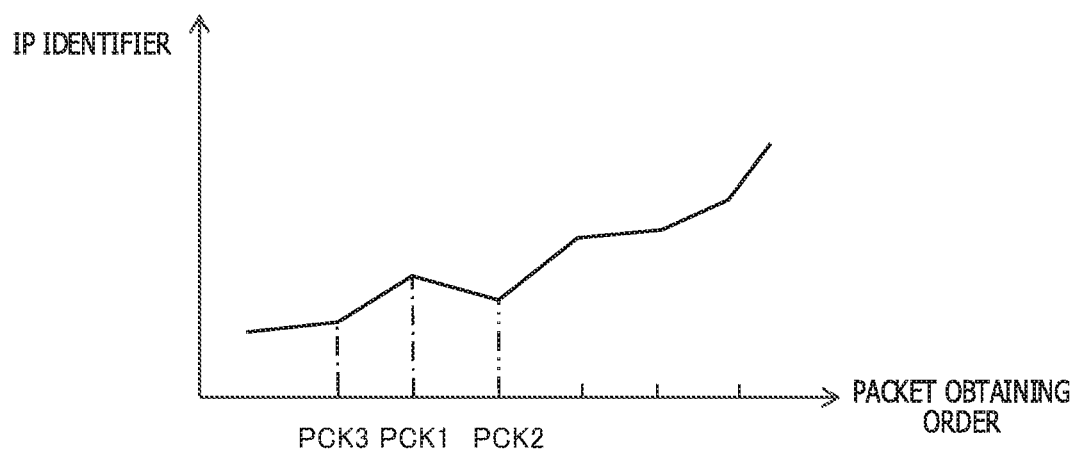
Figure 29C:
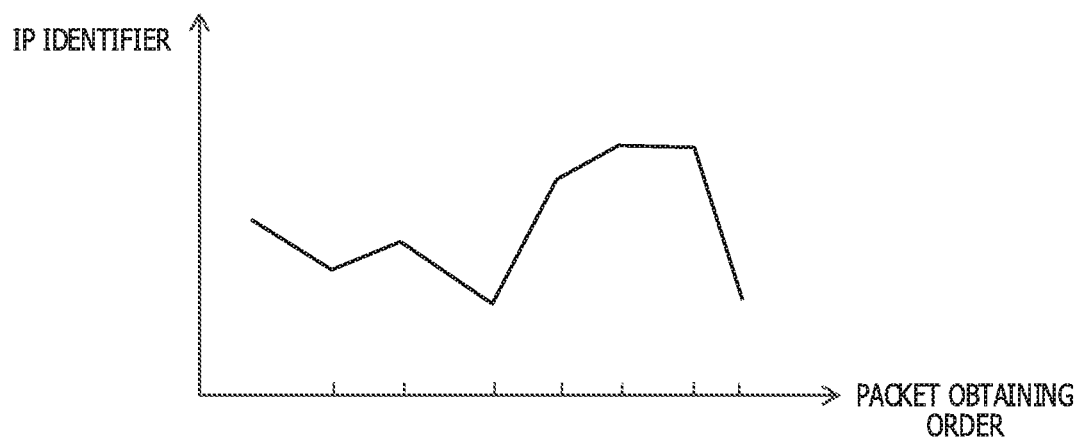

FIGS. 29A, 29B, and 29C are schematic diagram illustrating a method of random determination. FIG. 29A is a first graph illustrating a change of an IP identifier in the communication for a sequential IP identifier. FIG. 29B is a second graph illustrating a change of an IP identifier in the communication for a sequential IP identifier. FIG. 29C is a graph illustrating a change of an IP identifier in the communication for a random IP identifier.

In FIGS. 29A, 29B, and 29C, a horizontal axis indicates a packet obtaining order which represents an order of packets obtained by the duplicate packet detection apparatus DD. In FIGS. 29A, 29B, and 29C, a vertical axis indicates an IP identifier of a packet obtained by the duplicate packet detection apparatus DD.

As illustrated in the first graph of FIG. 29A, an IP identifier of a packet is increased in the packet obtaining order in the communication of a sequential IP identifier. This increase is described in detail with reference to FIG. 3.

When IP identifiers of a plural pieces of packets have values which are sequentially increased in the same session, the duplicate packet detection apparatus DD determines that this communication is the communication of a sequential IP identifier.

However, the IP identifiers may not be increased in the packet obtaining order in the communication of a sequential IP identifier. In this manner, the reason that an increase in the packet obtaining order is not performed is because the order of packets may be reversed so-called.

As illustrated in FIG. 2, the first server SVR1 transmits the first packet PCK1, the second packet PCK2, and the third packet PCK3 to the first client CT1 in this order. The first server SVR1 transmits the first packet PCK1 including an IP identifier "j", the second packet PCK2 including an IP identifier "j+1", and the third packet PCK3 including an IP identifier "j+2" in this communication. In this example, if the order of the packets is not reversed, the duplicate packet detection apparatus DD obtains the first packet PCK1 to the third packet PCK3 in an order of the first packet PCK1, the second packet PCK2, and the third packet PCK3.

However, if the order of packets is reversed between the first packet PCK1 and the second packet PCK2, the duplicate packet detection apparatus DD obtains the first packet PCK1 and the second packet PCK2 in an order of the second packet PCK2 and the first packet PCK1.

FIG. 29B illustrates a change of values of the IP identifiers occurring when the order of the packets is reversed between the first packet PCK1 and the second packet PCK2. In FIG. 29B, since the duplicate packet detection apparatus DD obtains the second packet PCK2 and the first packet PCK1 in this order, the value of the IP identifier is not increased in the packet obtaining order.

Such order reversal of packets occurs due to a little shift in the packet capturing processing or a process when the router and the like perform packet transmission. Thus, the order reversal of packets generally occurs only for one packet or about two packets. Even when values of IP identifiers of plural pieces of packets are not sequentially increased in association with communication in the same session, if the order reversal of the packet is detected, the duplicate packet detection apparatus DD determines that this communication is the communication of a sequential IP identifier.

As illustrated in FIG. 29C, an IP identifier in the communication of a random IP identifier do not relate to the packet obtaining order and a value thereof is randomly (that is, disorderly) increased.

(Software Block Diagram)

Figure 30:
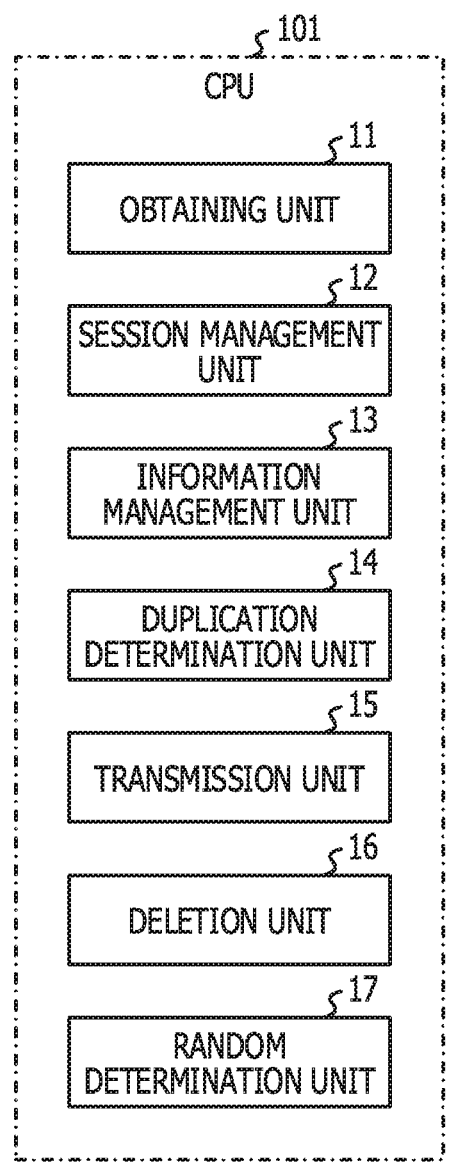
FIG. 30 is a software block diagram of a duplicate packet detection apparatus according to a third embodiment.

FIG. 30 is a software block diagram of the duplicate packet detection apparatus DD according to the third embodiment. The software block diagram in FIG. 30 is a diagram obtained by adding the random determination unit 17 to the software block diagram in FIG. 5. The random determination unit 17 determines whether this communication is the communication of a sequential IP identifier or the communication of a random IP identifier, based on an increase of IP identifiers of plural pieces of packets in association with the communication in the same session.

Specifically, the random determination unit 17 stores the plurality of obtained packets in the memory 102 in an obtaining order. When values of IP identifiers of the plurality of packets are not continuously increased in an obtaining order, the random determination unit 17 determines that the identifier of the obtained packet is a random IP identifier. When the values of the IP identifiers of the plurality of packets are continuously increased in the obtaining order, the random determination unit 17 determines that the identifier of the obtained packet is not a random IP identifier.

If the following case occurs even when the values of the IP identifiers of the plurality of packets are not continuously increased in the obtaining order, the random determination unit 17 determines the identifier of the obtained packet is not a random IP identifier, in order to handle order reversal of packets illustrated in FIGS. 29A, 29B, and 29C. That is, when an identifier of a second packet which is obtained ahead of a predetermined number of packets based on an identifier of a first packet among the plurality of packets is greater than the IP identifier, the random determination unit 17 determines that the identifier of the obtained packet is the random IP identifier. The predetermined number of packets is two, for example.

(Information Storage Area)

Next, the detection processing of a duplicate packet in the third embodiment will be described in detail with reference to FIGS. 31 to 39.

Figure 31:
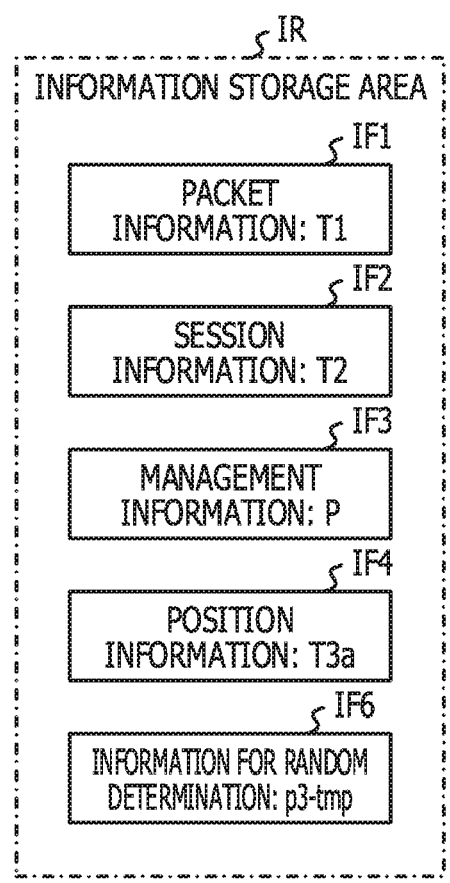
FIG. 31 is a schematic diagram illustrating a state where various types of information are stored in the information storage area in FIG. 4, in the third embodiment.

FIG. 31 is a schematic diagram illustrating a state where various types of information are stored in the information storage area IR of FIG. 4, in the third embodiment. FIG. 31 is a diagram obtained by adding the information IF6 for random determination to the diagram in FIG. 8.

FIG. 32 is a diagram illustrating position information IF4 in FIG. 31. The position information is stored in the memory 102 in a table format illustrated in FIG. 32. A state where a position information table T3a is stored as the position information IF4 in the memory 102 is schematically illustrated by "position information: T3a" in FIG. 31.

The position information table T3a is a table obtained by adding an IP identifier type field and a sequence for determination field to the position information table T3 in FIG. 12. In the position information table T3a, information is not stored in a blank field. Specific details of the IP identifier type field and the sequence for determination field will be described by using a specific example which will be described later.

FIGS. 33A, 33B, and 33C are diagrams illustrating information IF6 for random determination in FIG. 31. The information for random determination is information including an IP identifier and a check sum included in each of the plurality of packets. The information for random determination is stored in a table format illustrated in FIGS. 33A, 33B, and 33C. Information for random determination illustrated in FIGS. 33A, 33B, and 33C is appropriately described below as a sequence for random determination.

A sequence p3-tmp for random determination in FIGS. 33A, 33B, and 33C includes an IP identifier field and a check sum field. FIG. 33A illustrates a first example of the sequence p3-tmp for random determination. FIG. 33B illustrates a second example of the sequence p3-tmp for random determination. FIG. 33C illustrates a third example of the sequence p3-tmp for random determination.

A state where the sequence p3-tmp for random determination is stored as the information IF6 for random determination in the memory 102 is schematically illustrated by "information for random determination: p3-tmp" in FIG. 31.

Figure 34:
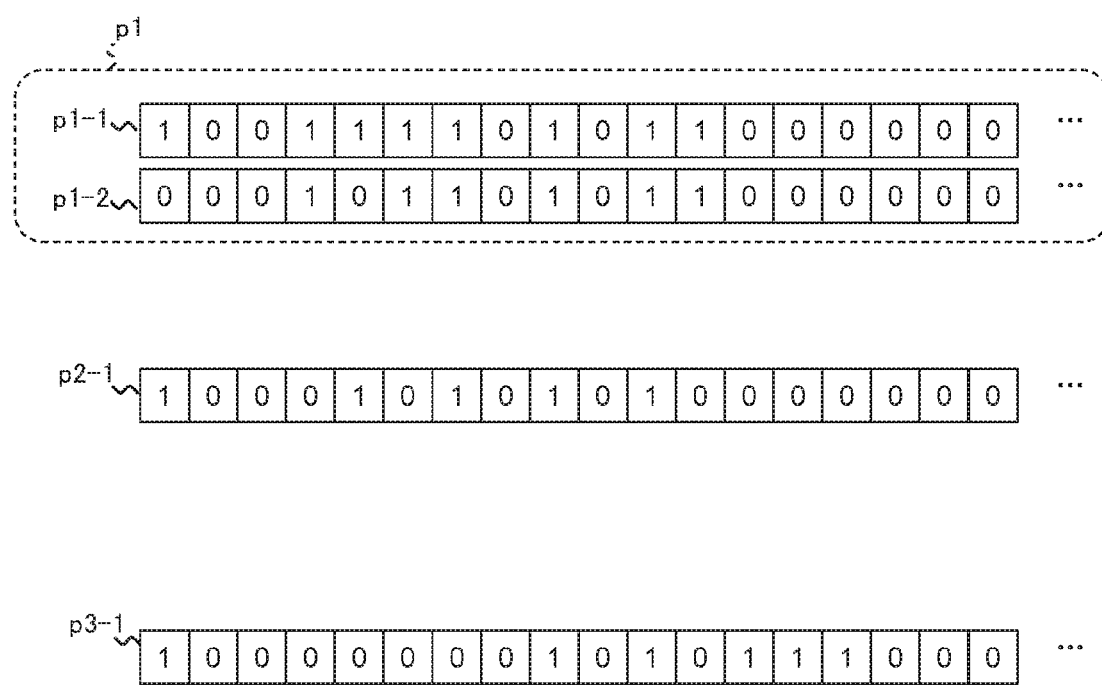
FIG. 34 is a diagram illustrating management information in FIG. 31.

FIG. 34 is a diagram illustrating management information IF3 in FIG. 31. The management information is stored in the memory 102 in a bit string format illustrated in FIG. 34. A state where a set of bit strings p1, an IP identifier bit string p2-1, and an IP identifier bit string p3-1 are stored as the management information IF3 in the memory 102 is schematically illustrated by "management information: P" in FIG. 31.

(Flow of Duplicate Packet Detection)

Figure 35:
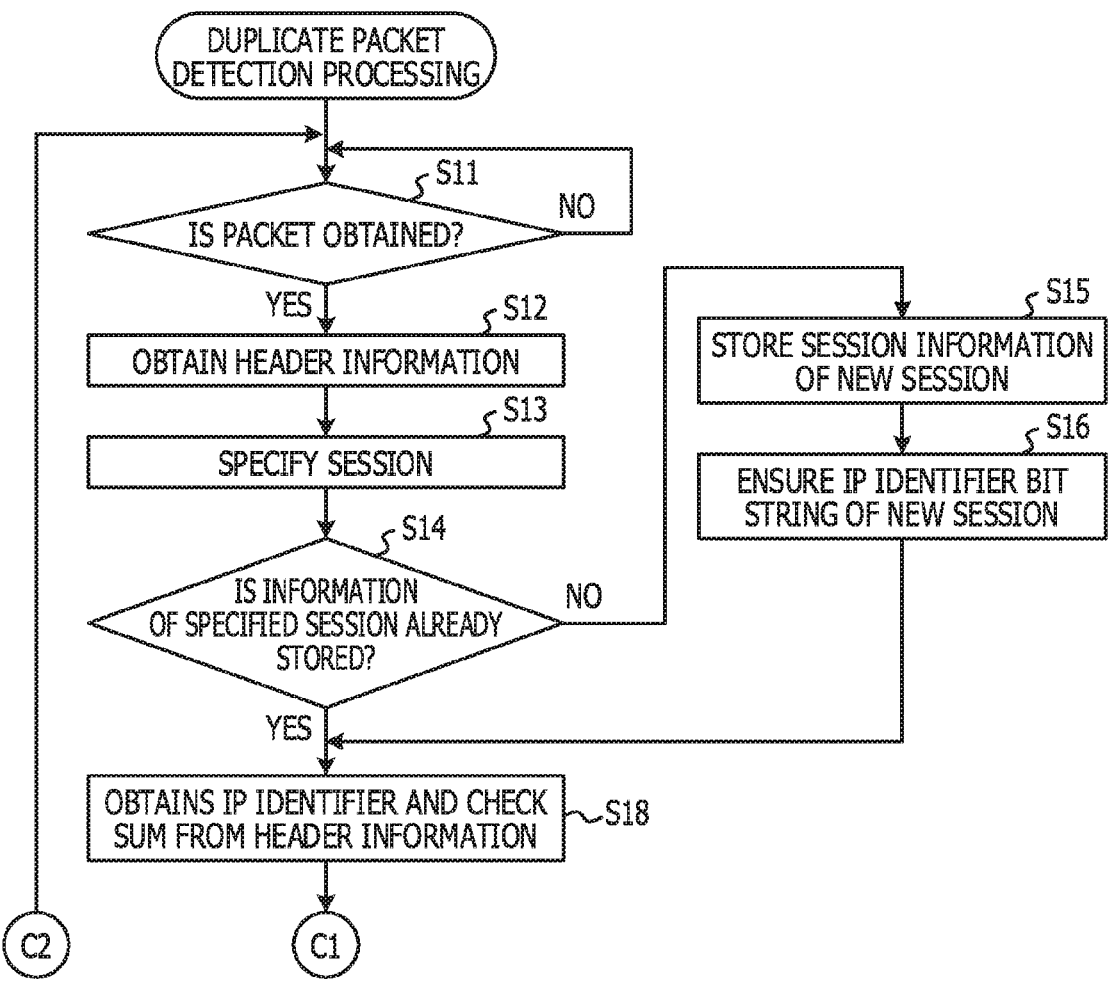
FIG. 35 is a first flowchart illustrating details of duplicate packet detection processing according to the third embodiment.

Next, details of the third embodiment will be described. FIGS. 35 to 39 are respectively a first flowchart to a fifth flowchart illustrating details of the duplicate packet detection processing in the third embodiment. The flowchart in FIG. 35 is a flowchart obtained by omitting the process of S17 from the flowchart in FIG. 13. In FIG. 35, after the process of S16 is ended, the process proceeds to S18, and after the process of S18 is ended, the process proceeds to S41 in FIG. 36.

The random determination unit 17 determines whether determination whether or not an IP identifier of the obtained packet is a random IP identifier is completed (S41).

When the determination whether or not an IP identifier of the obtained packet is a random IP identifier is not completed (S41/NO), the random determination unit 17 performs random determination on the obtained packet (S42). Details of the process of S42 will be described with reference to FIG. 37.

The duplication determination unit 14 determines whether an IP identifier of the obtained packet is a random IP identifier (S43). When the IP identifier of the obtained packet is a random IP identifier (S43/YES), the duplication determination unit 14 performs duplication determination and the like for a random IP identifier. Specifically, the duplication determination unit 14 performs the processes of S19 to S24 illustrated in FIG. 14 (S43).

When the IP identifier of the obtained packet is not a random IP identifier (S43/NO), the duplication determination unit 14 performs duplication determination and the like for a sequential IP identifier (S45). The process of S45 will be described with reference to FIG. 39. After the process of S44 or S45 is ended, the process proceeds to S11 in FIG. 35.

Next, the random determination (S42) will be described in detail. Before the random determination is described, it is assumed that no information is stored in the position information table T3a of FIG. 32. The obtaining unit 11 obtains a plurality of packets (for example, a first packet to a fourth packet) in association with a session identified by the session identifier of "1" which is described in the first embodiment. When the obtaining unit 11 obtains the first packet, the processes of S12 and S13 are performed. Here, the session management unit 12 does not store the session information of the session identified by the session identifier of "1" (S14/NO). Thus, the session management unit 12 stores the session information regarding the session (that is, new session) of the obtained packet, in the information storage area IR based on, for example, information included in the obtained IP header (S15). In S15, the session management unit 12 stores the session identifier of "1" in the session identifier field of the storing position information table T3a in FIG. 32 (see "1" of the session identifier field) (S15).

Then, the information management unit 13 ensures an IP identifier bit string for the new session (S16). Specifically, the information management unit 13 ensures the IP identifier bit string p1-1 illustrated in FIG. 34, in the memory 102 (S16). The information management unit 13 stores a leading address of the IP identifier bit string p1-1, which is correlated with the session identifier of "1", in a management bit address-IP identifier field of the storing position information table T3a in FIG. 32 (S16).

Then, for example, the information management unit 13 obtains an IP identifier included in an IP header of the obtained packet and obtains a check sum included in a TCP header of the obtained packet (S18).

The random determination unit 17 determines whether determination whether or not an IP identifier of the obtained packet is a random IP identifier is completed (S41). Specifically, the random determination unit 17 determines whether a character string of "random" or a character string of "sequential" is stored in a cell of the position information table T3a in FIG. 32. The cell is a cell at which a line in which the session identifier (for example, "1") of the obtained packet is stored intersects with the IP identifier type field.

When either of the character string of "random" and the character string of "sequential" is stored in this cell, the random determination unit 17 determines that the determination whether the IP identifier of the obtained packet is a random IP identifier is completed (S41/YES). When none of the character string of "random" and the character string of "sequential" is stored in this cell, the random determination unit 17 determines that the determination whether or not the IP identifier of the obtained packet is a random IP identifier is not completed (S41/NO). When none of the character string of "random" and the character string of "sequential" is stored in this cell, the random determination unit 17 stores a character string of "not-determination" at this cell.

In this example, none of the character string of "random" and the character string of "sequential" is stored in the cell at which the line in which the session identifier (for example, "1") of the obtained packet is not stored intersects with the IP identifier type field. Thus, the random determination unit 17 determines that the determination whether or not the IP identifier of the obtained packet is a random IP identifier is not completed (S41/NO).

Then, the random determination unit 17 performs the random determination (S42). An example of the random determination (S42) will be described with reference to FIG. 37.

The random determination unit 17 stores the IP identifier and the check sum of the obtained packet in a sequence for random determination (for example, sequence p3-$tmp$ for random determination in FIG. 33A) (S421).

The random determination unit 17 stores an IP identifier and a check sum of a packet in the same line of the sequence for random determination in an order of packets obtained by the obtaining unit 11, in this storing.

When the sequence for random determination for the obtained packet is not ensured in the memory 102, the random determination unit 17 ensures a memory area for the sequence for random determination in the memory 102.

If this ensuring is completed, the information management unit 13 stores a leading address of the sequence p3-$tmp$ for random determination at a cell at which a line in which the session identifier (for example, "1") of the obtained packet intersects with the sequence for determination field in the storing position information table T3a of FIG. 32 (S421). The leading address is set as "p3-$tmp$" which is the reference sign of the sequence p3-$tmp$ for random determination.

After this ensuring is completed, when the IP identifier of the obtained packet is "1001", the random determination unit 17 stores "1001" in the IP identifier field of the sequence p3-$tmp$ for random determination in FIG. 33A (S421). When the check sum of this packet is "104", the random determination unit 17 stores "104" in the check sum field of the sequence p3-$tmp$ for random determination in FIG. 33A (S421).

The random determination unit 17 determines whether IP identifiers corresponding to the number of times performing the random determination are stored in the sequence p3-$tmp$ for random determination (S422). The number of times performing the random determination may be appropriately adjusted, and for example, is four. As the number of times performing the random determination becomes greater, the accuracy of the random determination is improved. However, a period for the random determination becomes longer. A manager of the information processing system determines the optimum number of times performing the random determination in consideration of the accuracy of the random determination and the period for the random determination.

When random determination unit 17 does not store the IP identifiers corresponding to the number of times performing the random determination in the sequence p3-$tmp$ for random determination (S422/NO), the process returns to S11 in FIG. 35. In the described example, since one IP identifier is stored, the process returns to S11 in FIG. 35.

Then, when the obtaining unit 11 obtains the second packet (S11/YES), the processes of S12 and s13 are performed. Since the second packet is a communication packet in the same session as that of the first packet, the session management unit 12 stores the session information of the session identified by the session identifier of "1" (S14/YES). Thus, the process of S18 is performed. Since the determination whether or not the IP identifier of the obtained packet is a random IP identifier is not completed (S41/NO), the random determination unit 17 performs the random determination (S42).

The random determination unit 17 stores an IP identifier (for example, "258") of the obtained packet in the IP identifier field of the sequence p3-$tmp$ for random determination in FIG. 33A (S421). The random determination unit 17 stores a check sum (for example, "502") of the obtained packet in the check sum field of the sequence p3-$tmp$ for random determination in FIG. 33A (S421).

The random determination unit 17 determines whether the IP identifiers corresponding to the number of times performing the random determination are stored in the sequence p3-$tmp$ for random determination (S422). After the determination of NO in S422, the process returns to S11 in FIG. 35.

Subsequently, the processes (S12, S13, S14/YES, S18, S41/NO, and S421) performed on the second packet are performed on a third packet and a fourth packet. As a result, the sequence p3-*tmp* for random determination in FIG. 33A is created. After the creation, the random determination unit 17 determines whether the IP identifiers corresponding to the number of times performing the random determination are stored in the sequence p3-*tmp* for random determination (S422).

The random determination unit 17 stores IP identifiers corresponding to the number (for example, 4) of times performing the random determination are stored in the sequence p3-*tmp* for random determination, as illustrated with the sequence p3-*tmp* for random determination in FIG. 33A. Thus, the random determination unit 17 determines that the IP identifiers corresponding to the number of times performing the random determination are stored in the sequence p3-*tmp* for random determination (S422/YES).

The random determination unit 17 performs the random determination based on the IP identifier which is stored in the sequence for determination (S423). When IP identifiers stored in the sequence for determination are not sequentially increased, but randomly increased, the random determination unit 17 determines that the IP identifiers are random IP identifiers. In the example of the sequence p3-*tmp* for random determination in FIG. 33A, the IP identifiers stored in the IP identifier field are "1001", "258", "110", and "4520". These identifiers of "1001", "258", "110", and "4520" are not sequentially increased, but randomly increased as illustrated in FIG. 29C. Accordingly, the random determination unit 17 determines that the IP identifiers are random IP identifiers.

Then, the random determination unit 17 causes flags of random determination completion, which correspond to the session identifier (for example, "1") of the first to the fifth packets to be ON (S424). Specifically, if the session identifier (for example, "1") of the first to the fifth packets is stored in the position information table T3a of FIG. 32, the random determination unit 17 stores a determination result at a cell at which the line of the session identifiers and the IP identifier type field intersects with each other (S424). Since the determination result indicates that the IP identifiers are random IP identifiers, the character string for determination result is "random".

The information management unit 13 determines whether determination that the IP identifier is a random IP identifier is performed in S423 (S425). When the IP identifier is a random IP identifier (S425/YES), the information management unit 13 ensures a check sum bit string for the new session (S426). Specifically, the information management unit 13 ensures the check sum bit string p1-2 illustrated in FIG. 34, in the memory 102. When the check sum bit string p1-2 is ensured in the memory 102, the information management unit 13 stores "0" in all of the bit areas of the check sum bit string p1-2. The information management unit 13 stores a leading address (for example, "p1-2") of the check sum bit string p1-2, which is correlated with the session identifier of "1", in the management bit address-check sum field of the storing position information table T3a in FIG. 32.

The information management unit 13 stores the IP identifier and the check sum for the sequence for determination in the bit string (S427).

Specifically, the information management unit 13 stores the first information (for example, "1") in the bit area of the IP identifier bit string p1-1, which corresponds to each of the IP identifiers "1001", "258", "110", and "4520" stored in the sequence p3-*tmp* for random determination of the FIG. 33A. The information management unit 13 stores the check sum for the sequence for determination in the check sum bit string ensured in S426 (S427). Specifically, the information management unit 13 stores the second information (for example, "1") in the bit area of the check sum bit string p1-2, which corresponds to each of the check sums "104", "502", "105821", and "2014" stored in the sequence p3-*tmp* for random determination of the FIG. 33A (S427).

Then, the random determination unit 17 opens the storage area (for example, sequence p3-*tmp* for random determination in FIG. 33A) for the sequence for random determination (S428). The random determination unit 17 deletes the leading address of the sequence p3-*tmp* for random determination in FIG. 33A stored at the cell at which the line in which the session identifier of "1" is stored in the storing position information table T3a of FIG. 32 intersects with the sequence for determination field, when the random determination unit 17 opens the storage area. This deletion is indicated by "p3-*tmp*→deletion".

When it is determined that the IP identifier is not a random IP identifier (S425/NO), the IP identifier for the sequence for determination is stored in the IP identifier bit string (S427).

Specific descriptions will be made. Here, it is assumed that the sequence p3-*tmp* for random determination in FIG. 33B is stored in the memory 102. The information management unit 13 stores the first information (for example, "1") in the bit area of the IP identifier bit string p1-1, which corresponds to each of the IP identifiers "101", "102", "103", and "104" stored in the sequence p3-*tmp* for random determination of the FIG. 33B. Then, the process proceeds to S428.

(One Example of Random Determination Method)

Figure 37:
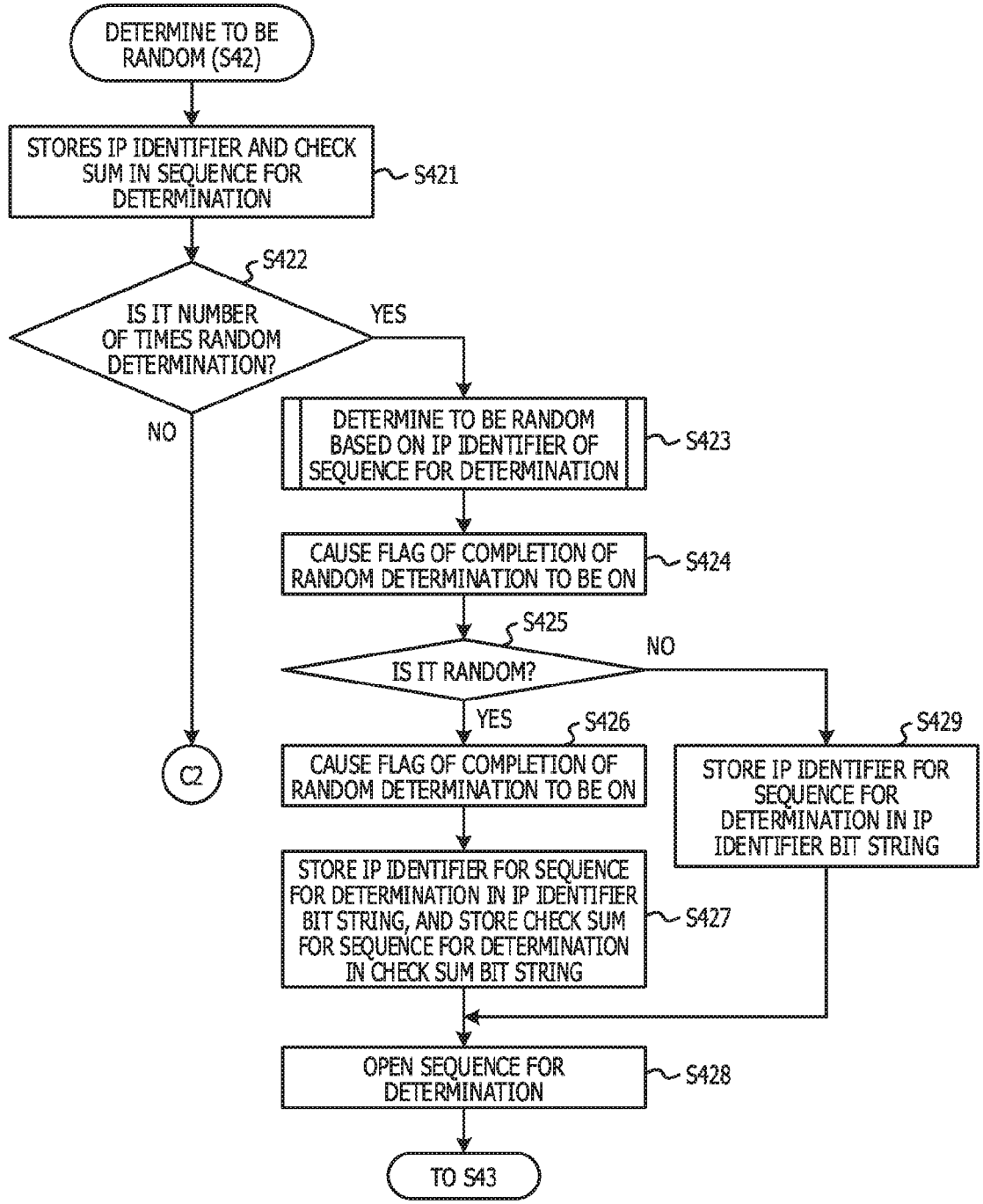
FIG. 37 is a third flowchart illustrating details of the duplicate packet detection processing according to the third embodiment.
Figure 38:
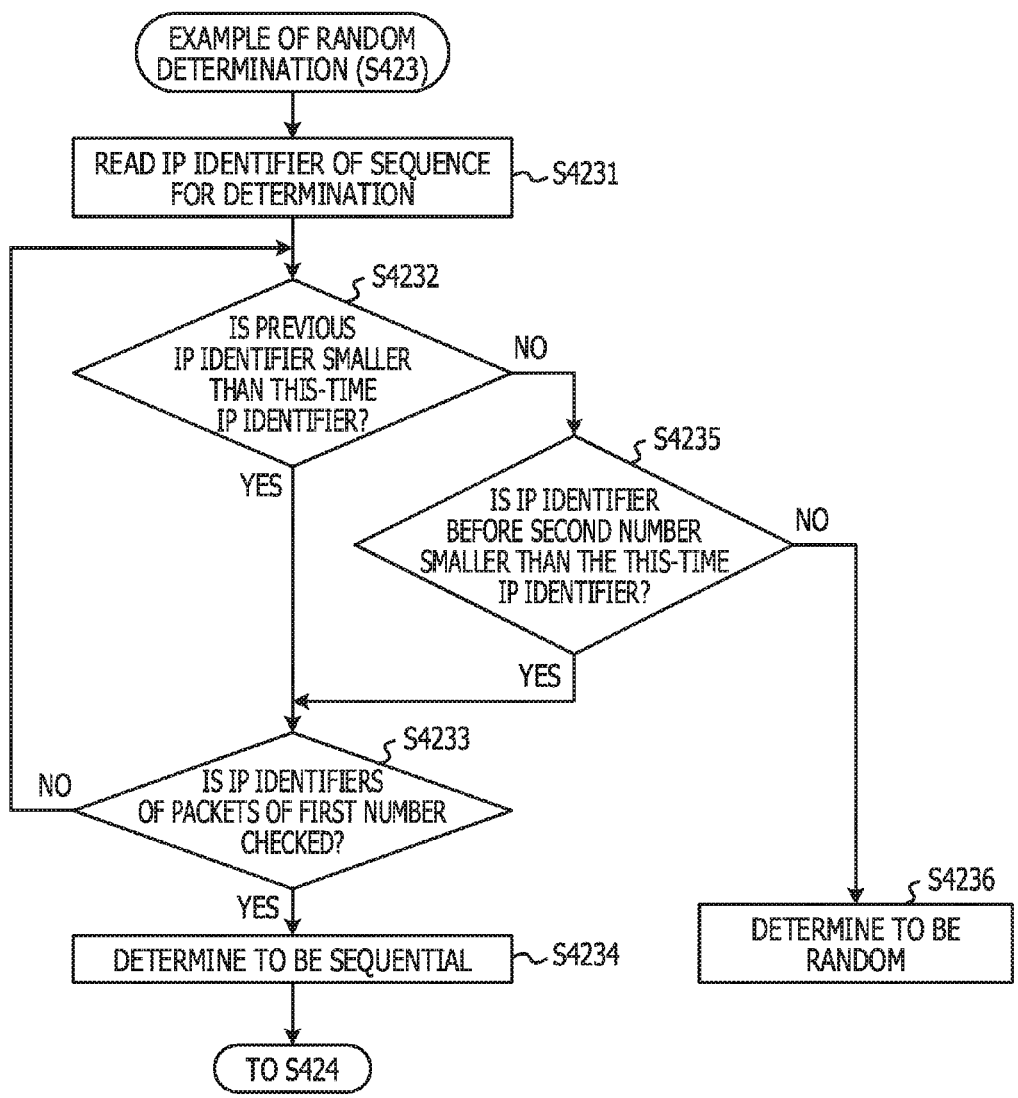
FIG. 38 is a fourth flowchart illustrating details of the duplicate packet detection processing according to the third embodiment.

Next, one example of the random determination (S423) in FIG. 37 will be described with reference to FIG. 38. FIG. 38 is a flowchart illustrating the one example of the random determination (S423) in FIG. 37.

The random determination unit 17 reads an IP identifier stored in the sequence p3-*tmp* for random determination (S4231).

The random determination unit 17 determines whether the previous IP identifier is smaller than the this-time IP identifier (S4232). It is determined whether or not the IP identifier is a random IP identifier, through the determination of S4232. In S4232, the random determination unit 17 performs the following processes. That is, the random determination unit 17 selects an identifier which has not been selected as the this-time identifier among IP identifiers which have been read out, and sets the selected identifier as the this-time identifier. The random determination unit 17 sets an IP identifier included in a packet which has been obtained by the obtaining unit 11, for example, before once from the packet including the this-time identifier, as the previous IP identifier.

When the previous IP identifier is smaller than the this-time IP identifier (S4232/YES), the random determination unit 17 determines IP identifiers of packets corresponding to a first number are checked (S4233). The first number is two, for example. Specifically, the random determination unit 17 determines whether the determination processing in S4232 is performed the same number of times as the first number.

In this manner, determination accuracy in the process of determining whether or not the IP identifier is a random IP identifier is improved by performing the determination processing in S4232 the same number of times as the first number. The first number may be appropriately adjusted similarly to the number of times performing random determination (see S422). As the first number becomes greater, the accuracy of the random determination is improved more. However, the period for the random determination becomes longer. The first number is determined to be optimum in consideration of the accuracy of the random determination and the period for the random determination.

When the IP identifiers of the first number of packets are checked (S4233/YES), the random determination unit 17 determines that the IP identifier is a sequential IP identifier (S4234). After this determination (S4234), the process proceeds to S424 in FIG. 37.

When the previous IP identifier is smaller than the this-time IP identifier (S4232/NO), the random determination unit 17 determines whether an IP identifier before a second number from the this-time IP identifier is smaller than the this-time IP identifier (S4235). Even when the order of packets illustrated in FIG. 29B is reversed, it is determined that the IP identifier is a sequential IP identifier, based on the determination of S4235.

The this-time IP identifier is an IP identifier included in a certain packet (described below as a packet X). The second number is two, for example. The IP identifier before the second number is an IP identifier of a packet obtained by the obtaining unit 11 before the second number from the packet X. In the example of FIG. 29B, in specific descriptions, the this-time IP identifier is an IP identifier included in the second packet PCK2. The IP identifier before the second number (for example, 2) is the third packet PCK3. The second number is a predetermined number illustrated in FIG. 30, and may be appropriately adjusted.

If the IP identifier before the second number is smaller than the this-time IP identifier (S4235/YES), the random determination unit 17 performs determination of S4233, which is described already. When the IP identifier before the second number is smaller than the this-time IP identifier (S4235/YES), the probability of occurrence of order reversal of packets is high. Thus, determination whether or not the IP identifier is a random IP identifier is continuously performed.

If the random determination unit 17 determines that the IP identifier before the second number is not smaller than the this-time IP identifier (S4235/NO), the random determination unit 17 determines that the IP identifier is a random IP identifier (S4236). After this determination (S4236), the process proceeds to S424 in FIG. 37.

When the previous IP identifier is not smaller than the this-time IP identifier (S4232/NO), and the IP identifier before the second number is not smaller than the this-time IP identifier (S4235/NO), it can be considered that the IP identifier of the obtained packet is randomly increased. As illustrated in FIG. 29C, the random determination unit 17 determines that the IP identifier is a random IP identifier.

(Specific Descriptions of Random Determination)

An example of the random determination will be specifically described with reference to FIGS. 33A, 33B, and 33C, and FIG. 38. Before specific descriptions of the one example of the random determination, the sequence p3-*tmp* for random determination in FIGS. 33A, 33B, and 33C will be described. The random determination unit 17 stores the IP identifier and the check sum of packets in the same line of the sequence p3-*tmp* for random determination in FIGS. 33A, 33B, and 33C, in an order from an upper part in accordance with the order of packets obtained by the obtaining unit 11, as described in S421 of FIG. 37.

Firstly, a case where the sequence p3-*tmp* for random determination in FIG. 33A is stored in the memory 102 will be specifically described as an example of the random determination.

The random determination unit 17 reads an IP identifier stored in the sequence p3-*tmp* for random determination of FIG. 33A (S4231).

In S4232, the random determination unit 17 selects an IP identifier of a packet which has been recently obtained by the obtaining unit 11, from IP identifiers in the sequence p3-*tmp* for random determination of FIG. 33A. This selected identifier is the this-time IP identifier. Then, the random determination unit 17 selects an IP identifier ahead of one IP identifier from the selected IP identifier in S4232. The IP identifier ahead of one IP identifier is the previous IP identifier.

In the following descriptions, an IP identifier ahead of r (where, r is an integer of 1 or more) IP identifiers from a certain identifier (described below as an identifier X) is an IP identifier stored at a cell above r cells from the cell at which the identifier X is stored, in the sequence p3-*tmp* for random determination.

In S4232, the random determination unit 17 selects an IP identifier of "4520" stored in the lowest cell, as the this-time IP identifier from the IP identifier in the sequence p3-*tmp* for random determination of FIG. 33A. The random determination unit 17 selects an IP identifier of "110" before one IP identifier from the this-time identifier of "4520", as the previous IP identifier from the IP identifier in the sequence p3-*tmp* for random determination of FIG. 33A.

The previous IP identifier of "110" is smaller than the this-time IP identifier of "4520". The random determination unit 17 checks an IP identifier of one packet. Thus, the random determination unit 17 determines YES in S4232 and NO in S4233, and causes the process to return to S4232.

In S4232 performed subsequently to the process of S4232 performed the second time, the random determination unit 17 sets the previous IP identifier at the current point of time as the this-time IP identifier and sets an identifier ahead of one identifier from the this-time identifier, as the previous IP identifier. In the described example, the random determination unit 17 sets the previous IP identifier of "110" at the current point of time as the this-time IP identifier of "110" and sets an identifier of "258" ahead of one identifier from the this-time identifier of "110", as the previous IP identifier of "258".

The previous IP identifier of "258" is greater than the this-time IP identifier of "110" (S4232/NO). The IP identifier of "1001" ahead of two IP identifier from the this-time identifier of "110" is greater than the this-time IP identifier of "110" (S4235/NO). Thus, the random determination unit 17 determines NO in S4232 and NO in S4235, and determines that the IP identifier is a random IP identifier (S4236).

With the above descriptions, the IP identifier stored in the sequence p3-*tmp* for random determination of FIG. 33A is determined to be a random IP identifier.

Next, a case where the sequence p3-*tmp* for random determination in FIG. 33B is stored in the memory 102 will be specifically described as an example of the random determination.

The random determination unit 17 reads an IP identifier stored in the sequence p3-*tmp* for random determination of FIG. 33B (S4231).

In S4232, the random determination unit 17 selects an IP identifier of "104" stored in the lowest cell, as the this-time IP identifier from the IP identifier in the sequence p3-*tmp* for random determination of FIG. 33B. The random determination unit 17 selects an IP identifier of "103" before one IP identifier from the this-time identifier of "104", as the previous IP identifier from the IP identifier in the sequence p3-*tmp* for random determination of FIG. 33B.

The previous IP identifier of "103" is smaller than the this-time IP identifier of "104". The random determination unit 17 checks an IP identifier of one packet. Thus, the random determination unit 17 determines YES in S4232 and NO in S4233, and causes the process to return to S4232.

In S4232 performed subsequently to the process of S4234 performed the second time, the random determination unit 17 sets the previous IP identifier at the current point of time as the this-time IP identifier and sets an identifier ahead of one identifier from the this-time identifier, as the previous IP identifier. In the described example, the random determination unit 17 sets the previous IP identifier of "103" at the current point of time as the this-time IP identifier of "103" and sets an identifier of "102" ahead of one identifier from the this-time identifier of "103", as the previous IP identifier of "102".

The previous IP identifier of "102" is greater than the this-time IP identifier of "103". The random determination unit 17 checks IP identifiers of two packets. Thus, the random determination unit 17 determines YES in S4232 and YES in S4233, and determines that the IP identifier is a sequential IP identifier (S4236).

With the above descriptions, the IP identifier stored in the sequence p3-*tmp* for random determination of FIG. 33B is determined to be a sequential IP identifier.

Next, a case where the sequence p3-*tmp* for random determination in FIG. 33C is stored in the memory 102 will be specifically described as an example of the random determination. The sequence p3-*tmp* for random determination in FIG. 33C is different from the sequence p3-*tmp* for random determination in FIG. 33B, as follows. That is, the obtaining order of the packet including the IP identifier of "103" and the check sum of "102" in the sequence p3-*tmp* for random determination of FIG. 33C is inverse to the obtaining order of the packet including the IP identifier of "103" and the check sum of "102" in the sequence p3-*tmp* for random determination of FIG. 33B (reversal of packets).

The random determination unit 17 reads an IP identifier stored in the sequence p3-*tmp* for random determination of FIG. 33C (S4231).

In S4232, the random determination unit 17 selects the IP identifier of "103" stored in the lowest cell, as the this-time IP identifier from the IP identifier in the sequence p3-*tmp* for random determination of FIG. 33C. The random determination unit 17 selects an IP identifier of "104" before one IP identifier from the this-time identifier of "103", as the previous IP identifier from the IP identifier in the sequence p3-*tmp* for random determination of FIG. 33C.

The previous IP identifier of "104" is greater than the this-time IP identifier of "103" (S4232/NO). However, the IP identifier "101" before two IP identifiers from the this-time identifier of "103" is smaller than the this-time identifier of "103" (S4235/YES). Thus, the random determination unit 17 checks an IP identifier of one packet. Accordingly, the random determination unit 17 determines NO in S4232, YES in S4235, and NO in S4233, and causes the process to return to S4232.

The random determination unit 17 sets the previous IP identifier at the current point of time as the this-time IP identifier and sets an identifier ahead of one identifier from the this-time identifier, as the previous IP identifier when the process of S4232 is performed after the second time. In the described example, the random determination unit 17 sets the previous IP identifier of "104" at the current point of time as the this-time IP identifier of "104" and sets an identifier of "102" ahead of one identifier from the this-time identifier of "104", as the previous IP identifier of "102".

The previous IP identifier of "102" is smaller than the this-time IP identifier of "104". The random determination unit 17 checks IP identifiers of two packets. Thus, the random determination unit 17 determines YES in S4232 and YES in S4233, and determines that the IP identifier is a sequential IP identifier (S4234).

With the above descriptions, even when reversal of packets occurs, the IP identifier stored in the sequence p3-*tmp* for random determination of FIG. 33C is determined to be a sequential IP identifier.

Figure 36:
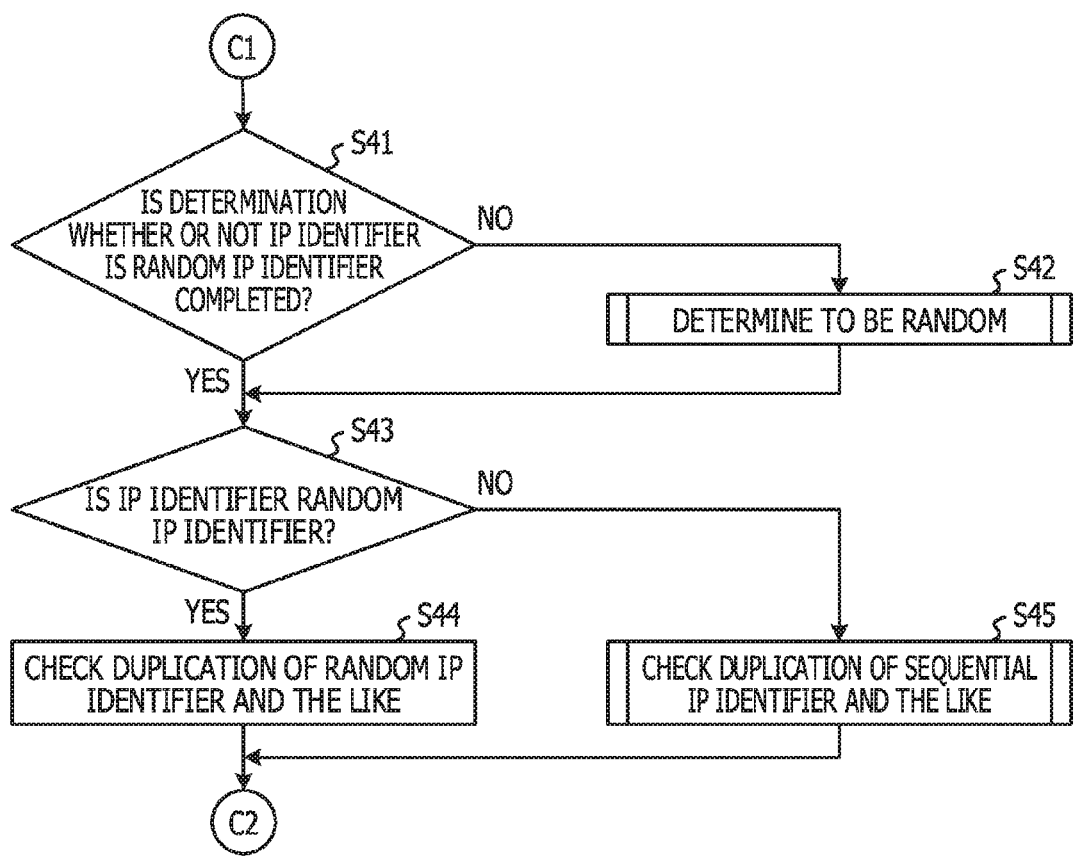
FIG. 36 is a second flowchart illustrating details of the duplicate packet detection processing according to the third embodiment.
Figure 39:
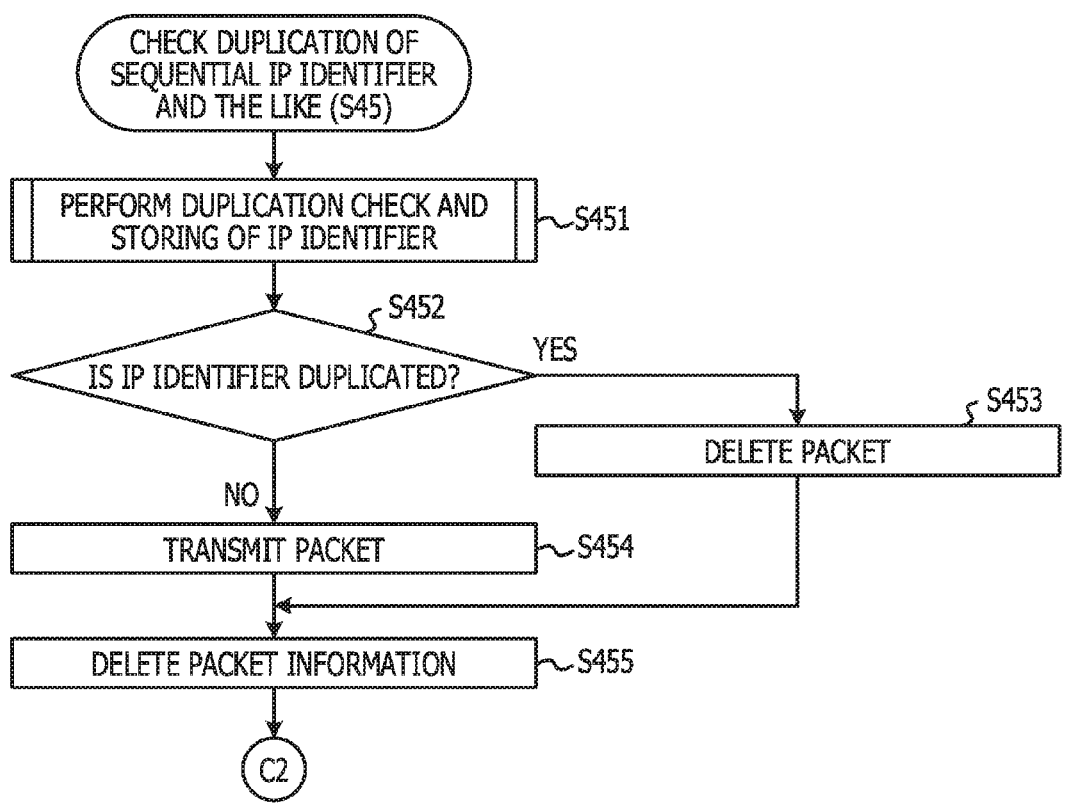
FIG. 39 is a fifth flowchart illustrating details of the duplicate packet detection processing according to the third embodiment.

Next, the duplication determination and the like (S45) for the sequential IP identifier in FIG. 36 will be described with reference to FIG. 39. FIG. 39 is a flowchart illustrating the process of the duplication determination and the like for the sequential IP identifier.

The duplication determination unit 14 performs the duplication determination and the storing of the IP identifier (S451). Since the process of S451 is similar to the duplication determination and the storing processing (S191 to S193) of an IP identifier which are illustrated in FIG. 15, specific descriptions will be omitted. The duplication determination unit 14 specifies an IP identifier bit string which is identified by the session identifier of the obtained packet, with reference to the storing position information table T3a of FIG. 32.

If the process of S451 is ended, the duplication determination unit 14 determines whether the IP identifier of the obtained packet is duplicated (S452). Since this determination (S452) is described with the process of S21 in FIG. 14, specific descriptions will be omitted.

When the IP identifier is duplicated (S452/YES), the deletion unit 16 deletes the packet stored in the memory 102 (S453). Since this deletion processing (S453) is the same processing as the deletion processing (S22) in FIG. 14, specific descriptions will be omitted.

When the IP identifier is not duplicated (S452/NO), the transmission unit 15 transmits the packet stored in the memory 102 to the packet analyzer AD (S454). Since this transmission processing (S454) is the same processing as the transmission processing (S23) in FIG. 14, specific descriptions will be omitted.

If the process of S453 or S454 is ended, the information management unit 13 deletes the packet information (S455). If the process of S455 is ended, the process returns to S11 in FIG. 35.

A duplication check in a case of a sequential IP identifier will be described below in detail. The transmission source device which transmits a packet may transmit packets of the number which exceeds the number (for example, 65536) of IP identifier, which allows assignment in the same session. In this case, the transmission source device causes IP identifiers to be cyclic and assigns an order to the IP identifiers again from the first IP identifier (for example, 0). Then, the transmission source device transmits packets having a reassigned order (this process is also referred to as encircling below).

When the obtaining unit 11 obtains a packet to which a sequential IP identifier caused to be cyclic is assigned, the information management unit 13 has to use a bit area of an IP identifier bit string, in which the first information is stored in the past, as a first storage corresponding to an IP identifier of a packet which is received new. Such an IP identifier bit string is the IP identifier bit string p2-1 in FIG. 34 or the IP identifier bit string p3-1 in FIG. 34, for example.

When it is detected that the IP identifier is encircled, the information management unit 13 performs IP identifier encircling processing and thus initializes bit areas in a predetermined range from the leading of the IP identifier bit string, for example. The information management unit 13 stores, for example, "0" in the bit areas in the predetermined range, in this initialization. According to the initialization, for example, when IP identifiers are encircled, it is possible to reduce difficulty in determination whether the IP identifier bit string in which the first information is stored is used this time or is used in the previous encircling.

According to the initialization, even after the encircled IP identifier is obtained, bit areas are initialized when the IP identifier bit string is stored. Thus, the information management unit 13 can store the IP identifier bit string only by updating the bit area from 0 to 1.

Hitherto, according to the third embodiment, when duplication determination for a packet transmitted and received in communication of a sequential IP identifier is performed, the duplication determination for the check sum is not performed. As a result, since a bit string for the check sum does not have to be ensured in the memory, it is possible to suppress uselessness of the memory area. Since the duplication determination for the check sum is not performed, it is possible to reduce the processing quantity.

Information ("0") which is stored as an initial value in the IP identifier bit string and the check sum bit string may be set to "1", and the first information to the fourth information may be set to "0". That is, the described information of a bit unit may be reversed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method comprising:
   allocating a first set of memory regions in a storage unit, the first set of memory regions including a first memory region and a second memory region, the first memory region including a plurality of areas configured to store a plurality of packet identifiers, and the second memory region including a plurality of areas configured to store a plurality of error detection codes (EDCs),
   receiving a first packet, the first packet being transmitted from a first packet capture point in a network, the first packet including a first packet identifier and a first EDC;
   storing first information indicating the first packet identifier into the first memory region and second information indicating the first EDC into the second memory region;
   receiving a second packet, the second packet being transmitted from a second capturing point in the network, the second packet including a second packet identifier and a second EDC;
   comparing the second packet identifier and the second EDC with the first information stored in the first memory region and the second information stored in the second memory region, respectively; and
   in response to a determination according to the comparing that the second packet identifier corresponds to the first information and the second EDC corresponds to the second information, discarding the second packet, and in response to a determination according to the comparing that at least any one the second packet identifier or the second EDC does not correspond to either of the first information or the second information, providing the first and second packets for a packet analysis,
   wherein
   the determination according to the comparing determines that the second packet identifier corresponds to the first information, when the first information is stored in a first area of the first memory region which corresponds to the second packet identifier, and
   the determination according to the comparing determines that the second EDC corresponds to the second information, when the second information is stored in a second area of the second memory region which corresponds to the second EDC.

2. The method according to claim 1, further comprising:
   storing third information indicating the second packet identifier and fourth information indicating the second EDC in response to the providing the first and second packets for the packet analysis, to thereby subsequently perform the comparing including the third and fourth information.

3. The method according to claim 1, wherein
   the first area of the first memory region is an area indicated by an address obtained by adding the second packet identifier to a leading address of the allocated first memory region, and
   the second area of the second memory region is an area indicated by an address obtained by adding the second EDC to a leading address of the allocated second memory region.

4. The method according to claim 1, further comprising:
   allocating other sets of memory regions in the storage unit at a certain timing; and
   deleting, from the storage unit, a set of memory regions from among the sets of memory regions when a certain time period elapses after the set of memory regions is allocated, wherein
   a second set of memory regions which has been allocated just before from among the sets of memory regions is selected,
   it is determined that the second packet identifier corresponds to the first information, when the first information is stored in a third area of the first memory region included in the first set of memory regions which corresponds to the second packet identifier, and
   it is determined that the second error detection code corresponds to the first error detection code, when the second information is stored in a fourth area of the second memory region included in the first set of memory regions which corresponds to the second error detection code.

5. The method according to claim 4, further comprising:
   selecting a third set of memory regions from the sets of memory regions when it is determined that the second packet identifier does not correspond to the first information or when it is determined that the second EDC does not correspond to the second information; and
   discarding the second packet when the first information is stored in a fifth area corresponding to the first information, among the plurality of areas included in a fifth memory region of the second set of memory regions, and when the second information is stored in a sixth area corresponding to the second information, among the plurality of areas included in the sixth memory region of the second set of memory regions.

6. The method according to claim 1, further comprising:
determining whether a plurality of packet identifiers of a plurality of packets including the first packet and the second packet are random identifiers which vary randomly, when a communication session is initiated,
wherein the comparing is performed in response to the determining that the packet identifiers are random identifiers.

7. The method according to claim 6, wherein the plurality of packet identifiers include numeric values, the method further comprising:
receiving the plurality of packets;
storing the plurality of packets in the storage unit in an order of receiving; and
determining the plurality of packet identifiers are the random identifiers, when values of a plurality of packet identifiers included in the plurality of packets are not continuously increased in the order of receiving.

8. The method according to claim 7, wherein
it is determined that the packet identifiers are the random identifiers, when the values of the plurality of packet identifiers included in the plurality of packets are not continuously increased in the order of receiving and when a third packet identifier of a third packet is greater than the second packet identifier, the third packet being captured before a certain pieces of packets based on the second packet identifier of the second packet included in the plurality of packets.

9. The method according to claim 1, further comprising:
specifying a communication session of the packet based on a session identifier for specifying the communication session included in the packet;
determining whether fifth information corresponding to the communication session identifier and the third information are stored in the storage unit, and determining whether the fourth information and the fifth information are stored in the storage unit; and
storing the third information and the fifth information in the storage unit when the third information and the fifth information have not been stored in the storage unit, and storing the fourth information and the fifth information in the storage unit when the fourth information and the fifth information have not been stored in the storage unit.

10. An apparatus comprising:
a memory including a first set of memory regions, the first set of memory regions including a first memory region and a second memory region, the first memory region including a plurality of areas configured to store a plurality of packet identifiers, and the second memory region including a plurality of areas configured to store a plurality of EDCs; and
a processor coupled to the memory and configured to
receive a first packet, the first packet being transmitted from a first packet capture point in a network and the first packet being including a first packet identifier and a first error detection code,
store first information indicating the first packet identifier into the first memory region and second information indicating the first error detection code into the second memory region,
receive a second packet, the second packet being transmitted from a second capturing point in the network and the second packet being including a second packet identifier and a second error detection code,
compare the second packet identifier and the second error detection code with the first information stored in the first memory region and the second information stored in the first memory region, respectively, and
in response to a determination that the second packet identifier corresponds to the first information and the second error detection code corresponds to the second information, discard the second packet, and in response to a determination that at least one the second packet identifier and the second error detection code does not correspond to the first information and the second information, provide the first packet and the second packet for a packet analysis,
wherein
the determination according to the comparing determines that the second packet identifier corresponds to the first information, when the first information is stored in a first area of the first memory region which corresponds to the second packet identifier, and
the determination according to the comparing determines that the second EDC corresponds to the second information, when the second information is stored in a second area of the second memory region which corresponds to the second EDC.

11. A packet analyzing system which analyzes a plurality of packets, the system comprising:
a packet analyzing device;
a duplicate packet detection device;
a first switching device; and
a second switch device,
wherein
the first switching device is configured to
perform a first relay processing of a first packet, and
transmit a first copied packet including a first packet identifier and a first error detection code obtained by copying the first packet to the duplicate packet detection apparatus,
the second switching device is configured to
perform a second relay processing of the first packet, and
transmit a second copied packet including a second packet identifier and a second error detection code obtained by copying the first packet to the duplicate packet detection apparatus,
the duplicate packet detection device is configured to
allocate a first set of memory regions in a storage unit, the first set of memory regions including a first memory region and a second memory region, the first memory region including a plurality of areas configured to store a plurality of packet identifiers, and the second memory region including a plurality of areas configured to store a plurality of EDCs,
receive the first copied packet,
store first information indicating the first packet identifier into the first memory region and second information indicating the first error detection code into the second memory region,
receive the second copied packet,
compare the second packet identifier and the second error detection code with the first information stored in the first memory region and the second information stored in the second memory region, respectively,
in response to a determination that the second packet identifier corresponds to the first information and the second error detection code corresponds to the second information, discard the second copied packet, and in response to a determination that at least one the second packet identifier and the second error detection code does not correspond to the first information and the second information, transmit the first copied packet to the packet analyzing device, and the packet analyzing device is configured to
perform a packet analyzing using the first copied packet, wherein
the determination according to the comparing determines that the second packet identifier corresponds to the first information, when the first information is stored in a first area of the first memory region which corresponds to the second packet identifier, and the determination according to the comparing determines that the second EDC corresponds to the second information, when the second information is stored in a second area of the second memory region which corresponds to the second EDC.

* * * * *